United States Patent
Livacich et al.

(10) Patent No.: US 8,056,572 B2
(45) Date of Patent: *Nov. 15, 2011

(54) SYSTEM FOR RAPID CONCEALMENT AND SHELTER INCLUDING ANGULAR FRAMES AND WARFIGHTER COVERS

(75) Inventors: John Livacich, Sunnyvale, CA (US); Kendyl A. Roman, Sunnyvale, CA (US)

(73) Assignee: Evrio, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/290,213

(22) Filed: Oct. 27, 2008

(65) Prior Publication Data
US 2009/0065039 A1    Mar. 12, 2009

Related U.S. Application Data

(63) Continuation-in-part of application No. 11/788,495, filed on Apr. 20, 2007, now Pat. No. 7,802,582, and a continuation of application No. 10/161,986, filed on Jun. 4, 2002, now Pat. No. 7,100,626.

(60) Provisional application No. 60/295,956, filed on Jun. 4, 2001.

(51) Int. Cl.
| | |
|---|---|
| *E04H 15/28* | (2006.01) |
| *E04H 15/40* | (2006.01) |
| *E04H 15/48* | (2006.01) |
| *E04H 15/54* | (2006.01) |

(52) U.S. Cl. .......... 135/98; 135/126; 135/135; 135/147; 135/115; 135/901

(58) Field of Classification Search .............. 135/98, 135/124, 126, 133, 135, 143, 147, 120.3, 135/120.4, 901, 905, 906, 907
See application file for complete search history.

(56) References Cited

U.S. PATENT DOCUMENTS 415,826 A * 11/1889 Turner ........................ 135/147
(Continued)

FOREIGN PATENT DOCUMENTS
GB          475811          11/1937
(Continued)

*Primary Examiner* — David Dunn
*Assistant Examiner* — Danielle Jackson

(57) ABSTRACT

An easy to use, universal, simple, lightweight, compact, portable, dynamically configurable and modular system of concealment and shelter. An operator configures a number of concealment blinds or shelters using brackets, supports, segmented and folding shafts, covers, curtains, and skirts, and more complex modules. Advanced modules include user adjustable domes and angular structures. Angular frames with corresponding angular covers provide improved headroom. The system can be configured for placement on a hillside or over rough terrain and obstacles, or for different types use. The system provides covers with novel windows, movable panels, and configuration attachments. The operator changes the configuration of the structure to quickly provide cover, to increase cover, and to adapt to terrain or changing weather. The system includes novel methods of tightening the skin on a cover to reduce movement and noise, while improving safety. Methods include using the full human body, from hands to feet, and its strongest muscle groups to rapidly set up the system with tighter skin. Foot attaching means and hand attachment means enable methods for setting up a fast setup frame or angular frame with the body in a horizontal seated row or a vertical power jerk position. Improved fast setup frame and angular frame are comprised of novel simpler components such as plates with single anchor connections. The components are easier to make, less costly using less material, yet yielding stronger, more durable frames. The system includes novel tent floors, netting, and rain cover configuration for use on fast setup frames or angular frames.

22 Claims, 43 Drawing Sheets

U.S. PATENT DOCUMENTS

| | | | |
|---|---|---|---|
| 891,622 A | 6/1908 | Kroder | |
| 926,945 A | 7/1909 | Howland | |
| 1,079,431 A | 11/1913 | Nitka | |
| 1,288,518 A | 12/1918 | Collier | |
| 1,298,634 A | 4/1919 | Allen | |
| 1,435,110 A | 11/1922 | Efford | |
| 1,528,910 A | 3/1925 | Carlson | |
| 1,572,845 A | 2/1926 | Efford et al. | |
| 1,619,740 A | 3/1927 | Long et al. | |
| 1,856,658 A * | 5/1932 | Rummler | 135/93 |
| 2,159,273 A | 5/1939 | Killinger | |
| 2,175,501 A | 10/1939 | Bergh | |
| 2,186,482 A | 1/1940 | Frank | |
| 2,188,747 A | 1/1940 | Bittick | |
| 2,573,414 A | 10/1951 | Dunn | |
| 2,619,101 A | 11/1952 | McGerry et al. | |
| 2,826,758 A | 3/1958 | Kahn | |
| 2,835,262 A | 5/1958 | Collins | |
| 2,854,988 A * | 10/1958 | Peddell | 52/2.21 |
| 2,864,389 A * | 12/1958 | Smith et al. | 135/98 |
| 2,865,386 A | 12/1958 | Burns | |
| 2,888,021 A | 5/1959 | Adams | |
| 2,928,404 A | 3/1960 | Klages | |
| 3,039,478 A | 6/1962 | Timmons | |
| 3,068,046 A | 12/1962 | Bourgoin | |
| 3,116,746 A | 1/1964 | Bird | |
| 3,165,110 A | 1/1965 | Brooks | |
| 3,195,898 A | 7/1965 | Respini | |
| 3,468,299 A | 9/1969 | D'Amato | |
| 3,515,194 A | 6/1970 | Carhart et al. | |
| 3,537,688 A | 11/1970 | Stein | |
| 3,590,864 A | 7/1971 | Vechesloff | |
| 3,610,323 A | 10/1971 | Troyer | |
| 3,855,635 A | 12/1974 | Ramirez | |
| 3,911,499 A | 10/1975 | Benevento et al. | |
| 3,950,789 A | 4/1976 | Konz et al. | |
| 3,957,069 A | 5/1976 | Denaro | |
| 4,055,173 A | 10/1977 | Knab | |
| 4,146,933 A | 4/1979 | Jenkins et al. | |
| 4,175,576 A | 11/1979 | Iby | |
| 4,263,925 A | 4/1981 | Arganbright | |
| 4,369,528 A | 1/1983 | Vest et al. | |
| 4,494,248 A | 1/1985 | Holder | |
| 4,524,463 A | 6/1985 | Ogden | |
| 4,558,468 A | 12/1985 | Landry et al. | |
| 4,576,364 A | 3/1986 | O'Fearna | |
| 4,578,825 A | 4/1986 | Vote | |
| 4,587,671 A | 5/1986 | Rodriguez et al. | |
| 4,651,727 A | 3/1987 | Howorth | |
| 4,653,120 A | 3/1987 | Leaf | |
| 4,696,066 A | 9/1987 | Ball et al. | |
| 4,718,210 A | 1/1988 | McCourt et al. | |
| 4,787,101 A | 11/1988 | Feinberg | |
| 4,914,752 A | 4/1990 | Hinson et al. | |
| 4,964,282 A | 10/1990 | Wagner | |
| 5,062,234 A | 11/1991 | Green | |
| 5,062,424 A | 11/1991 | Hooker | |
| 5,180,143 A | 1/1993 | Brower | |
| 5,218,982 A | 6/1993 | Kenji | |
| 5,255,390 A | 10/1993 | Gross et al. | |
| 5,287,872 A * | 2/1994 | Anderson | 135/98 |
| 5,299,331 A | 4/1994 | Badillo | |
| 5,301,706 A | 4/1994 | Jones | |
| 5,304,213 A | 4/1994 | Berke et al. | |
| 5,360,439 A | 11/1994 | Dickeroff et al. | |
| 5,367,710 A | 11/1994 | Karmin | |
| 5,411,541 A | 5/1995 | Bell et al. | |
| 5,421,355 A * | 6/1995 | Cantwell | 135/120.3 |
| 5,443,488 A | 8/1995 | Namenmye et al. | |
| 5,564,232 A | 10/1996 | Callaway | |
| 5,572,742 A | 11/1996 | McFadden | |
| 5,575,006 A | 11/1996 | Wolfe | |
| 5,609,176 A | 3/1997 | Weeks | |
| 5,611,087 A | 3/1997 | Adkins | |
| 5,620,482 A | 4/1997 | Augustine et al. | |
| 5,647,660 A | 7/1997 | Lee | |
| 5,697,963 A | 12/1997 | Augustine | |
| 5,746,555 A | 5/1998 | McEvoy | |
| 5,785,716 A | 7/1998 | Bayron | |
| 5,865,355 A | 2/1999 | Camara | |
| 5,891,187 A | 4/1999 | Winthrop et al. | |
| 5,937,883 A | 8/1999 | Camara | |
| 5,970,519 A | 10/1999 | Weber | |
| 5,974,605 A | 11/1999 | Dickerhoff et al. | |
| 6,021,795 A * | 2/2000 | Long et al. | 135/98 |
| 6,049,907 A | 4/2000 | Palomo | |
| 6,148,836 A | 11/2000 | Cananzey | |
| 6,154,883 A | 12/2000 | Spann et al. | |
| 6,216,270 B1 | 4/2001 | Moquin et al. | |
| 6,235,659 B1 | 5/2001 | McAmish et al. | |
| 6,279,877 B1 | 8/2001 | Davis | |
| 6,286,531 B1 | 9/2001 | Joo-Tai | |
| 6,378,136 B2 | 4/2002 | Matsushita | |
| 6,434,877 B1 | 8/2002 | Shelton | |
| 6,450,187 B1 | 9/2002 | Lin et al. | |
| 6,484,321 B1 | 11/2002 | Shamam | |
| 6,499,497 B1 * | 12/2002 | Swetish et al. | 135/115 |
| 6,511,501 B1 | 1/2003 | Augustine et al. | |
| 6,523,558 B1 | 2/2003 | Gillis | |
| 6,524,332 B1 | 2/2003 | Augustine et al. | |
| 6,551,347 B1 | 4/2003 | Elkins | |
| 6,571,574 B1 | 6/2003 | Blackstone | |
| 6,596,019 B2 | 7/2003 | Turner et al. | |
| 6,647,552 B1 | 11/2003 | Hogan | |
| 6,662,492 B2 | 12/2003 | Oliver | |
| 6,694,522 B1 | 2/2004 | Neal | |
| 6,792,622 B2 | 9/2004 | Graves | |
| 6,799,332 B2 | 10/2004 | Hatton | |
| 6,851,125 B2 | 2/2005 | Fujikawa et al. | |
| 6,876,884 B2 | 4/2005 | Hansen et al. | |
| 6,997,199 B1 | 2/2006 | Wright | |
| 7,001,416 B2 | 2/2006 | Augustine et al. | |
| 7,226,454 B2 | 6/2007 | Albrecht et al. | |
| 7,264,011 B2 | 9/2007 | Cohen | |
| 7,276,076 B2 | 10/2007 | Bieberich | |
| 7,364,584 B2 | 4/2008 | Anderson | |
| 7,475,699 B2 * | 1/2009 | Johnson et al. | 135/117 |
| 2002/0026742 A1 | 3/2002 | Washington | |
| 2005/0015127 A1 | 1/2005 | Bieberich | |
| 2005/0143796 A1 | 6/2005 | Augustine et al. | |
| 2005/0183761 A1 | 8/2005 | Livacich | |
| 2006/0000499 A1 | 1/2006 | Livacich | |
| 2006/0047332 A1 | 3/2006 | Malmberg et al. | |
| 2006/0122671 A1 | 6/2006 | Albrecht et al. | |
| 2006/0122672 A1 | 6/2006 | Anderson | |
| 2006/0147320 A1 | 7/2006 | Hansen et al. | |
| 2006/0169309 A1 * | 8/2006 | Brackins | 135/119 |
| 2006/0184216 A1 | 8/2006 | Van Duren | |
| 2006/0184217 A1 | 8/2006 | Van Duren | |
| 2006/0184218 A1 | 8/2006 | Bieberich | |
| 2006/0259104 A1 | 11/2006 | Panser | |
| 2006/0283491 A1 | 12/2006 | Livacich | |
| 2006/0283492 A1 | 12/2006 | Livacich | |
| 2007/0093882 A1 | 4/2007 | Anderson et al. | |
| 2007/0093883 A1 | 4/2007 | Anderson et al. | |
| 2007/0093884 A1 | 4/2007 | Anderson et al. | |
| 2007/0093885 A1 | 4/2007 | Anderson et al. | |
| 2007/0239239 A1 | 10/2007 | Albrecht et al. | |
| 2008/0006317 A1 | 1/2008 | Livacich | |
| 2008/0027521 A1 | 1/2008 | Bieberich | |
| 2008/0027522 A1 | 1/2008 | Bieberich | |
| 2008/0125840 A1 | 5/2008 | Anderson | |

FOREIGN PATENT DOCUMENTS

| | | |
|---|---|---|
| GB | 1 462 033 | 1/1997 |
| SE | 525 415 | 2/2005 |
| WO | WO 97/14381 | 4/1997 |
| WO | WO 98/48652 | 11/1998 |
| WO | WO 00/62726 | 10/2000 |
| WO | WO 03/086500 | 10/2003 |
| WO | WO 03/106897 | 12/2003 |
| WO | WO 2004/004500 | 1/2004 |

| | | | | | |
|---|---|---|---|---|---|
| WO | WO 2006/020170 | 2/2006 | WO | WO 2007 047917 | 4/2007 |
| WO | WO 2006/062910 | 6/2006 | WO | WO 2008 013603 | 1/2008 |
| WO | WO 2006/063027 | 6/2006 | WO | WO 2008 091486 | 7/2008 |
| WO | WO 2006/086587 | 8/2006 | | | |

* cited by examiner

SYSTEM FOR RAPID CONCEALMENT AND SHELTER INCLUDING ANGULAR FRAMES AND WARFIGHTER COVERS

CONTINUATION AND PRIORITY CLAIMS

This application is a continuation-in-part of, and claims priority based on (i.e., U.S. patent application Ser. No. 11/788,495, filed Apr. 20, 2007). This application is related to U.S. Pat. No. 7,100,626 and applications (now U.S. Pat. No. 7,766,022), and (now U.S. Pat. No. 7,805,582). The related applications are herein included by reference. Later filed U.S. Pat. No. 7,789,098.

RELATED APPLICATIONS

The following summarizes the related applications. The subheadings are internal docket numbers and are used for shorter reference to the related application or patent.

MOC-PPA
    Lightweight portable concealment means and methods

| Provisional application Ser. No. | 60/295,956 | Filing Date: | Jun. 4, 2001 |
|---|---|---|---|

MOC1
    Lightweight portable concealment means and methods

| Patent application Ser. No. | 10/161,986 | Filing Date: | Jun. 4, 2002 |
|---|---|---|---|
| Publication Number | 2002/0189660 | Publication Date: | Dec. 19, 2002 |
| Now U.S. Pat. No. | 7,100,626 | Issue Date: | Sep. 5, 2006 |

MOC2
    Universal lightweight portable concealment means and methods

| Patent application Ser. No. | 11/045,736 | Filing Date: | Jan. 28, 2005 |
|---|---|---|---|
| Publication Number | 2005/0183761 | Publication Date: | Aug. 25, 2005 |

MOC3
    Modular system for concealment and shelter

| Patent application Ser. No. | 11/155,398 | Filing Date: | Jun. 16, 2005 |
|---|---|---|---|
| Publication Number | 2006/0000499 | Publication Date: | Jan. 5, 2006 |

MOC4
    Modular system for concealment and shelter

| Patent application Ser. No. | 11/295,305 | Filing Date: | Dec. 5, 2005 |
|---|---|---|---|
| Publication Number | 2006/0283491 | Publication Date: | Dec. 21, 2006 |

POLE1
    Modular system including shaft segments having configuration and breakdown attachments MOC6
    Continuation-in-Part of Application Ser. No. 11/788,495

| Patent application Ser. No. | 11/484,106 | Filing Date: | Jul. 10, 2006 |
|---|---|---|---|
| Publication Number | 2006/0283492 | Publication Date: | Dec. 21, 2006 |

MOC5
    System for concealment and shelter with structure for rapid set up and tight skin

| Patent application Ser. No. | 11/788,495 | Filing Date: | Apr. 20, 2007 |
|---|---|---|---|
| Publication Number | 2008/0006317 | Publication Date: | Jan. 10, 2008 |

CONTINUATION AND PRIORITY CLAIMS

This application is a continuation-in-part of, and claims priority based on MOC5 (i.e., U.S. patent application Ser. No. 11/788,495, field Apr. 20, 2007). This application is related to U.S. Pat. No. 7,100,626 (MOC1) and applications MOC2, MOC3, MOC4 (now U.S. Pat. No. 7,766,022), POL1, and MOC5 (now U.S. Pat. No. 7,805,582). The related applications are herein included by reference. Later filed U.S. Pat. No. 7,789,098 also is a continuation-in-part of MOC5.

BACKGROUND

1. Field of the Invention

This invention relates to lightweight portable concealment and shelter systems and methods.

2. Description of Prior Art

There is often a need to conceal oneself when researching wildlife, hunting, camping, working on construction projects, or working in the outdoors. Wildlife researchers conceal themselves so that they can film and study wildlife without disturbing the behavior of the animals. Hunters often conceal themselves in various hunting blinds to avoid being detected by their prey. Campers often conceal themselves to bathe, change clothes, and perform other personal or hygiene activities. Construction workers, military, law enforcement, and others who work in the outdoors also have similar needs for concealment. Various methods have been employed to accomplish these tasks.

In the past, quite complex, heavy structures have been built or constructed for concealment. Hunters have built permanent hunting blinds. Portable huts, shower stalls, dressing shelters, tents, canopies, and complex tree blind structures have been carried into the great outdoors.

The related applications provided lists of patents and products relating to this field of invention. The discussion of these prior art references is included by reference.

The use of such devices has several disadvantages such as being heavy, bulky, noisy, expensive, and complicated to assemble or use. Most of these devices have only a single use with poor performance. There is a need for a simple, lightweight, compact, portable, multi-use means of concealment.

To avoid being detected by their scent, hunters and other wildlife observers climb trees using tree steps and then remain for hours in a tree stand watching and waiting for animals to pass by. However, a person in a tree stand makes a silhouette against the sky or background and is exposed to a 360-degree view. Animals can easily detect the human silhouette or movement. Further, if the person or equipment makes a noise the animal will know where to look. There is a need for a device that eliminates the silhouette.

Complicated equipment or procedures create a situation where a person may drop equipment or, even worse, fall from the tree stand. Most of the existing devices block the view or mobility of the person.

Metal objects screwed into trees are sometimes forgotten and become over grown by the tree. Later when the lumber is harvested and cut, the saw strikes the metal object and can cause severe damage. Some states have banned the use of metal tree screws or spikes. Any device used for attaching to trees in the forest needs an embodiment that attaches to the outside of the tree and can be easily removed.

The following ground blinds or tents are known in the art:
Hunter's Specialties' "Lightweight Portable Ground Blind"
Avery' "Avery Quick Carry Ground Blind"
U.S. Pat. No. 5,062,234, entitled "Portable Blind"
Double Bull "Matrix"
Cabela's "Lightning Set" and "Lightning Set 4-Season"
Black Stump's "Instant Tent"

There are a number of very old patents relating to curtain support brackets. These are associated with hanging curtains inside a building on a wall and fail to anticipate many novel features of the present invention.

There are also a number of very old patents relating to tents with hinged shafts, such as U.S. Pat. No. 1,502,898, Berg, filed Jan. 12, 1924, or umbrella tents, such as U.S. Pat. No. 1,649,219, Goldberg, filed Mar. 23, 1927. U.S. Pat. No. 74,933, Palmer, issued Feb. 25, 1868, disclosed an inverse umbrella-type frame deployed by a rope external to the enclosure. U.S. Pat. No. 3,794,054, Watts, issued Feb. 26, 1974, disclosed an inverse umbrella tent.

However, these are limited in various ways.

3. Human Body Strength and Skin Tighting

In the field of lightweight, portable outdoor blinds, there is a long felt need to have skins extremely tight to avoid detectable movement and noise. Numerous blind designs have attempted to provide the desired skin tightness but have failed without using complex, heavy frames that require significant time and athleticism to set up. Those that are lightweight and fast, such as conventional umbrella designs, fail to put enough force into the frame to provide the desired result. Further, because many blind products have promised, but have failed to deliver, cover skins that remain substantially motionless in windy conditions encountered while hunting, consumers are skeptical. To be successful a product must also stay taut when shaken by potential buyers on the trade show floor or in dealers' show rooms.

The arm muscles (biceps and triceps) of the human body are relatively weak compared to other muscle groups such as the legs, abdomen, back, and shoulders. This is especially true when arms are extended away from the body above the shoulders as is required to deploy conventional umbrella type blinds. Such blinds are set up with the frame expanded in an upright position and the operator either a) pushing up from inside with one hand while pulling a pull cord or shaft down with the other hand, or b) pushing down from outside with one hand while pulling a pull cord up with the other hand while standing beside the structure. For example, see the art cited in U.S. Pat. No. 6,354,316, Chen. Neither of these conventional methods take advantage of the strongest muscles groups in the body to provide the skin tightening force.

In the power jerk position, the full human body can apply hundreds of pounds of force between the hands and the feet. In 1970 for example, Olympic lifters were able to clean and jerk over 500 lbs. A typical outdoorsman can apply up to about 75 pounds of continual force in the power jerk position. A six-foot human body has about 33 inches up to about 40 inches of range of motion in the power jerk.

In a horizontal, seated row position, for example as used in Olympic rowing, all of the large muscle groups of the body, including legs, abdomen, back, shoulder, and arms, are used to apply the force through the body between the feet and the hands. A typical outdoorsman can apply up to about 75 pounds of force in the seated row position, with an average of about 40 pounds over the full stroke. A six-foot human body has up to about 45 inches of range of motion in the seated row position (and about up to 65 inches if the arms are extended beyond the head).

Work or energy is measured in foot-pounds. When an operator applies an average of 45 pounds of force over a distance of 3.5 feet (i.e. 42 inches) about 157 foot-pounds of energy is applied. About the same amount of energy could also be stored by applying 57 pounds of force over a distance of 2.75 feet (i.e. 33 inches).

What is needed is a method of setting up a blind where the full muscle strength of the human body from hands to feet can be used to quickly provide the skin tightening force to a lightweight, portable blind.

Although arch shaped quickset blinds have been used with some success, the arch shape does not provide maximum headroom close to the walls, and a larger amount of energy must be stored in the arches to achieve skin tightness.

What is needed is a structure where headroom is maximized near the walls of a blind or tent and where skin tightening forces are provided by relatively small mechanical movement.

People spending time in the outdoors, especially warfighters, often have a need to quickly set up shelter for them and their equipment.

What is needed is a tent that can be quickly deployed to provide protection from rain, snow, heat, and insects and reptiles.

SUMMARY OF THE INVENTION

Accordingly, it is an objective of the present invention to provide an easy to use, universal, simple, lightweight, compact, portable, quiet, multi-use modular system for concealment and shelter, which can additionally be rapidly set up using the large muscle groups of the full human body resulting in tight cover skin. The system includes novel angular frames and covers, and novel covers designed specially for wildlife observation and hunting, and for warfighters.

Objects and Advantages

Accordingly, beside the objects and advantages described above, and in the parent applications, some additional objects and advantages of the present invention are:

1. To provide a modular system of components that can be used to construct a variety of outdoor blinds and shelters.
2. To provide a modular system that can be used on steep terrain.
3. To provide methods of tightening a skin of a blind or tent to reduce undesired motion.
4. To provide a blind with upper opening, in addition to other horizontal openings, whereby the operator's line of sight is not obstructed vertically.
5. To provide a cover modules that can be used alone or as part of a more complex combination of components.

6. To provide shoot-through (or blackout sections) that can be moved to cover openings in a blind or shelter structure.
7. To provide shoot-through (or blackout sections) that can be moved to cover openings in a blind or shelter structure while maintaining skin tightness.
8. To provide a fully enclosed blind that allows unobstructed line of sight in 360 degrees of a substantially horizontal plane.
9. To provide a fully enclosed blind that allows unobstructed line of sight in 180 degrees in a substantially vertical plane on steep terrain.
10. To provide an improved wildlife research blind.
11. To provide an improved hunting blind.
12. To provide an improved military tent.
13. To provide unobstructed vision or shooting lanes.
14. To provide improved components and means of construction with lower cost and longer reliability.
15. To provide methods and means of tightening the skin on the sides of a cover to reduce movement and flutter.
16. To provide a blind window with four or more sections such that any section or groups of sections can be independently opened while maintaining taut cover panels.
17. To provide a low profile, quiet blind with optimum headroom.
18. To provide an arch flattening means for an arched structure where usable headroom under the arch is increased.
19. To provide an angular frame structure with improved headroom near the walls.
20. To provide an angular frame which provides significant skin tightening force with a relatively small mechanical change relative the distant between an upper plate and a lower plate.
21. To provide a dockless plate system.
22. To provide a quick setup frame that is strong enough to deploy without requiring spreading straps.
23. To provide a self locking safety means to protect an operator from unplanned release of force stored in a setup frame.
24. To provide shaft plates that provide structure strength and stability during initial spreading and during final stasis, resulting in smooth set up and improved durability.
25. To provide hand and foot attaching means to facilitate the set up of a blind using the power jerk position.

These and other features and advantages of the present invention will become apparent upon consideration of the following specification, claims, and drawings.

DRAWING FIGURES

In the drawings, closely related figures have the same number but different alphabetic suffixes.

FIG. 1A and FIG. 1B show an attaching pivoting support and its use.
FIG. 1C shows ground blind configuration.
FIG. 1D shows pivoting arches.
FIG. 2A and FIG. 2B show a low profile blind with cover with quiet windows.
FIG. 3A through FIG. 3C show a fast setup frame.
FIG. 4A through FIG. 4E show features of docking assemblies and safety clips
FIG. 5A through FIG. 5E show various embodiments of covers with adjustable blackout, shoot-through, and star windows.
FIG. 6A and FIG. 6B summarize novel set up and take down of an embodiment of a fast setup frame.
FIG. 7A through FIG. 7D show features of a fast setup frame, including an automatic safety clip.
FIG. 8A through FIG. 8C show various embodiments and operation of covers with guylines and windows.
FIG. 9A and FIG. 9E illustrate features of a novel angular frame which is improved frame with fast set up.
FIG. 10A through FIG. 10C show various embodiments and operation of an angular frame with angular cover.
FIG. 11A through FIG. 11E show alternative embodiments and operation of an angular frame blind.
FIG. 12A through FIG. 12I show various details of embodiments of frames.
FIG. 13A through FIG. 13D show various configurations with inverted-T windows and guylines window, including use with the angular frame.
FIG. 14A through FIG. 14H illustrate novel set up and take down of the angular frame.
FIG. 15A through 15C show aspects and operation of an alternate method of using the full human body to set up an angular frame.
FIG. 16A through FIG. 16D show various details of embodiments of improved docking mechanisms.
FIG. 17 shows various features of a currently preferred embodiment of the blind of the present invention.
FIG. 18A through FIG. 18F illustrate various embodiments, aspects and configurations of skins for the present invention.

REFERENCE NUMERALS IN DRAWINGS

| | |
|---|---|
| 100 | attaching pivoting support |
| 106 | shaft |
| 126 | elastic cord |
| 130 | attaching structure |
| 140 | bend |
| 150 | first leg |
| 160 | second leg |
| 300 | curtain |
| 307 (a-b) | alternate curtain |
| 400 | operator |
| 410 | path |
| 686 (a-d) | corner section |
| 715 | safety pin |
| 727 | self locking assembly |
| 927 | plate conduit |
| 941 | angular blind cover |
| 942 | angular cover |
| 943 | separation shaft |
| 944 | separation shaft tip |
| 945 | upper plate |
| 946 | lower plate |
| 947 | separation shaft stop |
| 948 (a-d) | plate anchor |
| 950 | angular frame |
| 952 (a-d) | angular cover shaft |
| 953 | lower shaft |
| 954 (a-d) | stretcher shaft |
| 956 (a-d) | angular hinge |
| 958 | shaft plate |
| 1140 | three-legged angular frame |
| 1142 | three cornered angular cover |
| 1210 | top window fastener |
| 1212a | left window fastener |
| 1212b | right window fastener |
| 1212 | side window fastener |
| 1220 | triangle section |
| 1230b | right section |
| 1230a | left section |
| 1262 | upper handle |
| 1263 | pull rod |
| 1264 | handle strap |
| 1266 | lower handle |
| 1268 | handle bracket |
| 1269 | fastener |
| 1511 | cover shaft intersection |
| 1512 (a-d) | half arch cover shaft |
| 1514 (a-d) | arch flattening shaft |

-continued

| | |
|---|---|
| 1516 (a-d) | arch flattening hinge |
| 1518 (a-b) | hinge wall |
| 1533 | pull cord extension |
| 1534 | fast setup frame |
| 1535 | pull handle |
| 1536 | pull cord |
| 1537 | handle snap |
| 1538 | handle snap receiver |
| 1539 | handle standoff |
| 1540 | cover |
| 1550 | rain fly |
| 1602 (a-b) | opening |
| 1612 (a-b) | cover window |
| 1621 | pyramid cap |
| 1622 (a-d) | corner loop |
| 1630 | alternate cover |
| 1631 | cover cap |
| 1632 | overhead window. |
| 1634 | door |
| 1636 | door fastener |
| 1642 | shoot-through panel |
| 1646 | quiet cover |
| 1672 | window roll |
| 1686 (a-d) | skirt strap |
| 1704 (a-d) | receiving clip |
| 1705 | safety strap |
| 1706 (a-d) | inserting clip |
| 1714 | safety clip cord |
| 1715 | safety clip |
| 1716 | safety clip edge |
| 1717 | round wire clip |
| 1718 | rectangular wire clip |
| 1721 | alternate dock |
| 1722 | intersection dock |
| 1723 | dock |
| 1724 | dock plate |
| 1725 | dock curved surface |
| 1727 | dock conduit |
| 1728 | washer nut |
| 1742 | docking assembly |
| 1743 | docking shaft |
| 1744 | docking tip |
| 1745 | safety groove |
| 1746 | docking plate |
| 1763 (a-d) | threaded axles |
| 1776 | hand grip |
| 1778 | hand guard |
| 1790 | foot attaching means |
| 1792 | foot plate |
| 1794 | gripping texture |
| 1799 | stirrup |
| 1870 | vertical hem |
| 1880 | simple cover |
| 1882 | cover with porch |
| 1884 | tent floor |
| 1886 | netting door |
| 1888 | netting |
| 1910 | guyline module |
| 1912 (a-d) | guyline |
| 1920 (a-b) | blackout panel |
| 1922 | see-through panel |
| 1937 | closable clip |
| 2010 | skirt |
| 2050 | skirt door |
| 2160 (a-b) | spreading strap |
| 2162 | wishbone strap |
| 3094 | locking channel |
| 3102 | sleeved support |
| 3104 | sleeve |
| 3197 (a-d) | half-length shaft segment |
| 3199 (a-1) | channeled shaft segment |
| 3456 | stake with cord clips and leg |
| 3500 | pivoting intersection connector |
| 3700 | pivoting arches |
| 4400 (a-d) | end piece with hook |
| 4700 (a-b) | magnet |
| 4701 | magnetic piece |

SPECIAL DEFINITIONS cord—a flexible, and possibly elastic, filament including but not limited to a fiber, thread, string, rope, twine, wire, cable, yarn, thong, tendon, or line.

curtain—a concealing or protecting sheet (or strips) of material.

grommet—a flexible loop that serves as a fastening, support, or reinforcement or an eyelet of firm material to strengthen or protect an opening or to insulate or protect something passed through it.

eyelet—a typically metal or plastic reinforcement for a hole.

shaft—a supporting member in construction including but not limited to any solid or hollow, round or rectangular bar, beam, pole, rod, spar, or tube composed of wood, plastic, metal, or composite material.

DESCRIPTION OF THE INVENTION

The present invention comprises an easy to use, simple, lightweight, compact, portable modular system for concealment and shelter and methods for its construction and use. The main components of a basic module are various novel supports and a curtain. The support attaches to a structure and pivots at the attachment. Other modules include novel covers with cover shafts, a removable floor, a rain fly, and various novel flies and shields. The modules can be combined to form various tree blinds, ground blinds, waterfowl blinds, blinds attached to vessels or vehicles, and various shelters. The system uses novel shaft segments that can be attached in various configurations and then broken down without detaching the attachments. The present invention encompasses various embodiments of the attaching pivoting support as well as various embodiments of curtains with various features. A method of the present invention allows for 360-degree concealment. In addition to a method of being fully enclosed, a method of the present invention is based on the concept of "hiding in front" of a similar pattern.

The present invention is also directed to various structures and methods for skin tightening for a shelter or blind, especially hunting blinds. Novel frame structures are used to stretch and thereby tighten the skin of a hunting blind. The present invention includes the discovery that when a cover is stretched over an arched dome, the lower portion of each cover wall is relatively loose. Various solutions to this problem are provided. Various prior attempts to provide lightweight portable blinds with cover skins that remain tight in blustery, hunting conditions have failed because the structure is too weak and/or the set up method does not allow a human operator to apply a sufficient force to the skin tightening mechanism. The present invention includes novel structures and methods that allow the large muscle groups of the full human body to apply a skin stretching force to set up a blind with previously unrealized results.

FIG. 1A Through FIG. 1C

FIG. 1A illustrates an exemplary embodiment of an attaching pivoting support 100. The support 100 is bent at an angle. The bend 140 results in two legs: a first leg 150 and a second leg 160. The first leg 150 has a threaded portion for threaded attachment to an attaching structure 130 (FIG. 1B), such as a tree, pole, rock, wall, or attaching fastener 230 (not shown—see parent applications). The bend 140 allows a user to exert a force on the second leg 160 that acts as a lever to screw the first leg 150 into the attaching structure 130.

The angle of the bend 140 is shown as a 90-degree angle; however, good results have also been obtained by using an obtuse angle. An obtuse angle still provides a leveraged force but is less likely to cause the second leg 160 to be blocked by tree branches or other obstructions.

The attaching pivoting support 100 can be constructed of a single shaft. However, depending on construction materials, a lighter embodiment can be constructed by combining various components. This invention anticipates that any combination of parts can be used to make the attaching pivoting support 100 with equivalent structural features and functions. The embodiment shown in FIG. 1A is merely on example of those disclosed in the parent applications.

FIG. 1A shows a currently preferred embodiment the attaching pivoting support 100 comprised of the sleeved support 3102 and the second leg 160 comprised of a plurality of channeled shaft segments 3199. Additional details and alternatives of construction and advantages regarding FIG. 1A are provided in the POLE1 application included herein by reference.

FIG. 1B

FIG. 1B shows an operator 400 concealed by a support 100 and a curtain 300. The operator 400 may be washing or taking care of other personal hygiene.

The means of concealment quickly and quietly can be lowered as shown by an angular path 410. This allows the operator 400 to look over the curtain 300 or to shoot an arrow or fire a gun behind them without being obstructed by the means of concealment. After firing, the user can quickly and quietly return the curtain 300 to its normal position as shown.

The curtain may contain one more slits (not shown) through which the operator may look or shoot.

One objective and advantage of the present invention is maintaining the frictional force of the first leg 150 with the attaching structure 130. This frictional force holds the attaching pivoting support 100 in place when not being moved by the operator 400. The operator 400 can also angularly raise the support 100 so that the operator's head is also concealed by curtain 300.

FIG. 1C

FIG. 1C shows the use of three stakes (e.g. stake with cord clips and leg 3456) and two curtains 300 to form a ground blind. In this example, the stakes (3456) are inserted into the ground. Each stake (3456) is connected to a shaft 106 (not visible). Curtains 300a and 300b are supported by the shafts 106. The stakes 3456 can be placed in a line to form a wall, or diagonally to form a V-shaped blind.

Three or more curtains 300 could be used to form a fully enclosed ground blind.

FIG. 1D

FIG. 1D illustrates a pair of pivoting arches 3700. The pair of pivoting arches 3700 comprises an embodiment of pivoting intersection connector 3500 (or 3500b) and a plurality of full-length channeled shaft segments 3199 or half-length shaft segments 3197. In one embodiment, the pair of pivoting arches 3700 comprises three full-length channeled shaft segments 3199 and one half-length shaft segment 3197 on each side of each arch (as shown).

FIG. 2A and FIG. 2B

FIG. 2A and FIG. 2B show the low profile blind with cover with quiet windows.

FIG. 2A shows a quiet cover 1646 that embodies a novel three-tiered cover. The top tier comprises a cover cap 1631. The middle tier comprises a ring of windows 1612 that are held open or closed with novel magnetic connections. The bottom tier is a skirt 2010 (which is proportionally smaller than the skirt 2010 disclosed for example in FIG. 17 and in the related applications, i.e. the MOC3 application).

The magnetic connections, between magnets 4700 and magnetic pieces 4701, are a novel means for maintaining tight cover skin on the walls of a blind, while allowing quiet operation of the windows. In this regard magnets are preferred over zippers 1633 and hook and loop fasteners 530 (shown in the related applications). Each window 1612 has a magnetic piece 4701 attached to the lower edge of the window 1612, or sewn in the hem.

FIG. 2A shows the windows being held closed and taut using the magnetic connection between the lower magnet 4700b and the magnetic piece 4701 in the edge of the corresponding window 1612.

FIG. 2B shows the left front window 1612a being held open using the magnetic connection between the upper magnet 4700a and the magnetic piece 4701. The right front window 1612d is held partially closed by its respective magnetic connection. The operator 400 is also shown positioned within smaller, lightweight, portable, quick popup, quiet cover 1646 embodiment. All of the components are attached together (for example via cover loops 1622—not shown) so there are no parts to lose. This embodiment is simpler, smaller, lighter, and lower cost than the other full size, fuller function blind embodiments.

FIG. 3A Through FIG. 3C

As discussed above, there is a need for embodiments of blinds and tents that can be set up rapidly and standalone in a variety of configurations. FIG. 3A through FIG. 3C show various aspects and configurations of an embodiment of a fast setup frame 1534.

FIG. 3A shows a novel fast setup frame 1534. The fast setup frame 1534 comprises a cover shaft intersection 1511 comprising a novel intersection dock 1722, an arch flattening means comprising a novel docking assembly 1742, and a pull cord 1536 for operating the arch flattening means.

A plurality of hinged cover shafts 1512 attach by hinges to the cover shaft intersection 1511, so that each hinged cover shaft 1512 comprise half an arch. Thus, the hinged cover shafts 1512 are also referred to as half arch cover shafts 1512. FIG. 3A shows embodiments with four half arch cover shafts identified as 1512a through 1512d. Similar fast setup frames 1534 could be comprised of three or more half arch cover shafts (see, for example, FIG. 11C showing three shafts)

This embodiment of the arch flattening means comprising a docking assembly 1742 and a plurality of arch flattening shafts 1514 (a-d) each connected to the respective half arch cover shafts 1512 (a-d) with a respective, novel arch flattening hinge 1516 (a-d). Each arch flattening shaft 1514 (a-d) is also connected to the docking assembly 1742, in this embodiment, with a hinge.

The pull cord 1536 preferably is attached at one end to a pull handle 1535.

The free ends of the half arch cover shafts 1512 each have an end piece means for attaching the fast setup frame 1534 to a cover 1540 (not shown). The end piece means are shown as end pieces with hook 4400 (a-d), respectively.

FIG. 3B shows that, when the arch flattening means, shown comprising the novel docking assembly 1742, is pulled toward and engaged with the cover shaft intersection 1511, shown comprising the novel intersection dock 1722, using the pull cord 1536, the arch is flattened. This arch flattening results on a outward and upward skin tightening force being applied through the half arch cover shafts 1512 along the cover corners, as presented by the force arrows. With the novel features and methods of the present invention as described below, the human operator is able to apply a stronger skin tightening force over a longer working distance than is possible with convention means and methods.

FIG. 3C shows an embodiment of the fast setup frame 1534 with four half arch cover shafts identified as 1512a through 1512d. This embodiment shows another embodiment of the safety means comprising a safety strap 1705 having receiving clip 1704 and an inserting clip 1706. When fully docked, the operator applies the safety strap.

FIG. 4A Through FIG. 4E

FIG. 4A shows various novel details of embodiments of the novel docking assembly 1742, the novel intersection dock 1722, the novel arch flattening hinge 1516, and a novel pull handle 1535.

The novel docking assembly 1742 comprises a docking plate 1746 and a docking shaft 1743 integrally attached to the docking plate 1746. The docking shaft 1743 has a rounded docking tip 1744 and an optional safety groove 1745. In this novel embodiment the docking plate 1746 is preferably about 3 to 4 inches or more in diameter and is sufficiently thick enough to provide substantial wall mechanical force against the sides of the respective arch flattening shafts 1514 (*a-d*). In this embodiment, the pull cord 1536 passes through the center of the docking assembly.

The novel intersection dock 1722 comprises a novel dock plate 1724 and a dock 1723 integrally attached to the dock plate 1724. The dock plate 1724 features a plate hole 1769 extended to form a dock conduit 1727. The dock 1723 is shown with a novel outward curved surface 1725 for engaging the docking tip 1744 of the docking shaft 1743 when it is out of alignment. The dock curved surface 1725 gradually flattens to guide the docking shaft 1743 into the dock conduit 1727. In this novel embodiment dock plate 1724 is preferably about 4 inches or more in diameter and is sufficiently thick enough to provide substantial wall mechanical force against the sides of half arch cover shafts 1512 (*a-d*). In this embodiment, the pull cord 1536 passes through the center of the dock 1723 and dock conduit 1727.

The dock conduit 1727 is at least partially threaded on the exterior of its extension so that it can receive a washer nut 1728. The washer nut 1728 is used to hold the cover 1540 (not shown) material out of the dock conduit 1727 so material does not interfere with the operation of the docking shaft 1743 (see FIG. 20A). Optionally, the washer nut 1728 also holds an embodiment of a foot attaching means 1790, such as foot plate 1792 with gripping texture 1794 as shown.

The arch flattening hinge 1516 is integrally part of the hinged cover shaft 1512 (*a-d*) and has hinge walls 1518 (*a-b*). The arch flattening shaft 1514 is connected to the arch flattening hinge 1516.

The novel pull handle 1535 retains the pull cord 1536, preventing the pull cord 1536 from passing through the intersection dock 1722 and providing tension when the operator 400 (not shown) wants to assert a force through the pull cord. The pull handle 1535 preferably comprises integral hand grips 1776 for operator comfort and more secure grasp. The pull handle 1535 also preferably comprises a handle standoff 1539 which holds the handle in a known position that is easy to grasp while setting up the blind using the novel method shown for example in FIG. 6A, or the sequence from 14A to 14H, in particular at the transition from FIG. 14D to FIG. 14E.

The pull handle 1535 also preferably comprises a handle snap receiver 1538 that allows the pull handle 1535 to be temporarily locked onto a corresponding handle snap 1537 on the dock conduit 1727. The handle snap 1537 and a handle snap receiver 1538 could be molded as a groove and ring as shown; however, the handle snap means preferably is manufactured as a groove in each part with an O-ring providing the snap. The handle snap means is advantageous to avoid damage or injury or to provide a secure starting point when pulling the pull cord 1536 from the other end as shown, for example, in FIG. 15A and FIG. 15C.

As exemplary shown in FIG. 4A and FIG. 4B, the dock conduit 1727 is only partially threaded allowing the handle standoff 1539 to fit over the dock conduit 1727 above the washer nut 1728, and allowing room for the handle snap 1537 (or other embodiment of the handle snap means).

FIG. 4B is a cross sectional view of the intersection dock 1722 and the docking assembly 1742 having the same referenced items as FIG. 4A. It further shows the position of an optional hand grip 1776 and hand guard 1778 that would be used with an alternate embodiment as discussed in reference to FIG. 15A and FIG. 15C. The hand guard 1778 is of sufficient shape to engage the dock plate 1724 or half arch cover shaft 1512 before the operator's hand or fingers would be squeezed between the approaching parts.

As shown in FIG. 4A and FIG. 4B, the half arch cover shafts 1512 (*a-d*) hinge on the dock plate 1724 and the arch flattening shafts 1514 (*a-d*) hinge on the docking plate 1746. Like the arch flattening hinge 1516 (*a-d*), the hinge positions in the plates (1724 and 1746) are thick enough to form flat walls on either side of the shaft ends 1513 (*a-d*). The optional safety groove 1745 shown, for example, in FIG. 4A and FIG. 4B provides an embodiment of a safety means in combination with a safety clip 1715 (FIG. 4C).

FIG. 4C shows a preferred embodiment of the safety clip 1715 which may be attached to the blind with safety clip cord 1714. This embodiment is made from a flat piece of metal or plastic with a central hole that provides a safety clip edge 1716 which mates securely with the safety groove 1745 (FIG. 4B). When fully docked, the operator applies the safety clip 1715. The safety means prevents the unplanned release of the energy stored in the fast setup frame 1534. The safety means is removed before collapsing the blind (e.g. before FIG. 14H).

Figure 4A:
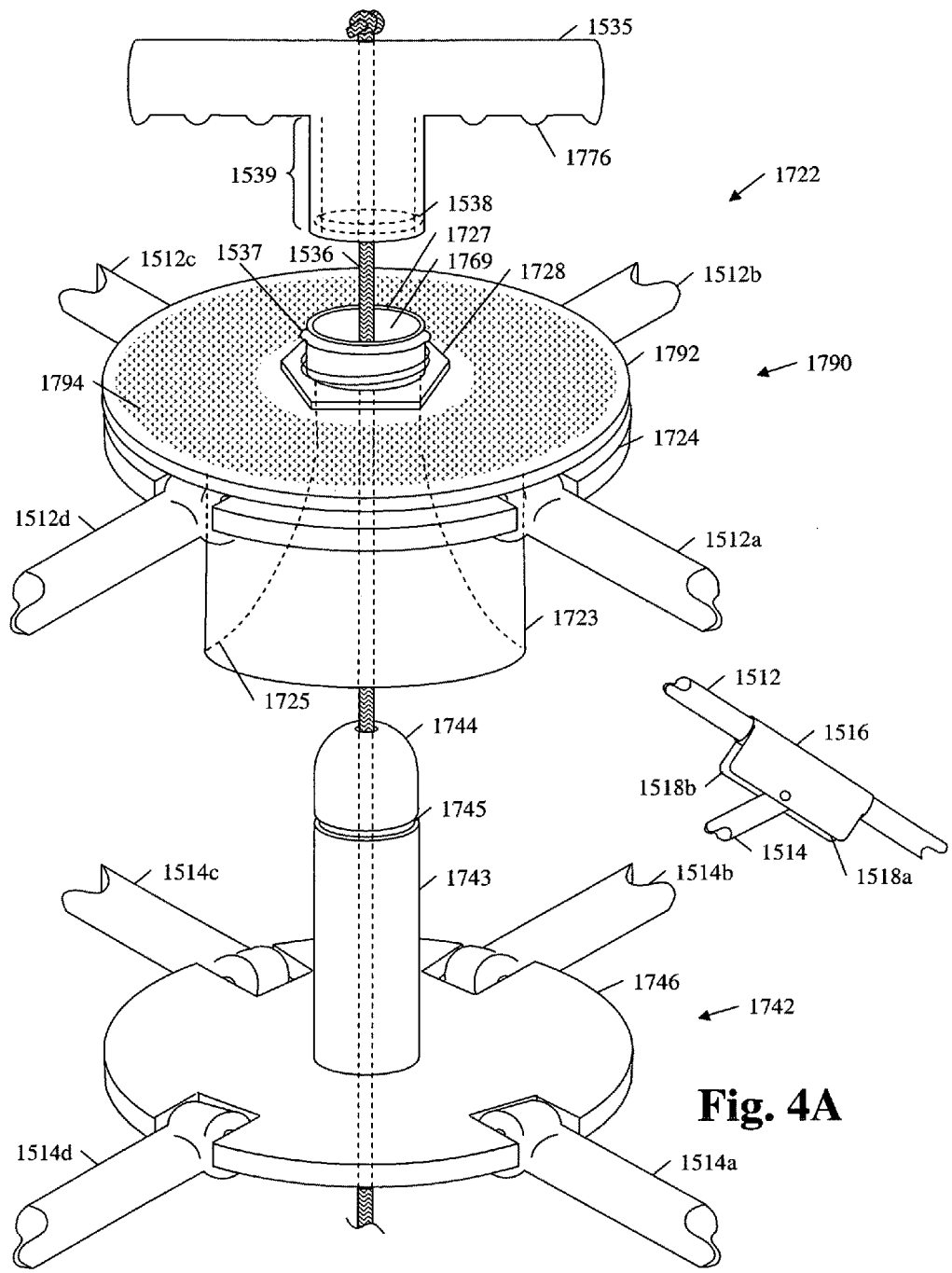
FIG. 4D shows a round wire clip 1717 embodiment of the safety clip 1715 (FIG. 4C) made with round spring wire as is commonly known.
FIG. 4E shows a rectangular wire clip 1718 embodiment of the safety clip 1715 made with rectangular spring wire, which has a more securely mating safety clip edge 1716, than the round wire clip 1717.
Figure 4B:
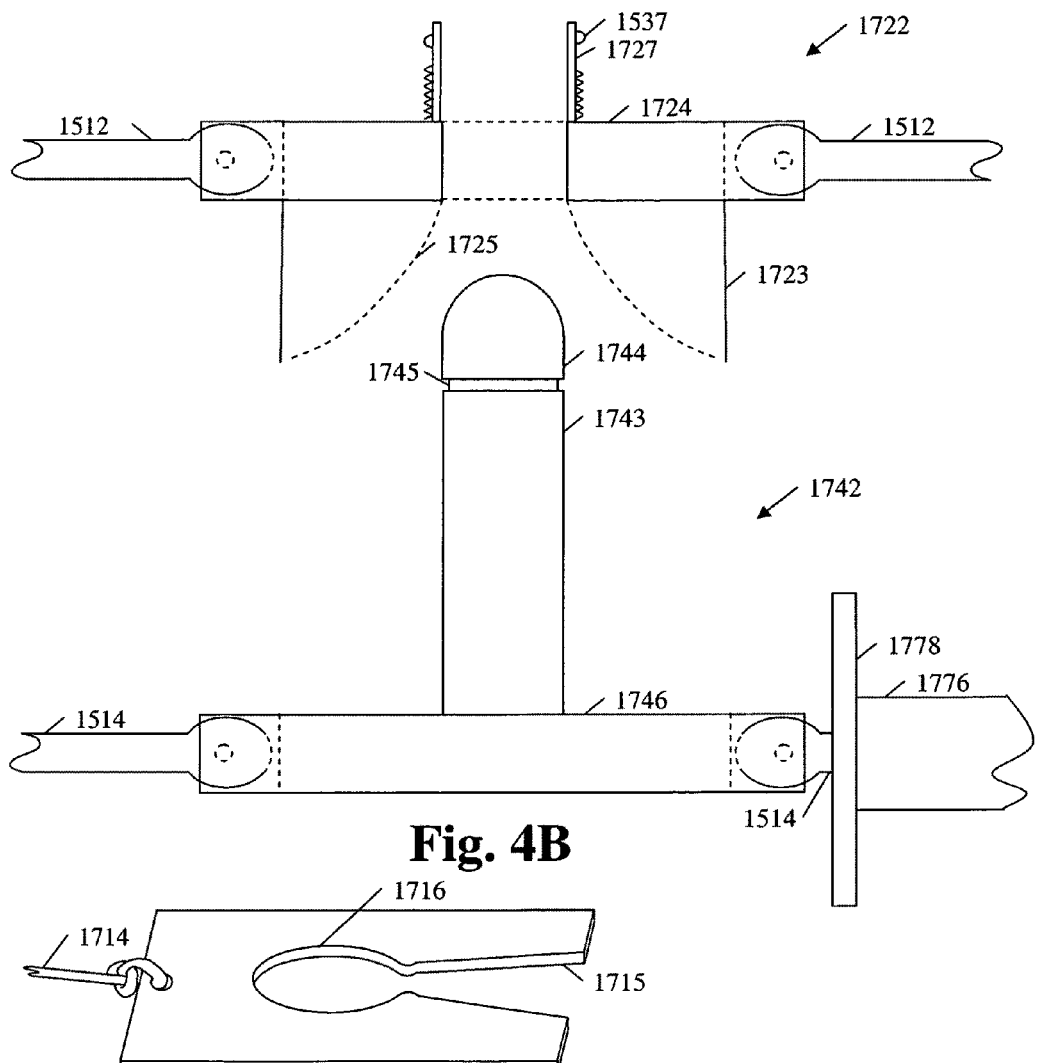
Figure 4C:
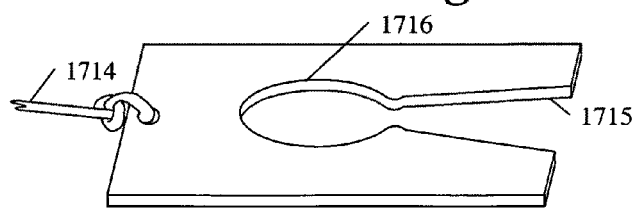

However the embodiment of a safety clip 1715 shown in FIG. 4C is currently preferred because it a larger flat surface area making it more visible to the operator and easier to grasp. Further, this embodiment could be colored orange or red such that the operator would be less likely to forget to apply the safety means. An alternative safety means, namely a safety strap 1705 is discussed below in relation to FIG. 12D through FIG. 12F.

Figure 5A:
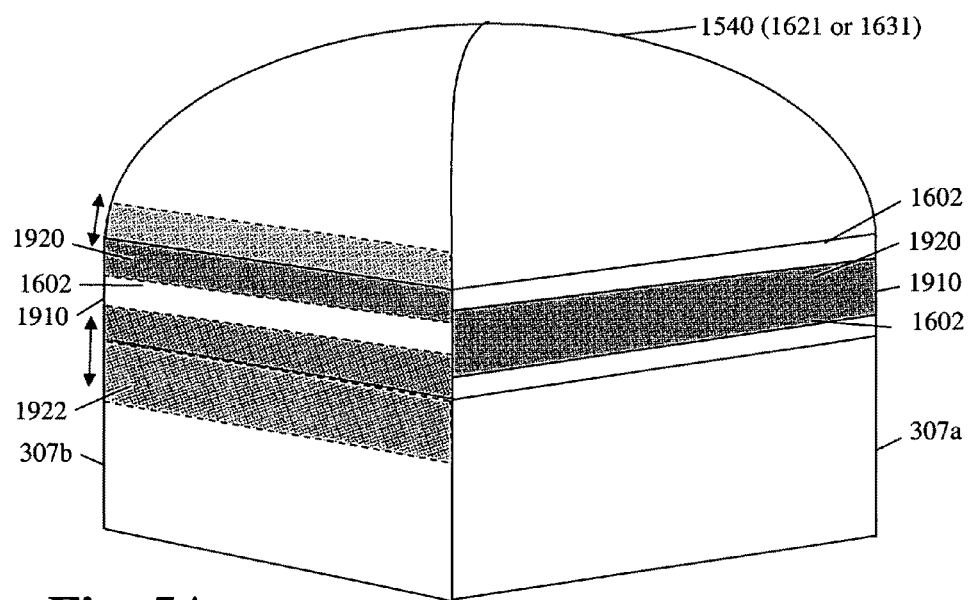
Figure 5B:
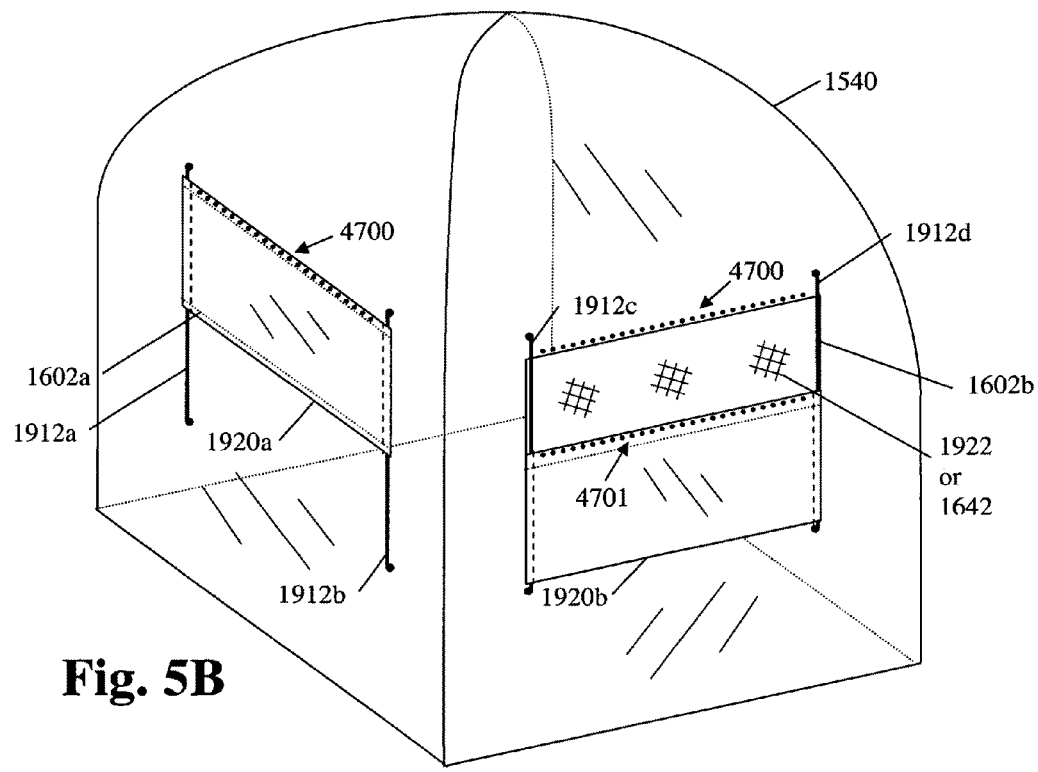

FIG. 5A and FIG. 5B

FIG. 5A shows a covered blind 1540 (1621 or 1631) with vertical guyline modules (1910, as previously disclosed in the related applications, e.g. the Ser. No. 11/155,398 application). The panels 1920 and 1922 can slide past each other because each is attached on each side by a different guyline 1912 (FIG. 5B). The operator can position the panels to cover the opening 1602 as shown on the right (with blackout panel 1920) or with a portion of the opening 1602 covered by one panel (e.g. the blackout panel 1920 on the left) and with another portion covered by the other panel (e.g. the see-through panel 1922 on the left). Note that the panels can slide behind the cover 1540 (or 942) above or the curtain 300 (or skirt 2010, not shown) below because of the novel features of the modular systems. Horizontally guylines were previous disclosed as well.

FIG. 5B shows embodiments of guylines 1912 attached to the walls of the cover skin 1540. Guylines in the walls help maintain the wall tension that helps keep the walls taut and reduce motion or noise that may be detectable by wildlife. FIG. 5B illustrates two exemplary openings 1602a and 1602b, respectively in a cover 1540. A blackout panel 1920a slides vertically up and down over opening 1602a along guylines 1912a and 1912b and is held tightly in place by the novel use of a row of magnets 4700 at the edge of the opening 1602a. When in this closed position the wall tension is maintained through the blackout panel 1920a via the magnetic connection with the magnets 4700 as well as by the guylines 1912a and 1912b. A blackout panel 1920b also slides vertically up and down over opening 1602b along guylines 1912c and 1912d and is exemplary shown in the open position, revealing the see-through panel 1922 (or shoot-through panel 1642) which likewise is held tightly in place by the novel use of a row of magnets 4700 at the edge of the opening 1602b. A row of magnetic pieces 4701 is attached to, or in the hem of, the sliding panels (1920 or 1922) or the fixed shoot-through panel 1642. In the example on the right (i.e. over opening 1602b) the wall tension is always maintained via the magnetic connection with the row of magnets 4700 and corresponding rows of magnetic pieces 4701 as well as by the guylines 1912c and 1912d. Maintaining tension on the shoot-through panel 1642 also reduces the interference with the flight of an arrow, for example.

The magnetic connections, between magnets 4700 and magnetic pieces 4701, provide a novel method of maintaining tight cover skin on the walls of a blind, while allowing quiet operation of the windows. In this regard magnets are preferred over zippers 1633 and hook and loop fasteners 530 (shown in the related applications).

Figure 5C:
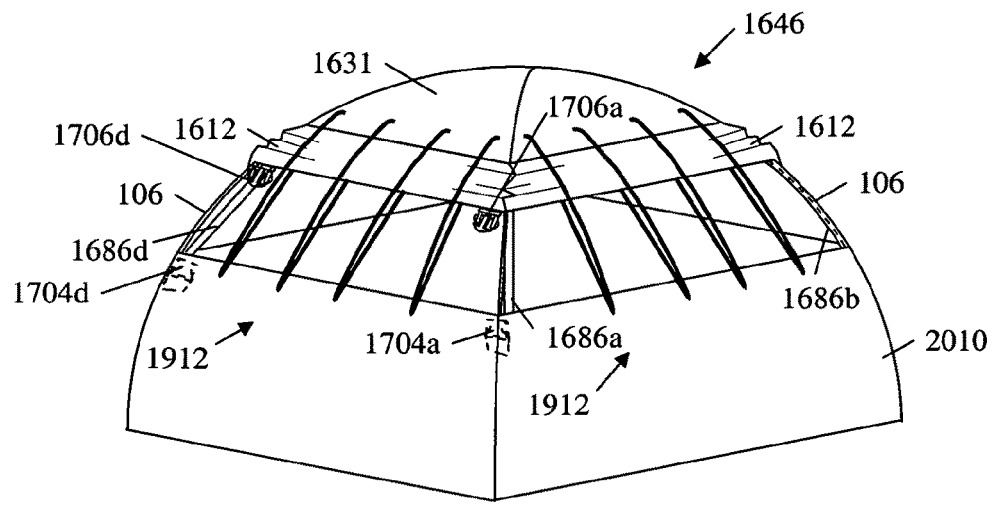
Figure 5D:
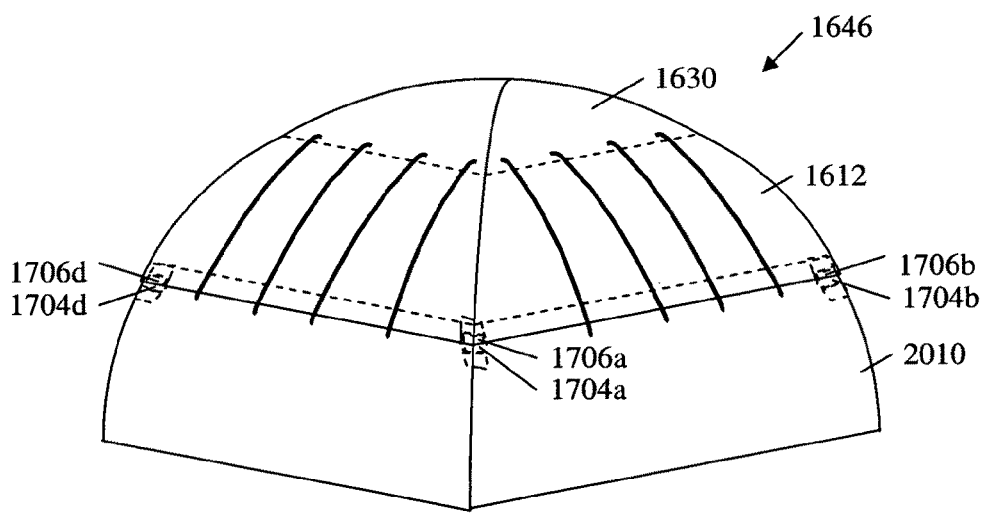

FIG. 5C Through FIG. 5D

FIG. 5C and FIG. 5D show operation of covers with guylines and windows.

FIG. 5C shows a quiet cover 1646 that embodies a novel three-tiered cover. The top tier comprises a cover cap 1631. The middle tier comprises a ring of windows 1612 that are optionally held open or closed with novel magnetic connections between magnets 4700 and magnetic pieces 4701 (not shown—discussed above). The bottom tier is a skirt 2010.

The cover cap 1631 is connected to the skirt 2010 along the corners with skirt strap 1686 (a-d). This is illustrated with skirt straps 1686a and 1686d.

This embodiment also shows the novel use vertical guylines 1912. In this embodiment the window 1612 material is sandwiched and held up between two sections of guylines 1912. A plurality of guylines are shown across the middle of each cover panel wall. Like the skirt strap 1686 in the corners, the guylines 1912 connect the material of the cover cap 1631 to the material skirt 2010, and thus help to maintain the skin tightening wall tension, even when one or more of the windows 1612 are open. The guylines 1912 also sandwich the material of the windows 1612 so that it does not flutter in the wind.

The bottom corners of the middle tier windows 1612 of the quiet cover 1646 are shown preferably, removably clipped to the skirt 2010 with clips, identified in each respective corner as receiving clips 1704 (a-d) and inserting clips 1706 (a-d). These clips help maintain the wall tension which keeps the blind cover skin taut.

FIG. 5D shows the embodiment of FIG. 5C with each of the visible windows pulled down and each of the corner clips connected.

Alternatively, the windows 1612 or panels (1910 or 1920, such as in FIG. 5A and FIG. 5B) can be attached to straps with adjustable buckles that hold the window or panel material in place.

FIG. 5E

Figure 5E:
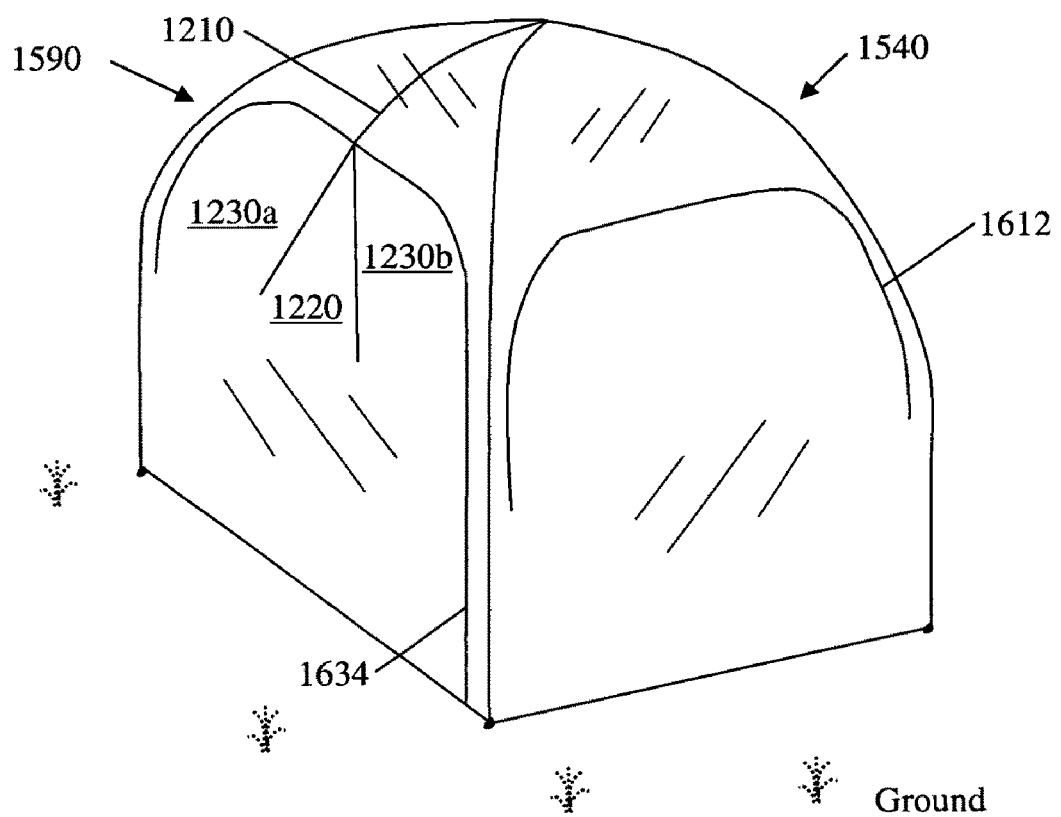

FIG. 5E shows an embodiment of the cover 1540 having a star window with a door 1634. Five window fasteners comprise a star-like layout 1590 with each window fastener being one of the five parts of the star. A top window fastener 1210 extends upward from the center. The star window layout 1590 comprises multiple sections between the fasteners, including a triangle section 1220, with a left section 1230a and a right section 1230b on either side. A simpler window 1612 is also shown.

Figure 6A:
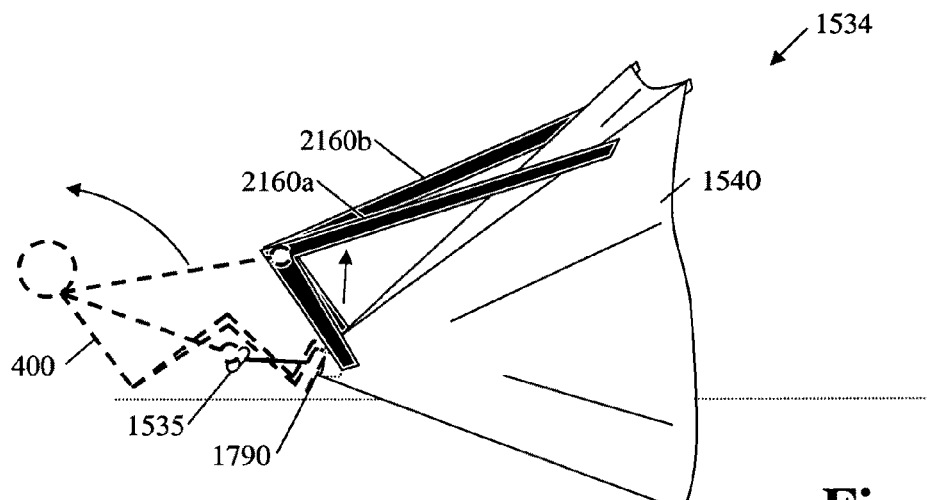
Figure 6B:
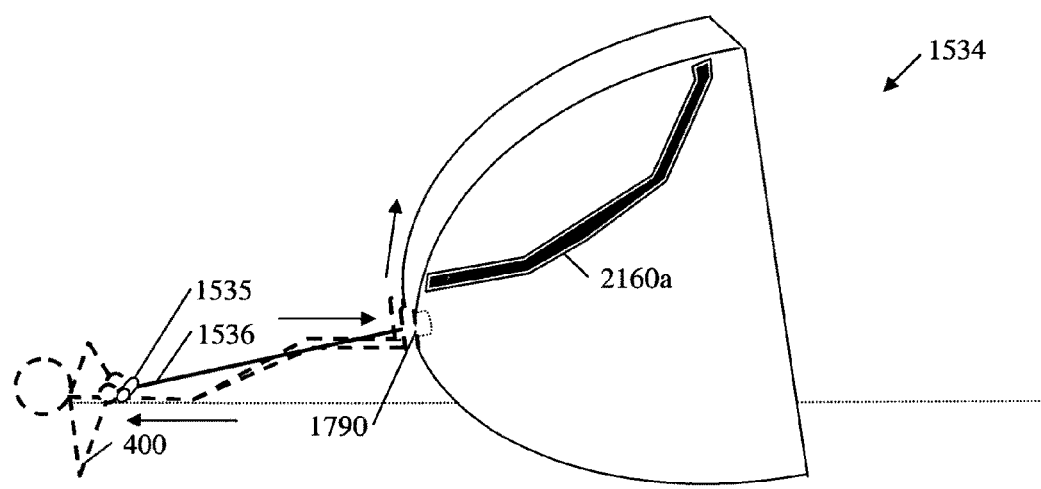

FIG. 6A and FIG. 6B

FIG. 6A and FIG. 6B show parts of a novel set up method of the fast setup frame 1534. This sequence is shown using the alternate spreading strap means comprising two spreading straps 2160 (a-b). The currently preferred wishbone strap 2162 (not shown here) could also be used substantially as described below.

As disclosed in more detail in the parent application, the operator 400 carries the blind using the spreading strap means, shown as the two spreading straps 2160, over a shoulder. Next the operator 400 places the collapsed blind on the ground.

The operator aligns his body along the axis of the blind and placing his feet against the apex of the blind preferably using a foot attaching means 1790. The operator applies an initial spreading force by lifting and spreading the spreading strap means until the blind begins to open. The operator 400 leans back as the fast setup frame 1534 begins to open. FIG. 6A shows the operator 400 holding the spreading strap means with one hand (either with both spreading straps 2160 in one hand, or preferably, with the one hand sliding down the wishbone strap 2162 (not shown) along the long strap). While the operator 400 continues to lean back, the other hand makes a smooth transition to the pull handle 1535. By leaning back, the blind continues to open and the operator 400 lifts the apex of the blind off the ground using the foot attaching means 1790.

FIG. 6B shows the operator 400 at the end of the seated row stroke. The pull cord 1536 has been moved the full range of motion necessary to engage the docking mechanism of the arch flattening means. The operator has released the spreading strap means (e.g. 2160, shown hanging free). The operator has grasped the pull handle 1535 during the stroke with both hands while continuing to lift the apex of the blind with the foot attaching means 1790. Using this method the operator has been able to apply a cover skin tightening force using a plurality of large muscle groups of the full body from the hands to the feet, whereby the blind is rapidly set up (in only a few seconds). The arch flattening means stores and transfers the force to the arch cover shafts 1512 (not shown). In turn, the arch cover shafts 1512 stretch the cover panels 1542 (not shown) with sufficient force that cover skin is held taut without substantial movement or noise detectable by wildlife. The force applied by the human body over the range of movement is greater than a force possible with just the arms and shoulders of the conventional methods.

It is during this transition from FIG. 21D to FIG. 21E that the second advantage of the flat walls in the various hinges is used. This transition puts a large stress on the frame as it tightens the skin. The mechanical stability provided by the tight hinges help align the docking mechanism.

FIG. 7A Through FIG. 7D

FIG. 7A through FIG. 7D show various features of an embodiment of a fast setup frame 1534 (FIG. 3B) shown exemplarily with the quiet cover 1646 and a novel self locking assembly 727 as a safety means.

Figure 4D:
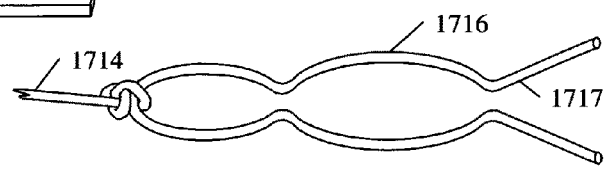
Figure 4E:
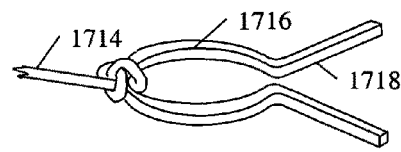
Figure 7A:
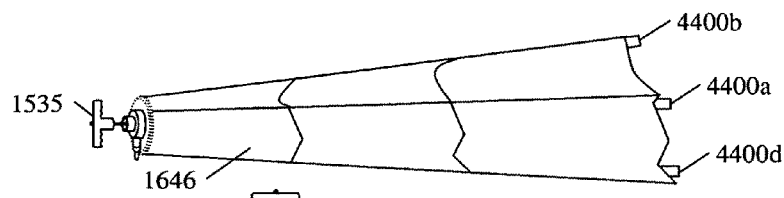
Figure 7B:
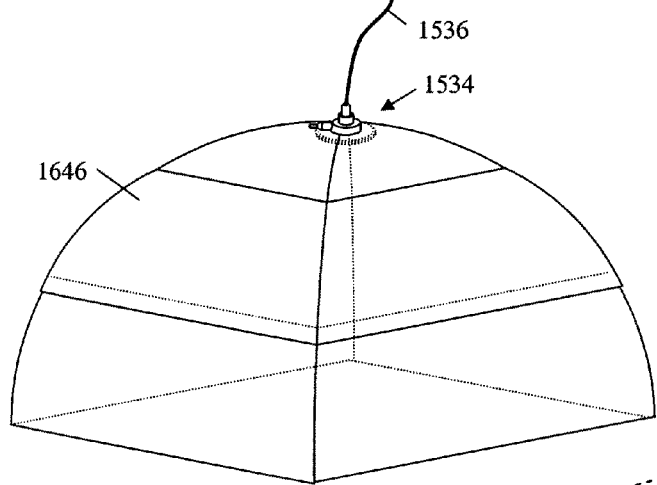
Figure 7C:
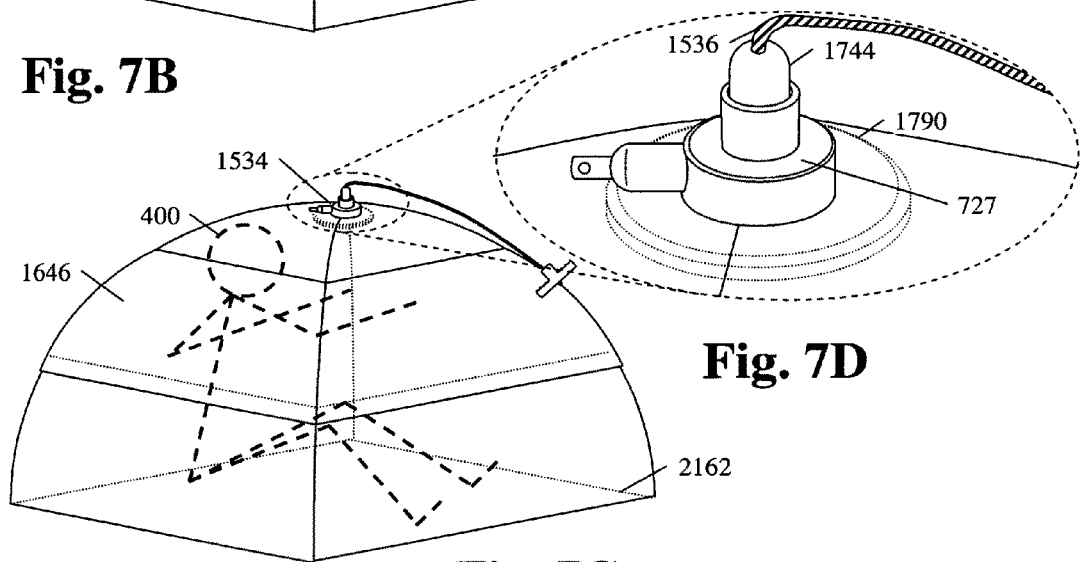
Figure 7D:
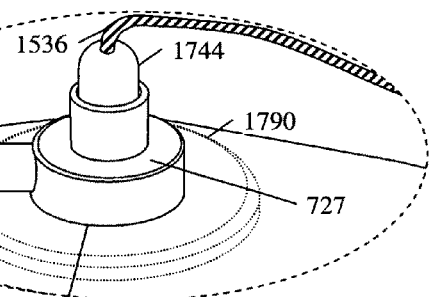

FIG. 7A shows the collapsed fast setup frame 1534 where the pull handle 1535 is necessarily close to the top of the blind. However when the fast setup frame 1534 is deployed the pull handle 1535 is used to pull the docking tip 1744 through the self locking assembly 727 via the pull cord 1536 (FIG. 7B). The self locking assembly 727 comprises a safety pin 715 which is spring loaded inside the horizontal housing (see magnified portion in FIG. 7D). The safety pin 715 is a safety means with similar function to those shown in FIG. 4C through FIG. 4E. When the safety groove 1745 slides through the dock conduit 1727 the safety pin 715 automatically engages the safety groove 1745 and locks the docking shaft 1743 in place, until the operator 400 (shown in FIG. 7S) comes outside the fast setup frame 1534 to pull the safety pin 715 prior to collapsing the frame. Thus, the safety pin 715 retains the docking shaft 1743 to prevent unplanned passage back through dock conduit 1727, which would result in an unplanned release of energy in the fast setup frame 1534.

Figure 14A:
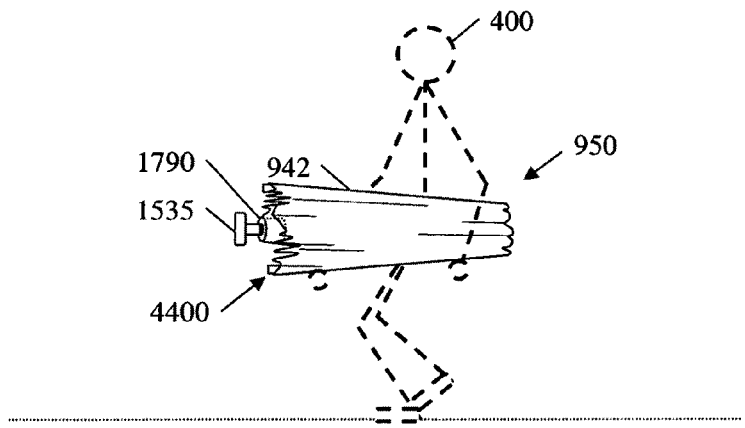
Figure 14B:
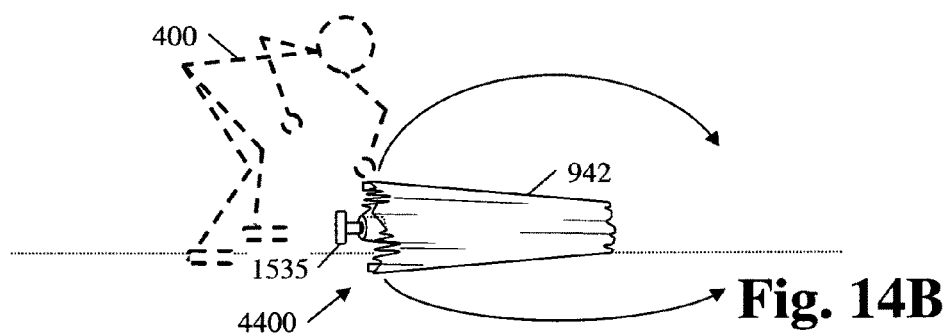
Figure 14C:
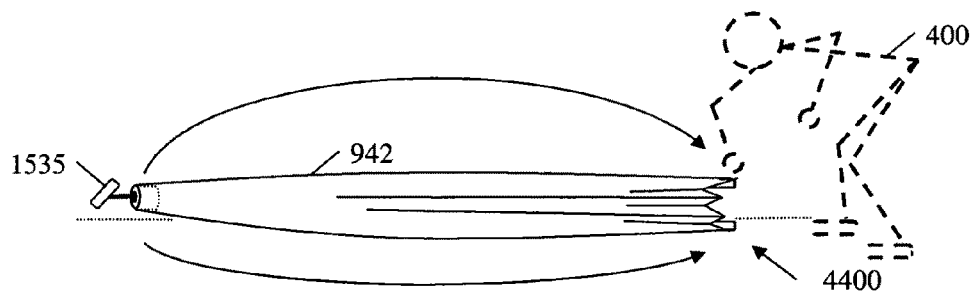
Figure 14D:
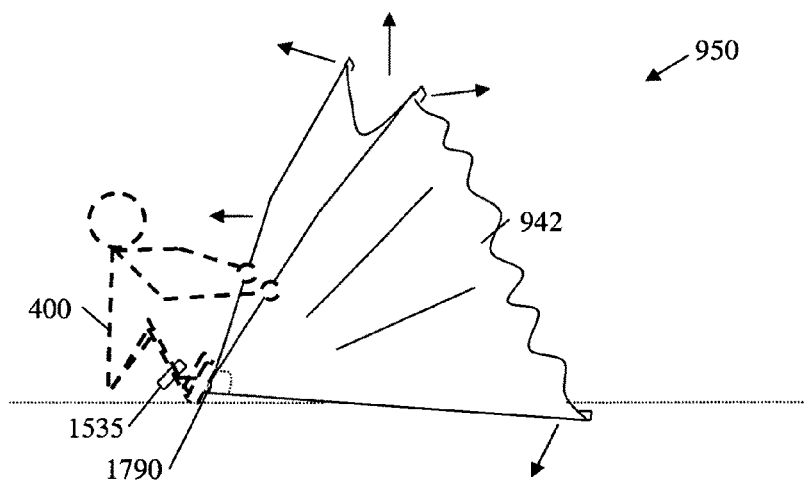
Figure 14E:
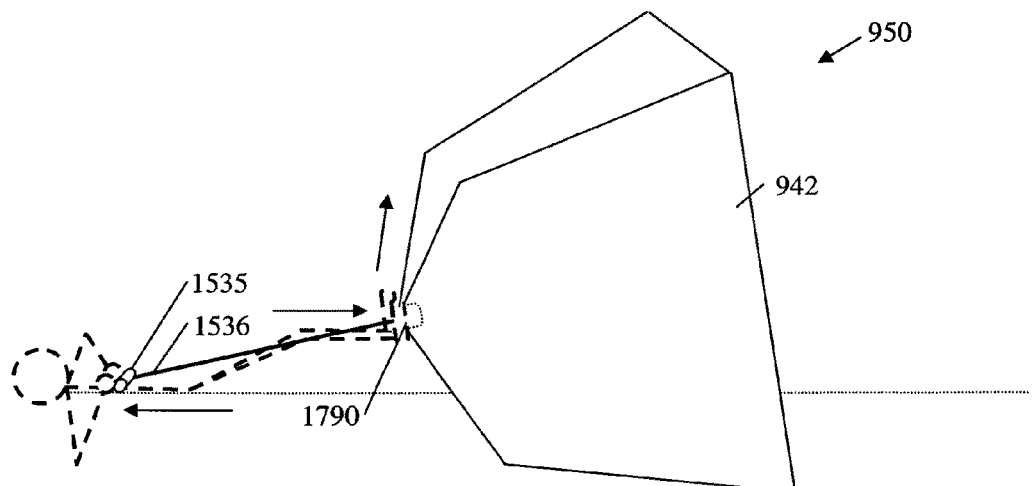
Figure 14F:
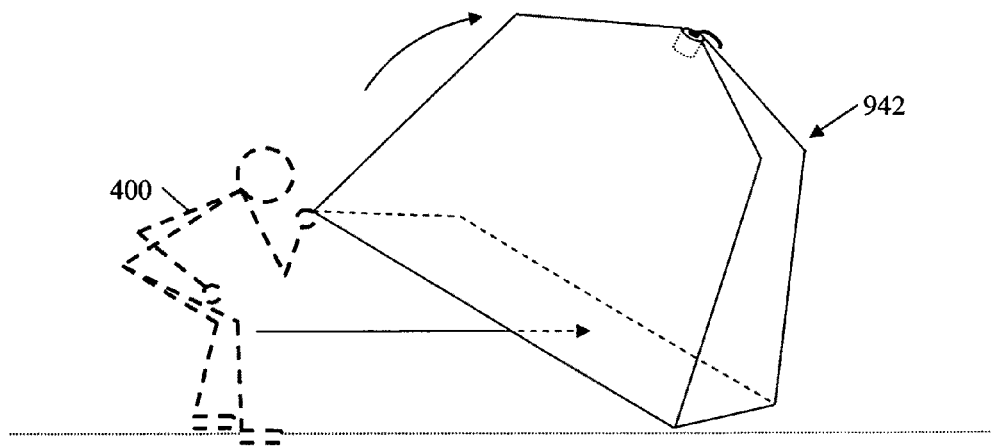
Figure 14G:
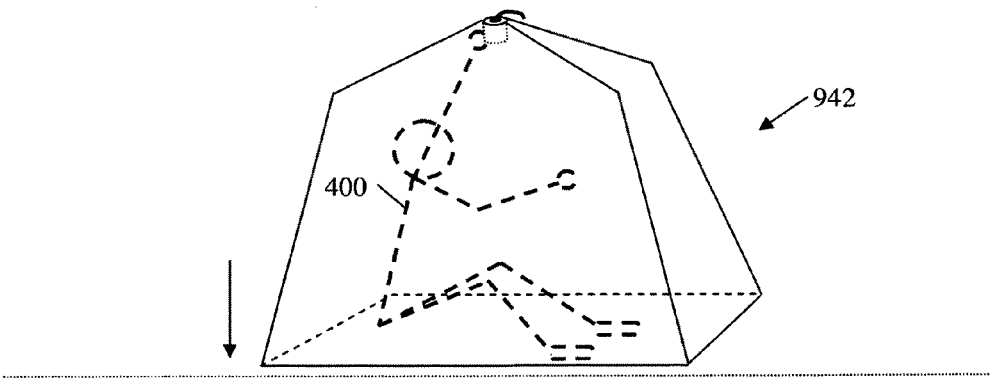
Figure 14H:
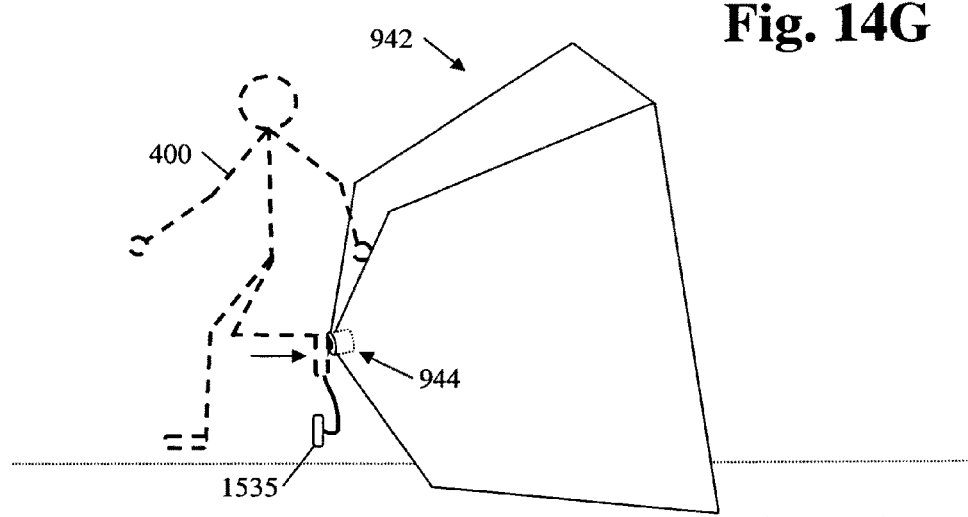

The advantages of the self locking assembly 727 are that the operator 400 does not risk forgetting to attach the safety means and that the operator must physically be outside the blind (i.e. away from the possible head injury hazard) when the frame is collapsed (similar to the position shown in FIG. 14H).

Figure 8A:
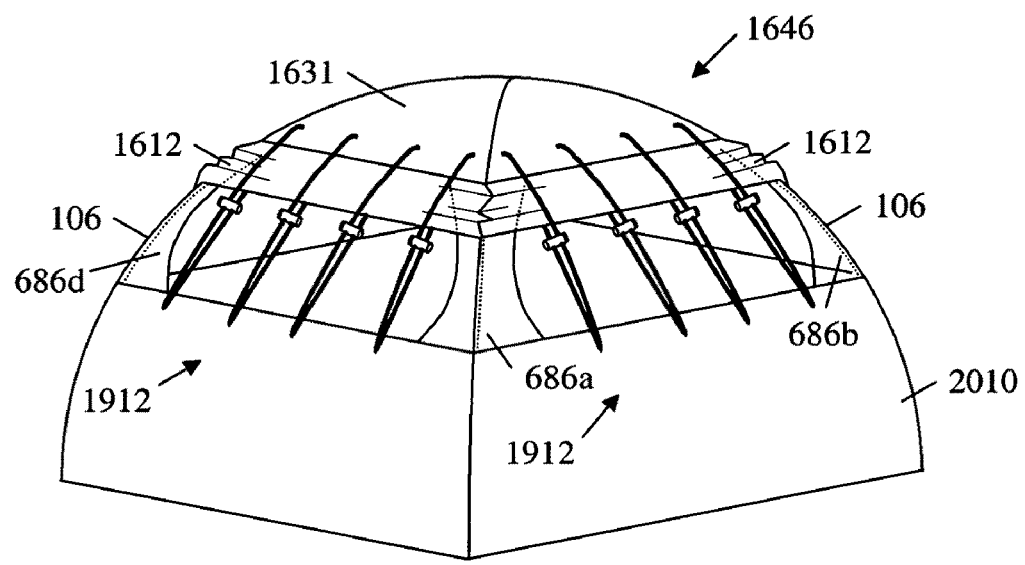
Figure 8B:
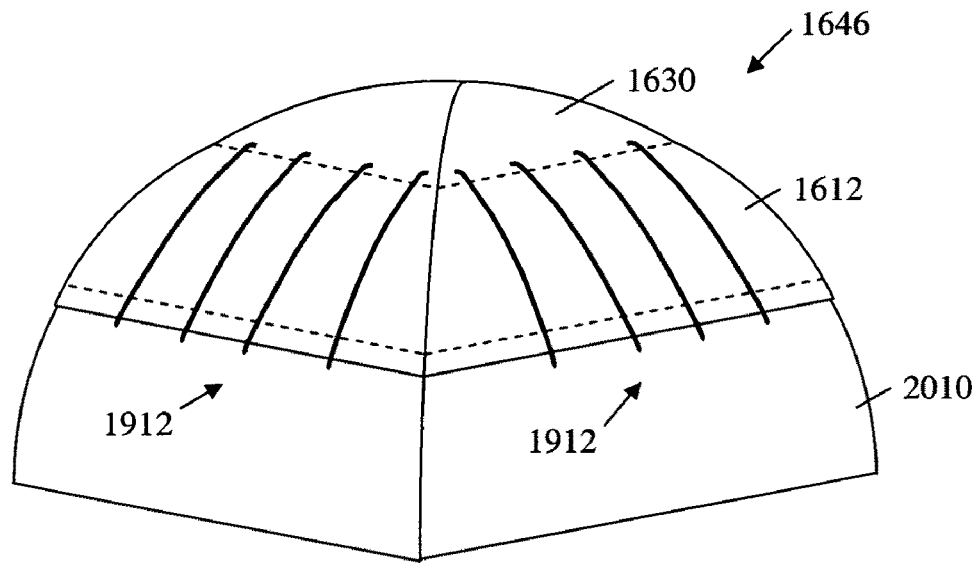

FIG. 8A and FIG. 8B

Figure 1A:
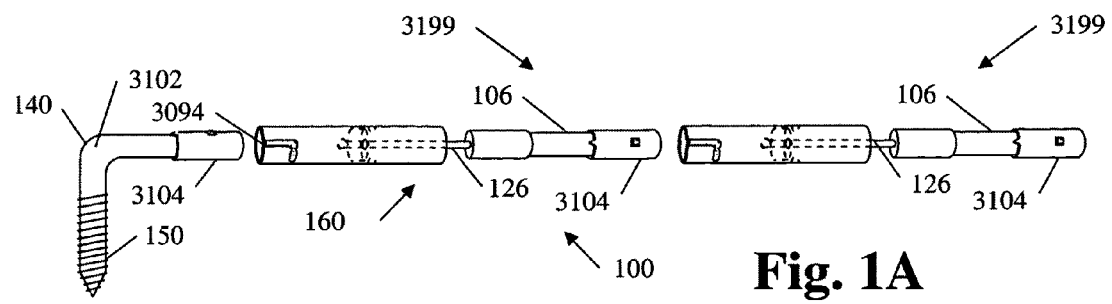
Figure 1B:
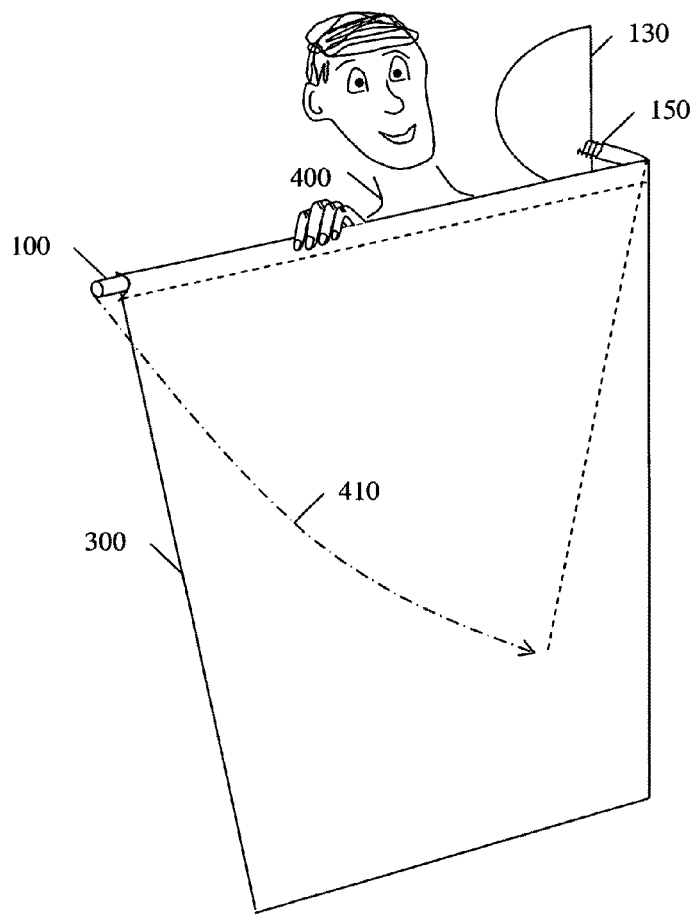
Figure 1C:
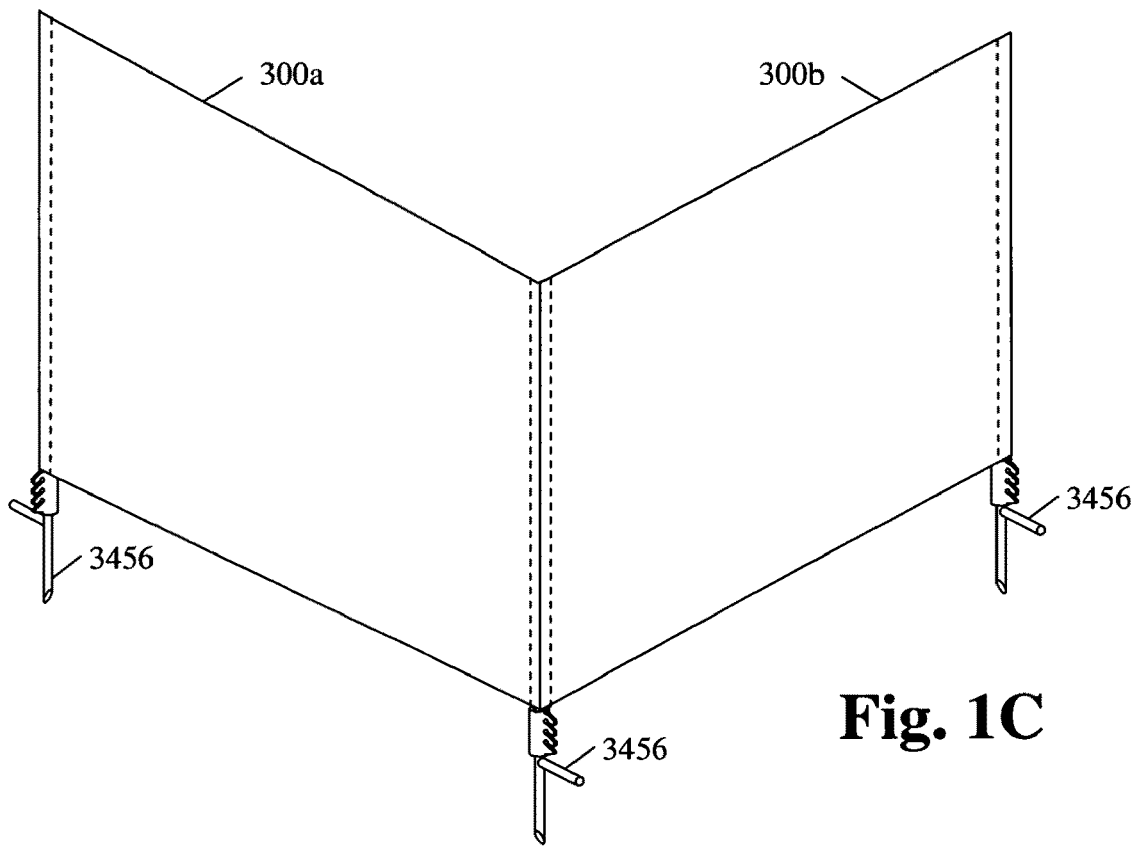
Figure 1D:
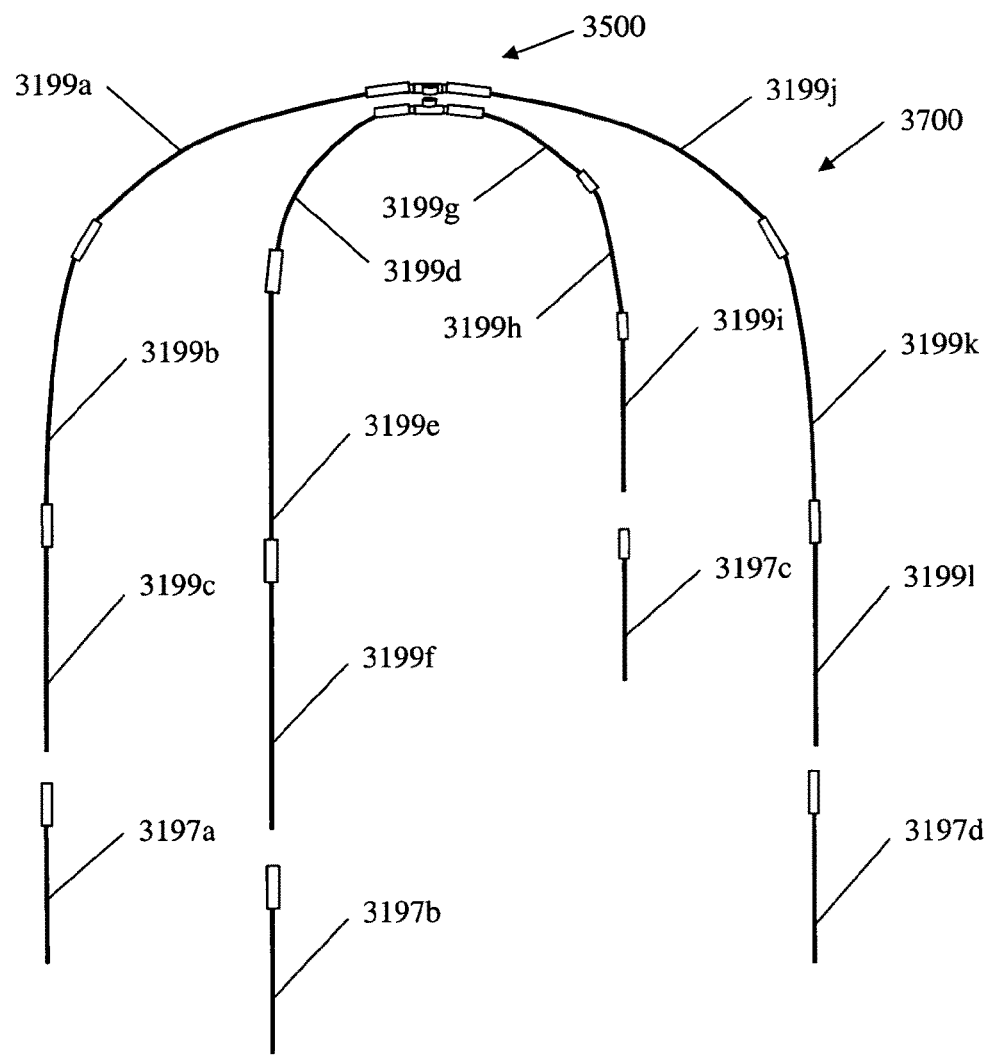
Figure 2A:
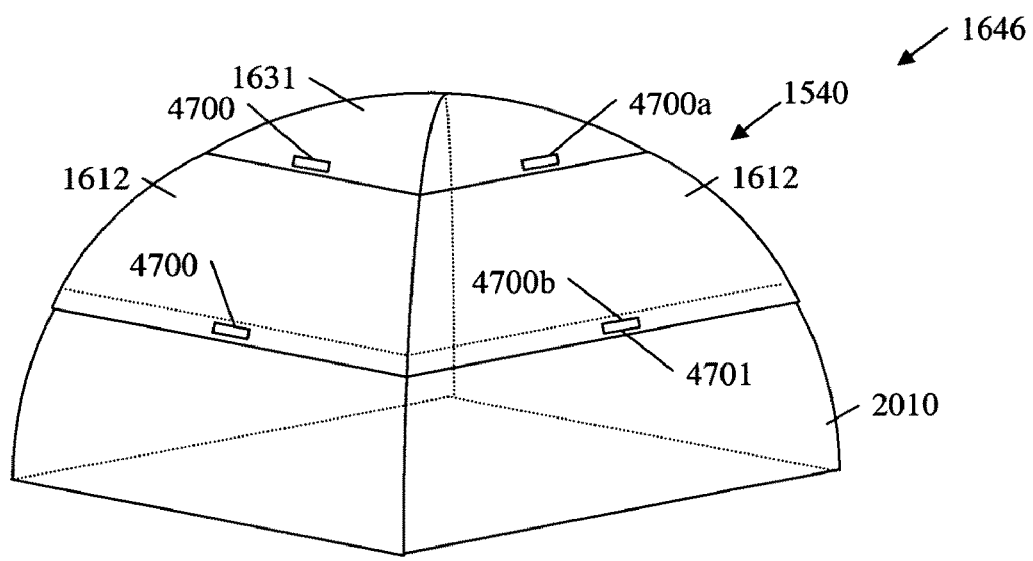
Figure 2B:
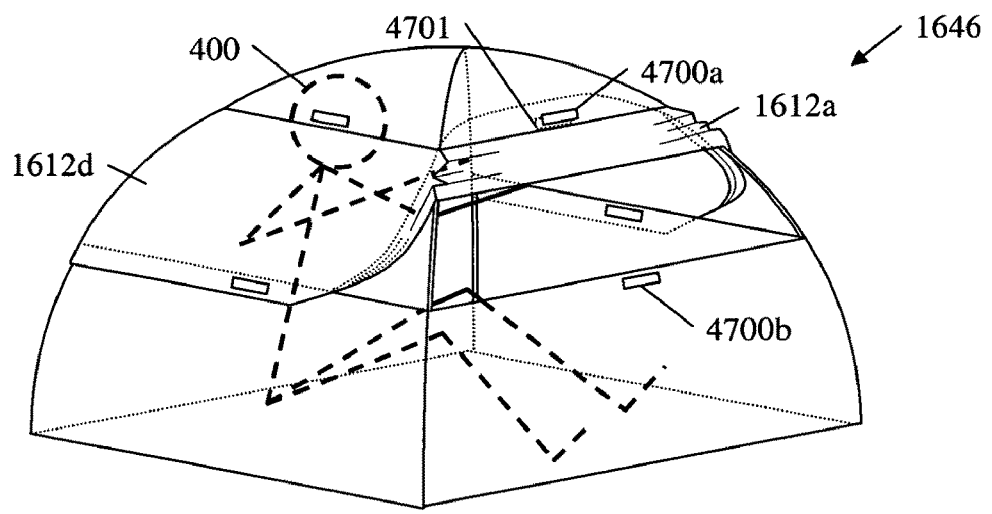

FIG. 8A shows a quiet cover 1646 that embodies a novel three-tiered cover (previously shown with fewer features in the embodiment of FIG. 2A). The top tier comprises a cover cap 1631. The middle tier comprises a ring of windows 1612. The bottom tier is a skirt 2010.

The cover cap 1631 is connected to the skirt 2010 along the corners with corner sections 686 (*a-d*). Similar to the structure shown in FIG. 5B, the corner sections provide for taut skin.

This embodiment also shows the novel use vertical guylines 1912. Unlike FIG. 5A and FIG. 5B, where the sliding panels 1920 or 1922 are attached to the guylines 1912, in this embodiment the window 1612 material is sandwiched and held up between two sections of guylines 1912. A plurality of guylines are shown across the middle of each cover panel wall. Like the corner section 686 in the corners, the guylines 1912 connect the material of the cover cap 1631 to the material of skirt 2010, and thus help to maintain the skin tightening wall tension, even when one or more of the windows 1612 are open. The guylines 1912 also sandwich the material of the windows 1612 so that it does not flutter in the wind.

FIG. 8B shows the embodiment of FIG. 8A with each of the visible windows pulled down.

Figure 8C:
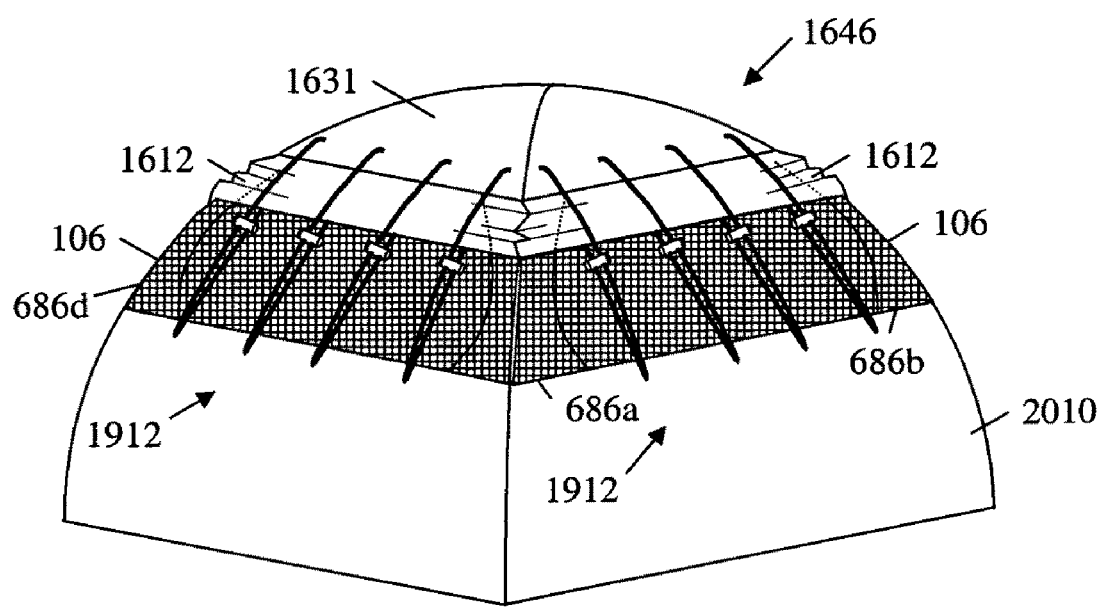

FIG. 8C shows the embodiment of FIG. 8A further showing see-through panels 1922, similar to the see through panels 1992 shown and explained with reference to FIG. 2A and FIG. 5A.

Improved Designs

Although the enclosed blinds and tents with frames comprising arches shown earlier have had good results there are some problems with these structures. While the arch is high in the middle, as the user moves toward the walls, there is reduced headroom. In many situations, the user does not want their head in the middle, rather they want their head closer to the walls. For example a pair of hunters will sit near the back wall in respective corners so that they each have room to move their equipment (e.g. rifle, bow, or camera) and to avoid direct sunlight reflecting off their faces. If more than one person is in a blind or tent they both can't be in the middle. For example, two warfighters will want to be able to stand up, kneel, or sit on their respective sides of a tent, rather than moving to the middle to get more headroom.

While the arch structure previously disclosed for tightening skin on a blind has had great success, there is concern about the amount of energy stored in the structure and force the would be exerted by the lower hub should the energy be unexpectedly be released while a person was inside. FIGS. 9A through 16D relate to improvements over our previous embodiments, including embodiments with an angular frame which provide improved headroom and reduce the range of motion required to release the skin tightening stored energy.

FIG. 9A Through FIG. 9E

Figure 9A:
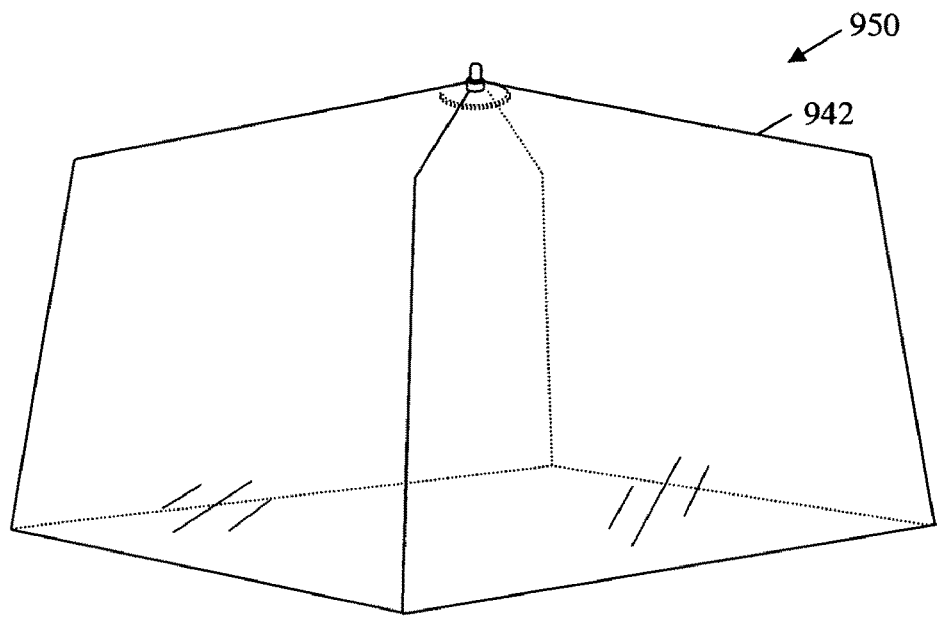

FIG. 9A illustrates an embodiment of a fully deployed and erected angular frame 950 covered by an angular cover 942. In this embodiment as shown, the collapsible, quick popup angular frame results in a structure that has improved headroom near the walls of the blind or tent.

The advantage of the angular frame 950 over the fast setup frame 1534 is that fiberglass rods bent under tension over time eventually break especially if heated and cooled by changes in sunlight and outside temperature. The novel angular frame 950 does not require the fiberglass to be under as much tension therefore prolonging the life of the frame.

FIG. 9B through FIG. 9E show various aspects of the operation of an angular frame 950 used by the angular shelter shown in FIG. 9A.

Figure 9B:
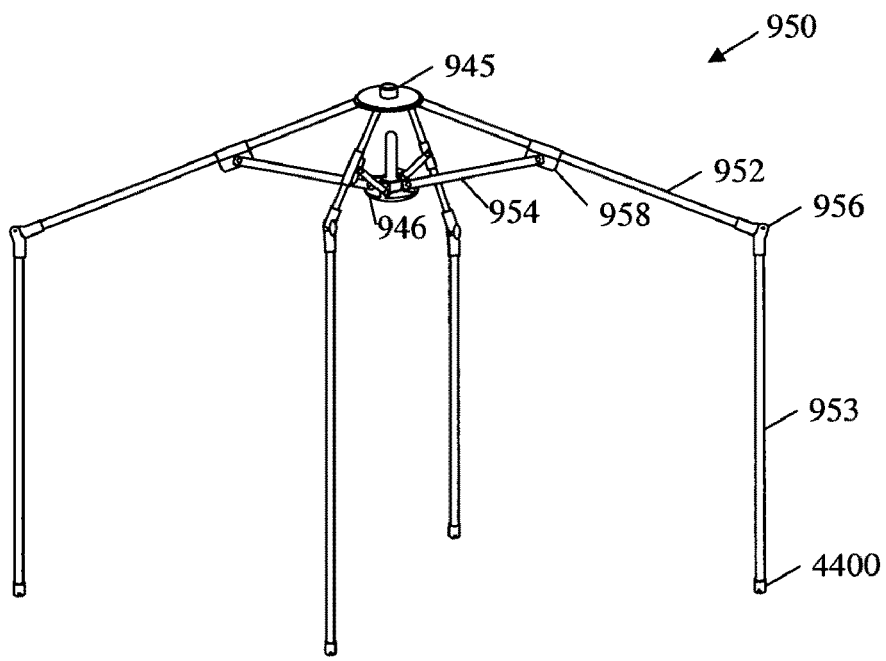

FIG. 9B show a novel angular frame 950 comprising angular cover shafts 952 (*a-d*) and lower shafts 953 (*a-d*) connected together by angular hinges 956 (*a-d*). A novel upper plate 945 connects the angular cover shafts 952 (*a-d*). Exemplary details of the upper plate 945 and lower plate 946 interconnections are detailed for various embodiments explained in reference to FIG. 12A, FIGS. 16B and 16D. Each angular cover shaft 952 (*a-d*) is shown connected to respective stretcher shafts 954 (*a-d*) at shaft plates 958 (*a-d*) (see FIGS. 12G, 12H and 12I for exemplary details). Stretcher shafts 954 (*a-d*) also connect to a novel lower plate 946.

Figure 9C:
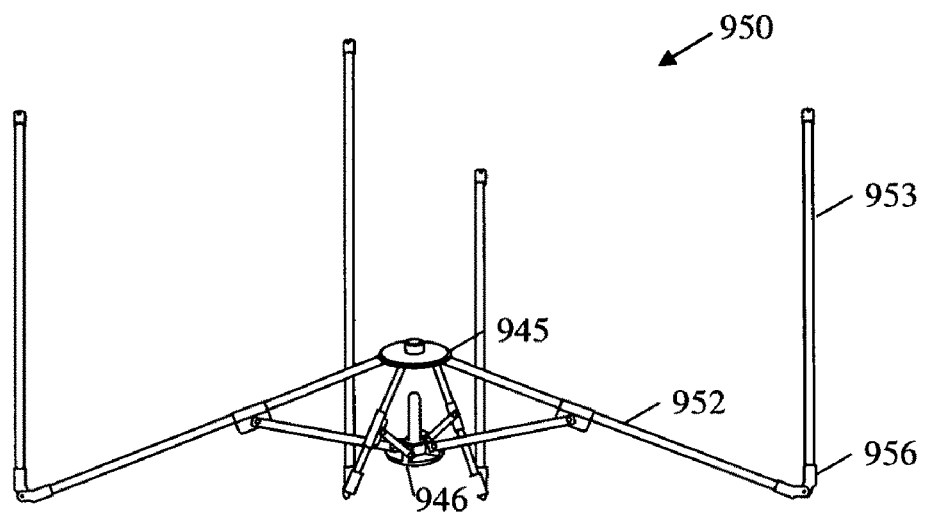

FIG. 9C illustrates that the angular frame can be folded to about half the length of the angular cover shafts 952 to collapse into a narrow bundle. When deployed the plates (945 and 946) are brought together, opening the angular frame 950. The angular hinge 956 allows the connecting lower shaft 953 to rotate from parallel to a predetermined angle.

Figure 9D:
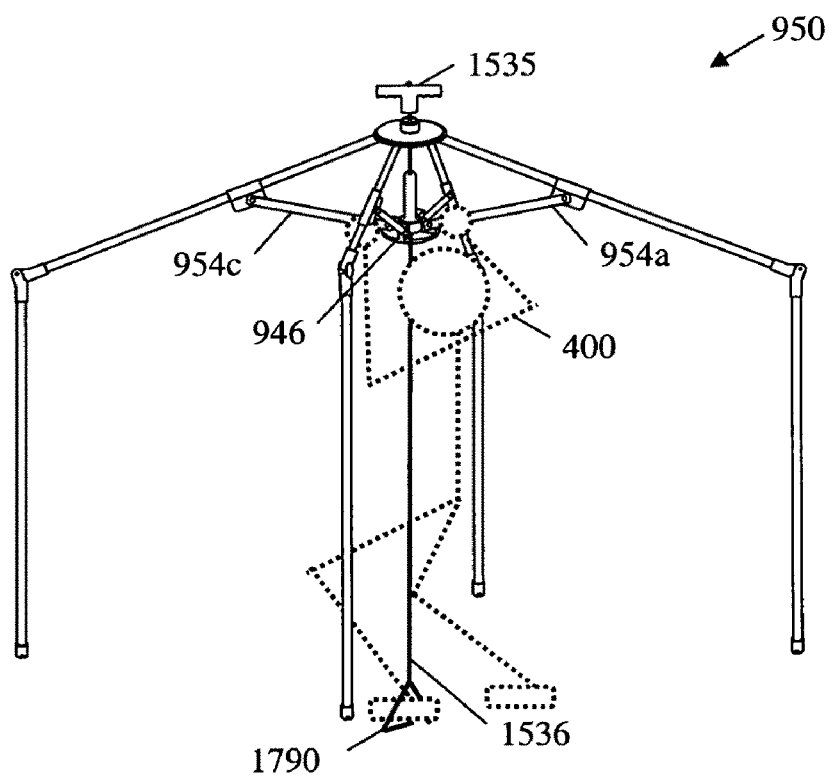

FIG. 9D illustrates the lower shafts 953 rotated downward to the predetermined angle. FIG. 9D also illustrates a novel method of deploying the angular frame 950 using the full body strength of the operator 400. A pull cord 1536 preferably is attached at one end to a pull handle 1535. In this method the pull cord 1536 is pulled through the lower plate 946 and attached to a foot attaching means 1790. The operator 400 presses up on the lower plate 946 while using the large muscles of the back and legs through a foot to apply a skin tightening force. The force of the body is transferred via the pull cord 1536 to the upper plate 945.

Figure 9E:
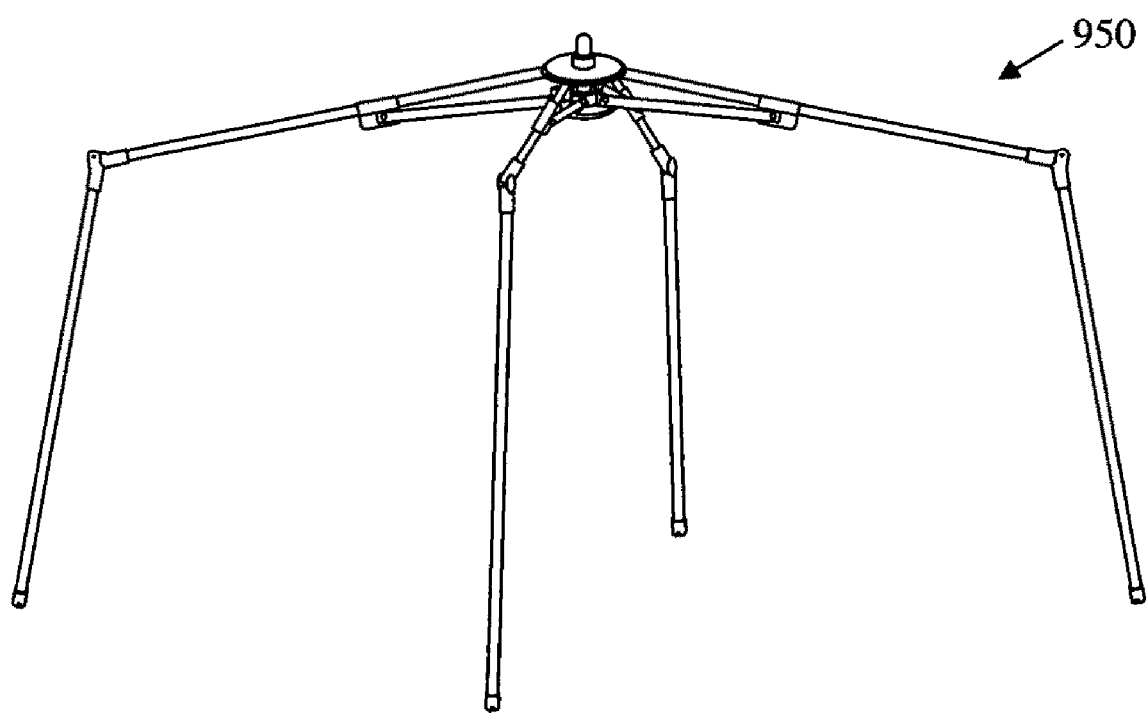

FIG. 9E illustrates a fully deployed and erected angular frame 950.

In FIG. 9B through 9E the angular cover 942 was not shown so that the operation of the angular frame 950 could be illustrated.

Figure 10A:
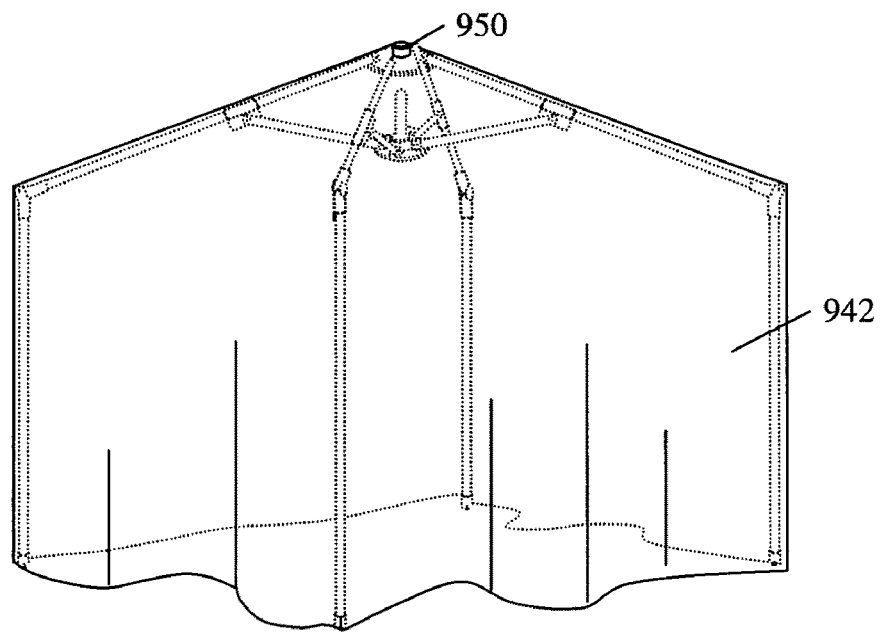
Figure 10B:
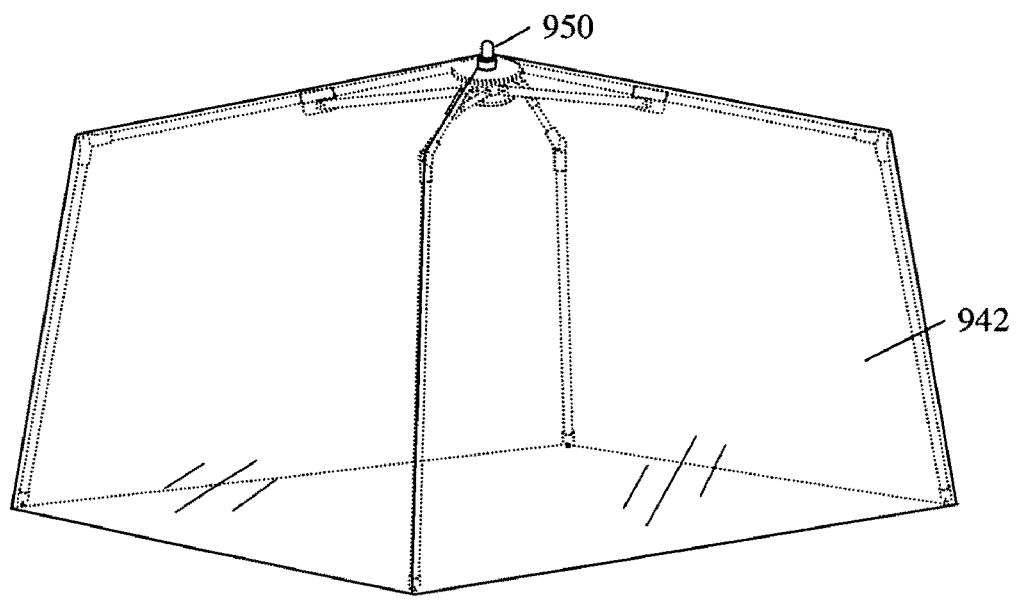
Figure 10C:
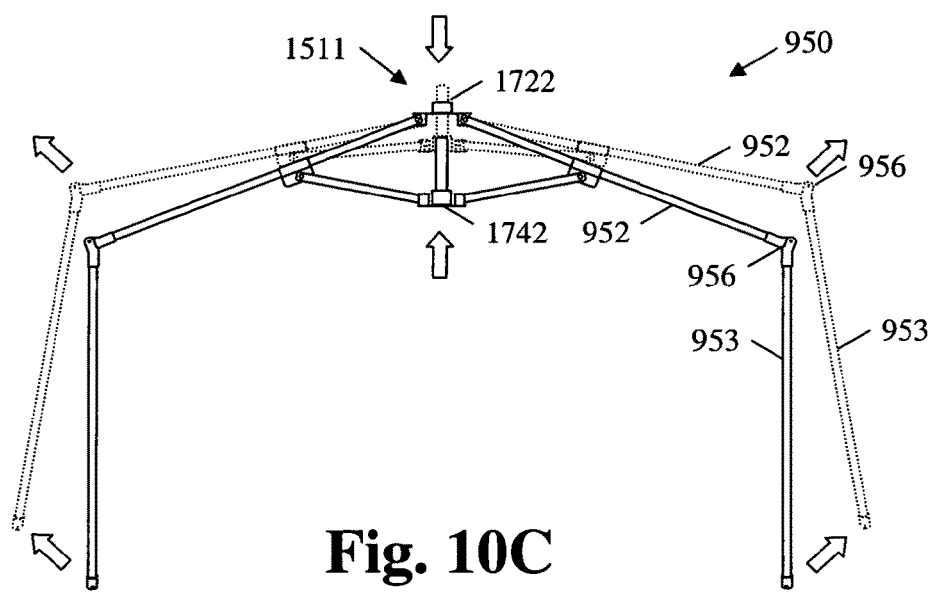

FIG. 10A Through FIG. 10C

FIG. 10A illustrates the angular frame 950 in an upright position just before the plates (945 and 1946) are engaged. The angular cover 942 is loose over the angular frame 950.

FIG. 10B illustrates a fully deployed angular frame 950. A small mechanical movement within the novel angular frame results in a significant outward and upward skin tightening force being applied throughout the angular cover 942 by the lower shafts 953 when deflected into the position as illustrated in FIG. 10C.

Figure 3A:
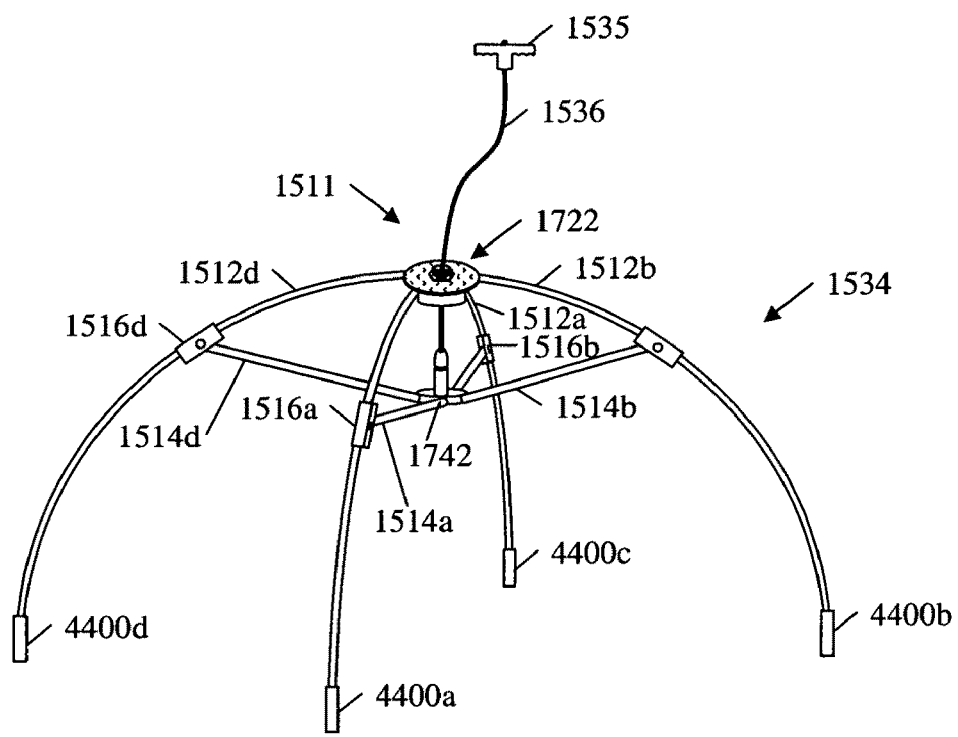
Figure 3B:
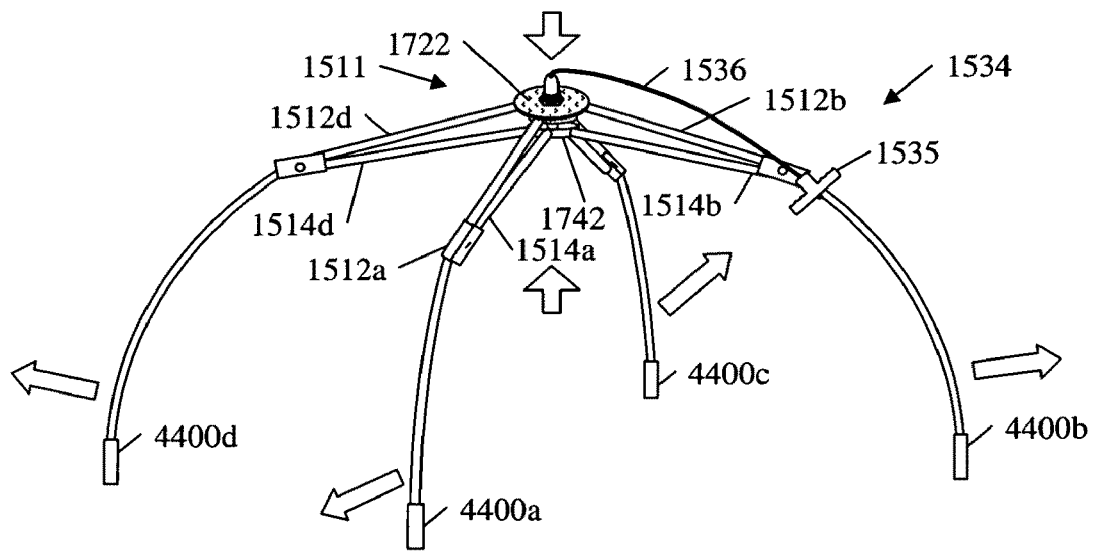
Figure 3C:
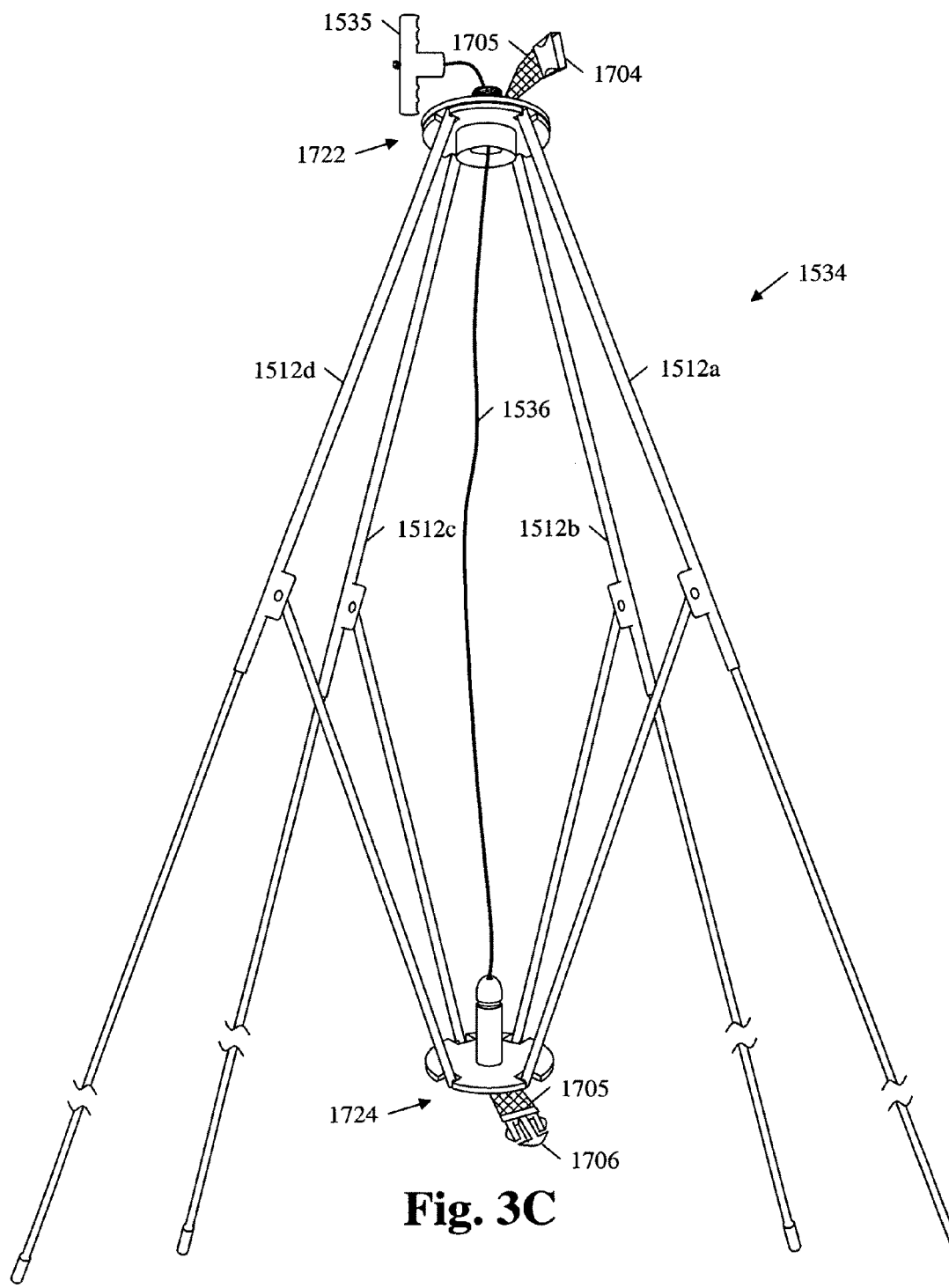

In contrast to the arched, fast setup frame 1534 (as shown in FIG. 3B) where the skin tightening force (as shown in FIG. 6B) is supplied by the bow of the half arch cover shafts 1512, the angular frame 950 provides a significant outward force on the lower shafts 953 by a mechanical rotation actuated by a relatively small shift in relative position of the lower plate 946 toward the upper plate 945.

FIG. 11A Through FIG. 11E

Figure 11A:
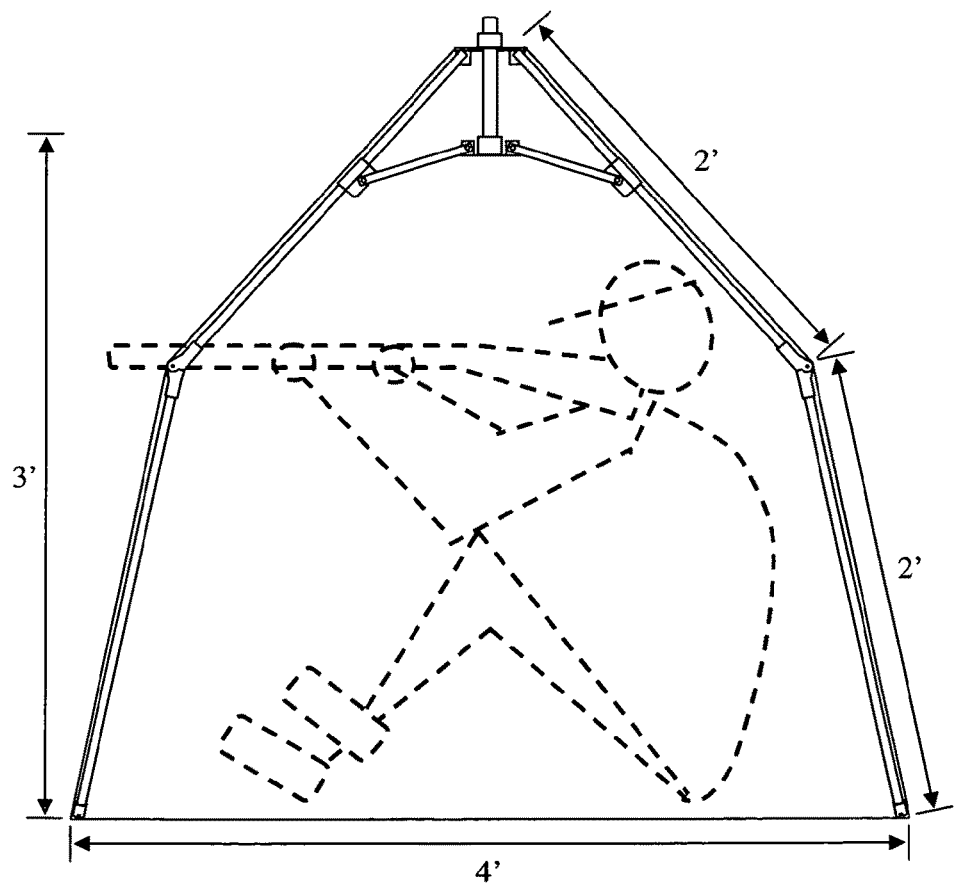

FIG. 11A shows a low profile embodiment of the angular frame 950 design for a single operator 400. The shafts 952 and 953 are both designed to be preferably about two feet long. This allows the collapsed blind to easily be carried on a backpack or waist pack. When deployed the blind provides about three feet of useful headroom. This allows a single operator to sit comfortable within the concealment and protection from sun, rain, snow, and wind provided by the blind. Note that for the single operator version the angle of the angular hinge 956 is more obtuse than for a more typical larger structure, e.g. as shown in FIG. 10C. The separation shaft 943 is longer in length to facilitate the shape of this single operator frame than would be needed for larger structures with flatter roofs, for example, such as shown in FIG. 10C.

Figure 11B:
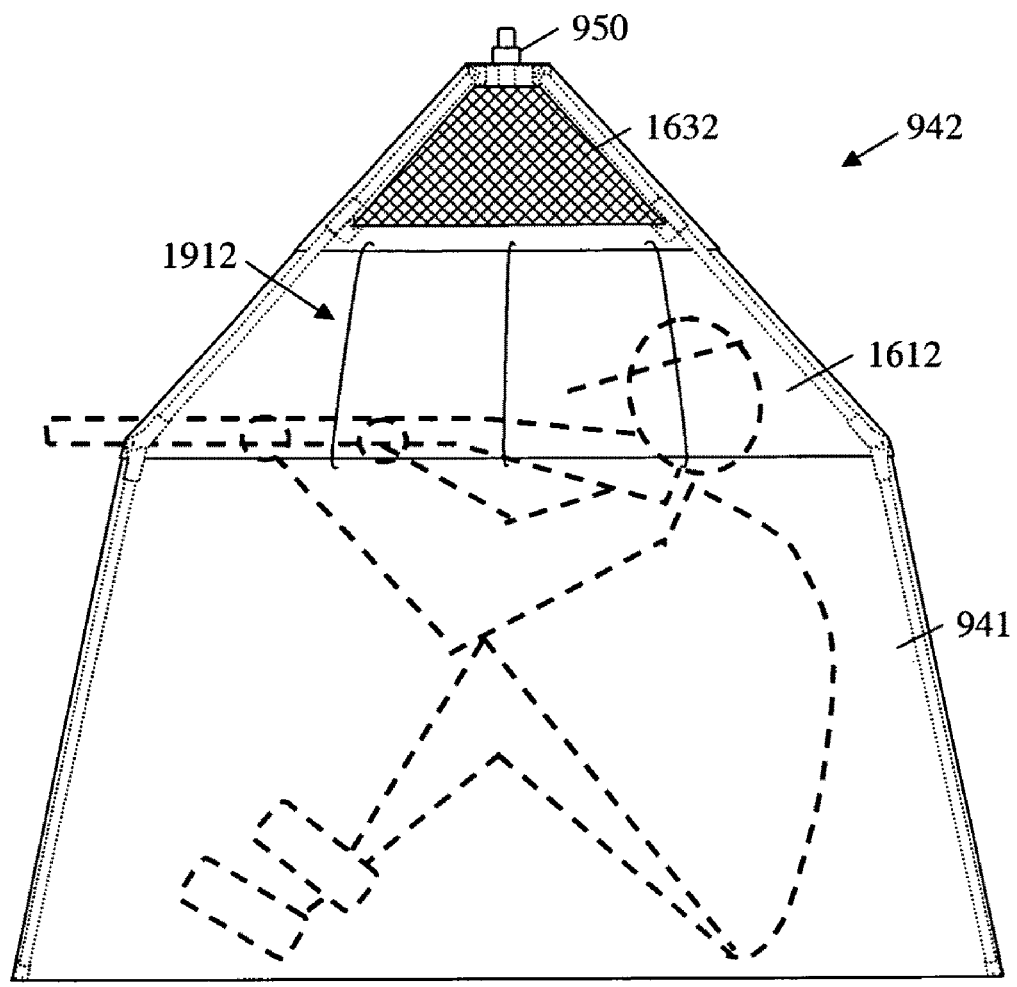

FIG. 11B shows an embodiment of an angular cover 942 having overhead window 1632 and cover window 1612 with guylines 1912.

Figure 11C:
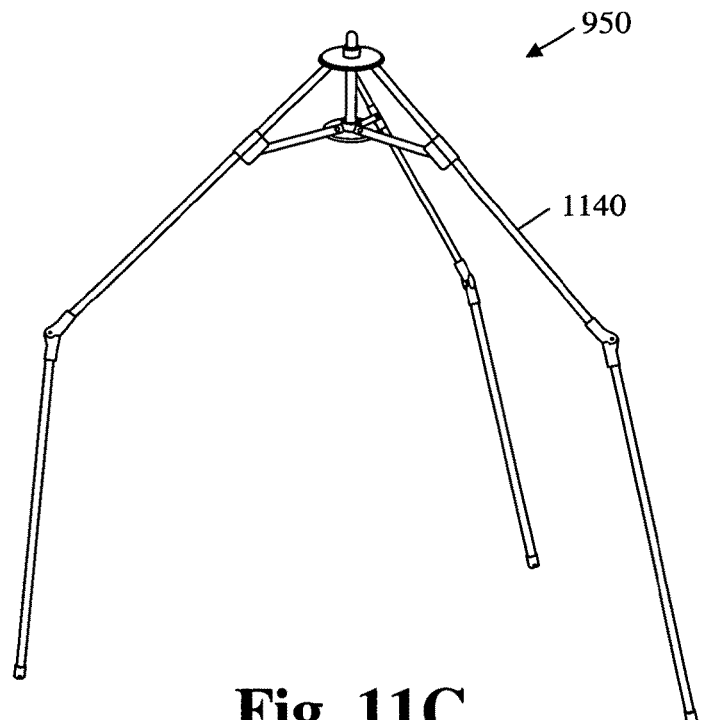

FIG. 11C shows an embodiment of the angular frame 950 comprising a three-legged angular frame 1140. Corresponding parts have been previously described. The shape of the plates and the location of the plate anchors 948 are modified accordingly.

Figure 11D:
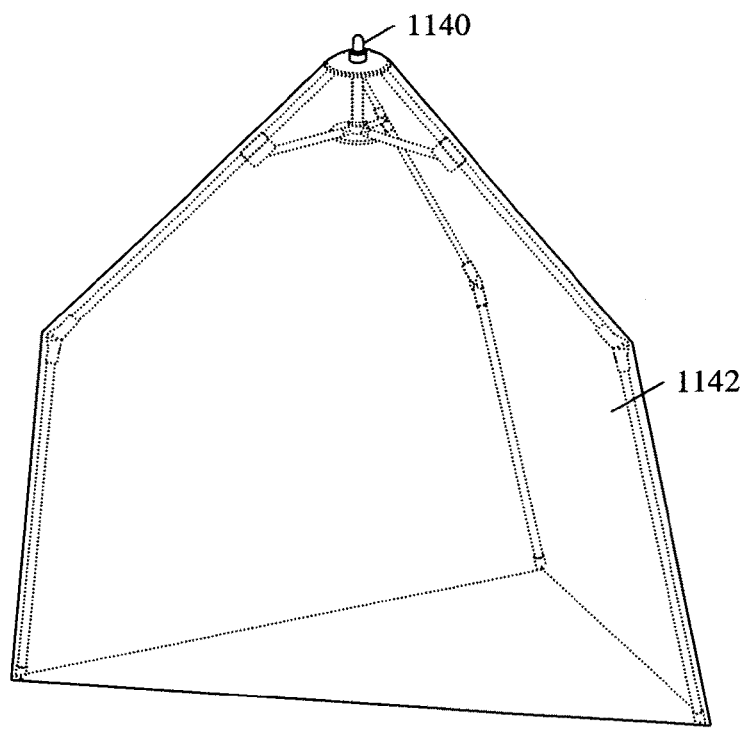

FIG. 11D shows an embodiment of the angular frame 950 of FIG. 11C with three cornered angular cover 1142.

Figure 11E:
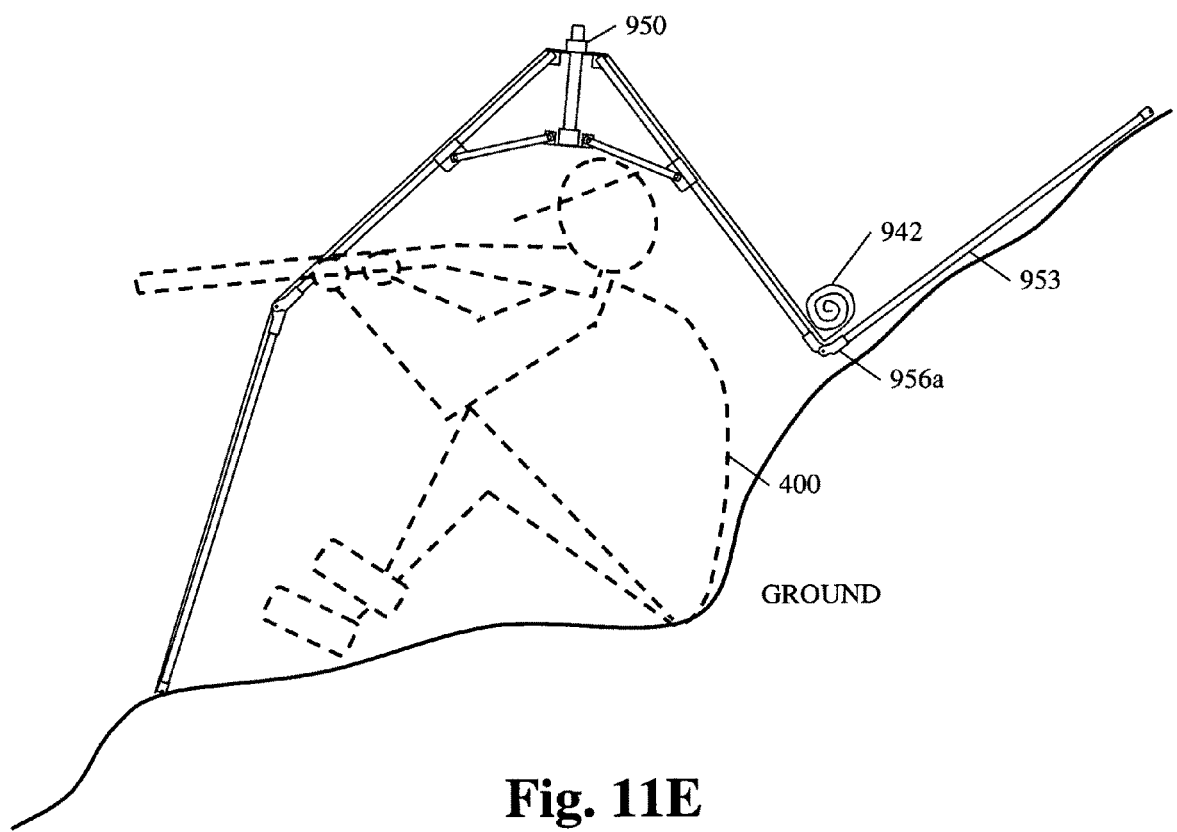

FIG. 11E shows a single operator angular frame 950 configured for use on a hillside. The uphill lower shaft(s) 953 are folded up at angular hinge 956, and the angular cover 942 is rolled up on the uphill side.

FIG. 12A Through FIG. 12F

Figure 12A:
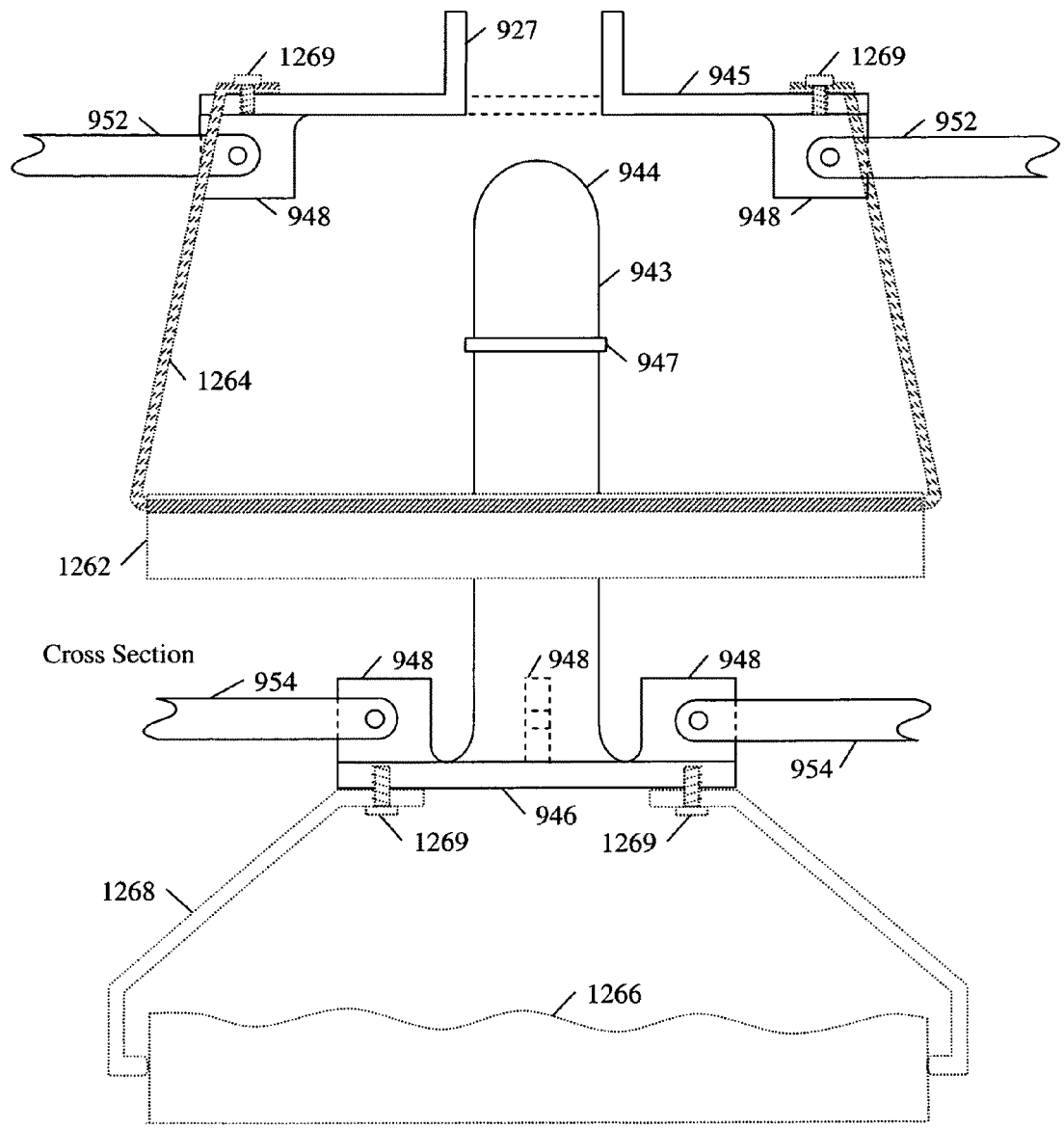

FIG. 12A is a cross sectional view of an improved docking mechanism. Stretcher shafts 954 (*a-d*) respectively connect to plate anchors 948 (*a-d*) on a novel lower plate 946. The separation shaft 943 is connected to the lower plate 946. Angular cover shafts 952 (*a-d*) connect to plate anchors 948 (*a-d*) respectively on a novel upper plate 945. The upper handle 1262 is threaded by the handle strap 1264. The handle strap 1264, which is suspended below the upper plate 945, is attached to the top of the upper plate 945 by two fasteners 1269. The threaded upper handle 1262, after fastening, is allowed to dangle beneath the upper plate 945. The lower handle 1266 is attached to the lower plate 946 by a rigid handle bracket 1268. This handle bracket 1268 is attached to the bottom of the lower plate 946 by two fasteners 1269. The dashed lines shown for handle strap 1264 are at an angle to the cross-section as more clearly shown in FIG. 12D.

By pushing up on lower handle 1266 while simultaneously pulling down on the upper handle 1262, the separation shaft tip 944 is guided through the plate conduit 927 on the upper plate 945 and the separation shaft 943 is inserted up to the separation shaft stop 947.

Figure 12B:
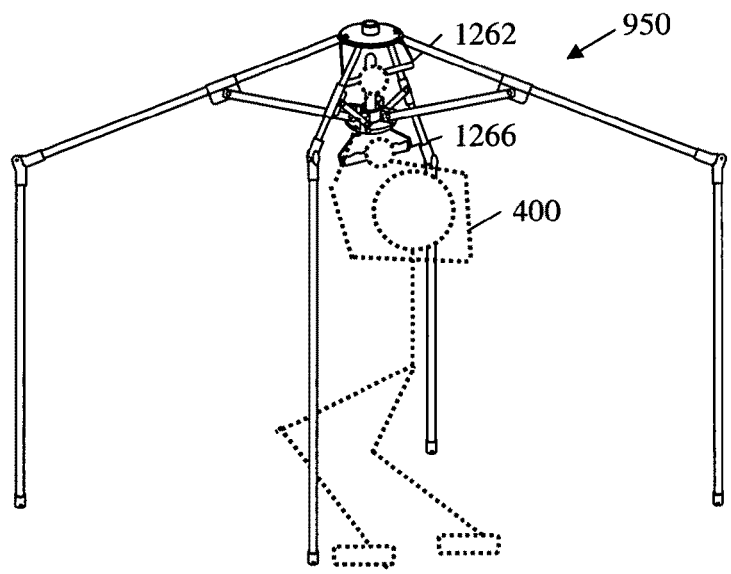

FIG. 12B illustrates a novel method of deploying the angular frame 950 using only the upper body strength of the operator 400. The operator 400 pushes up on lower handle 1266 while simultaneously pulling down on the upper handle 1262 to apply a skin tightening force to the angular frame 950. This requires the use of upper body strength only and provides a significant advantage of deployment of the angular frame 950 over the arched frame which requires the use of the full body including the legs (FIG. 6B and FIG. 9D).

Figure 12C:
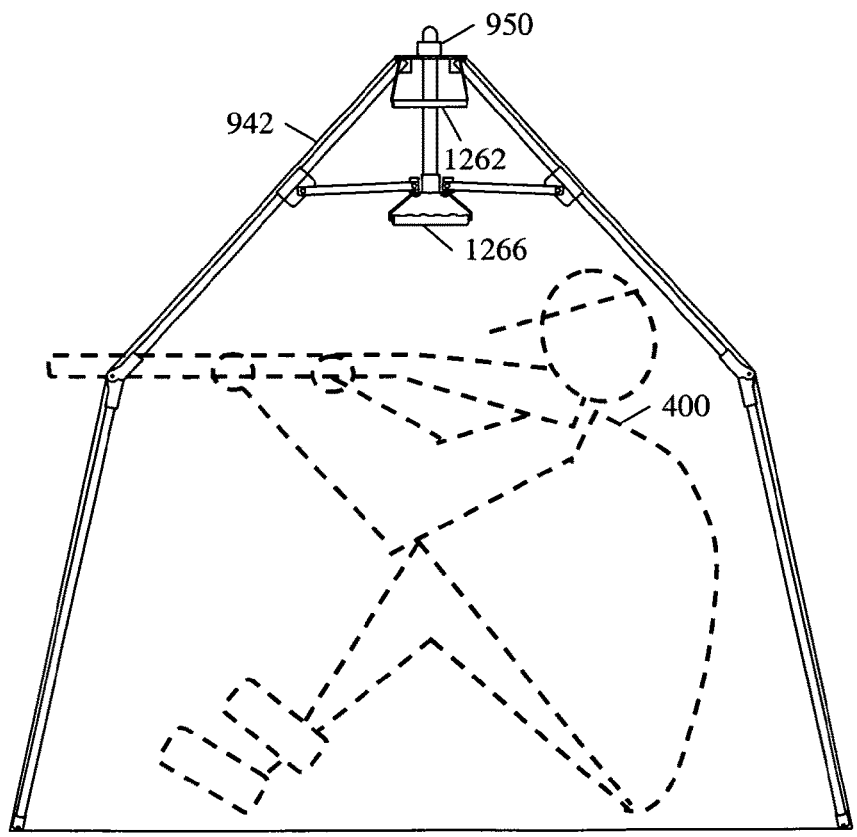

FIG. 12C shows a single operator profile embodiment of the angular frame 950 design for a single operator 400. The operator 400 uses the lower handle 1266 and upper handle 1262 to apply a skin tightening force to the angular cover 942 of the angular frame 950.

Figure 12D:
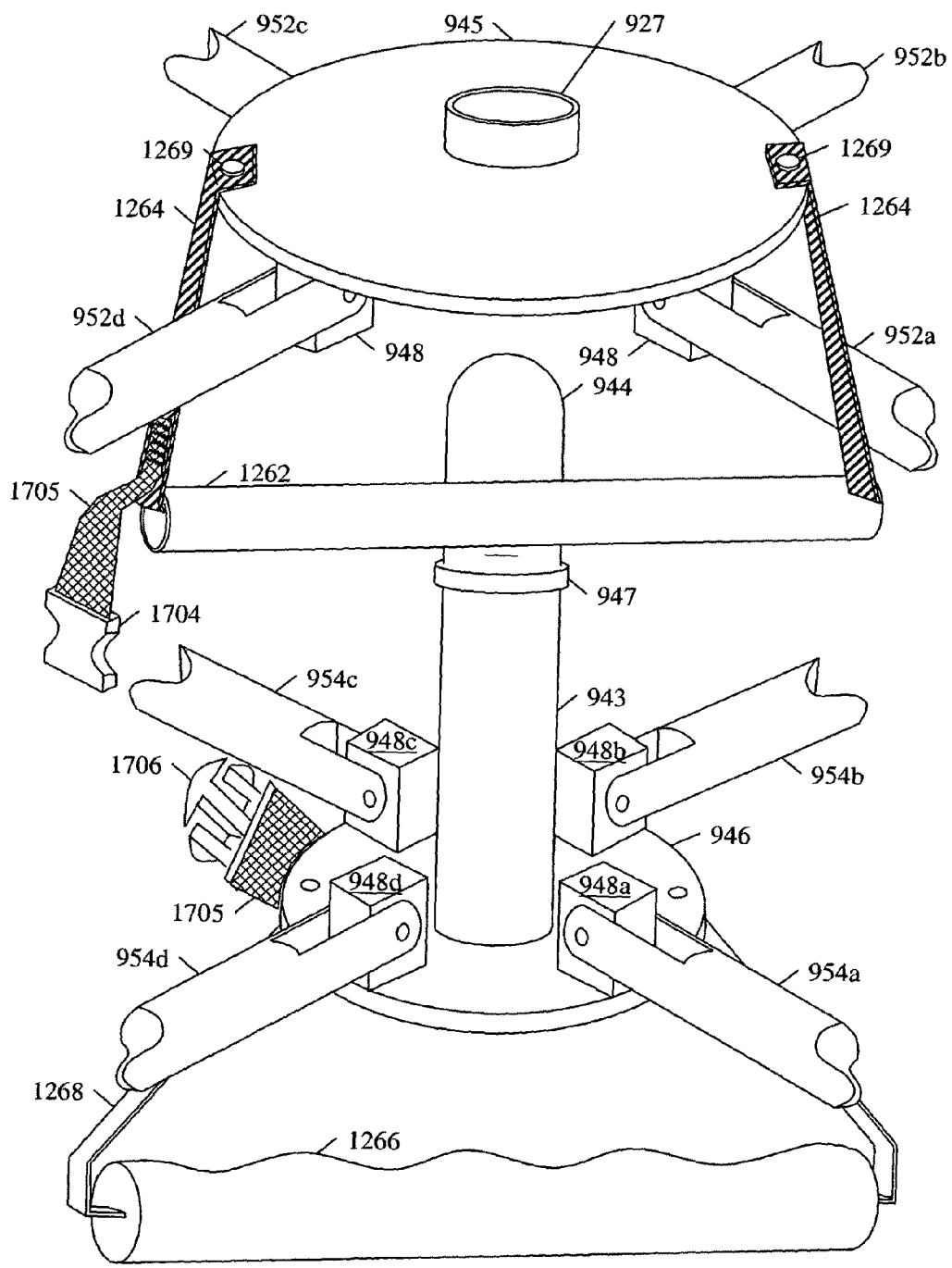
Figure 12E:
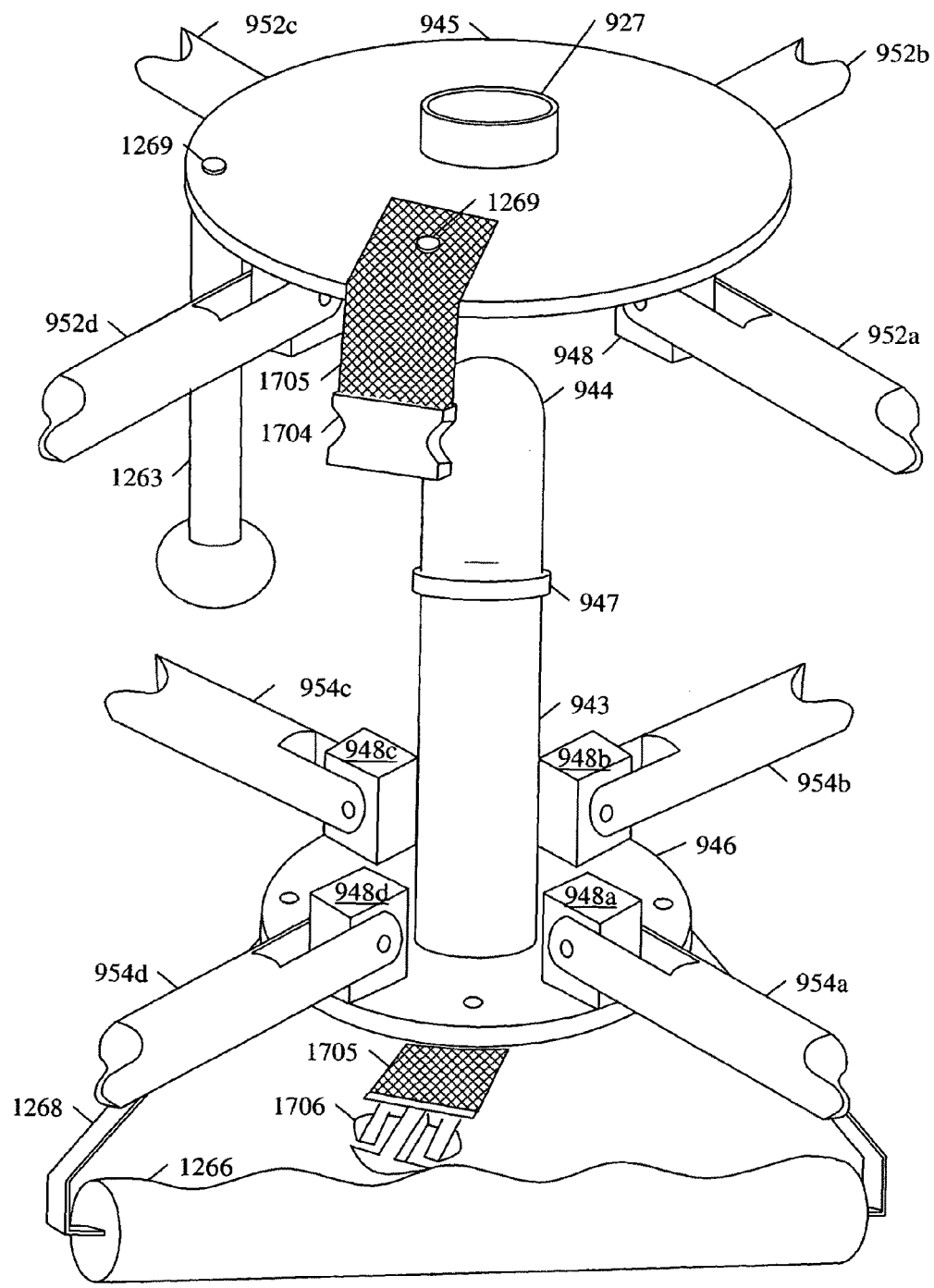
Figure 12F:
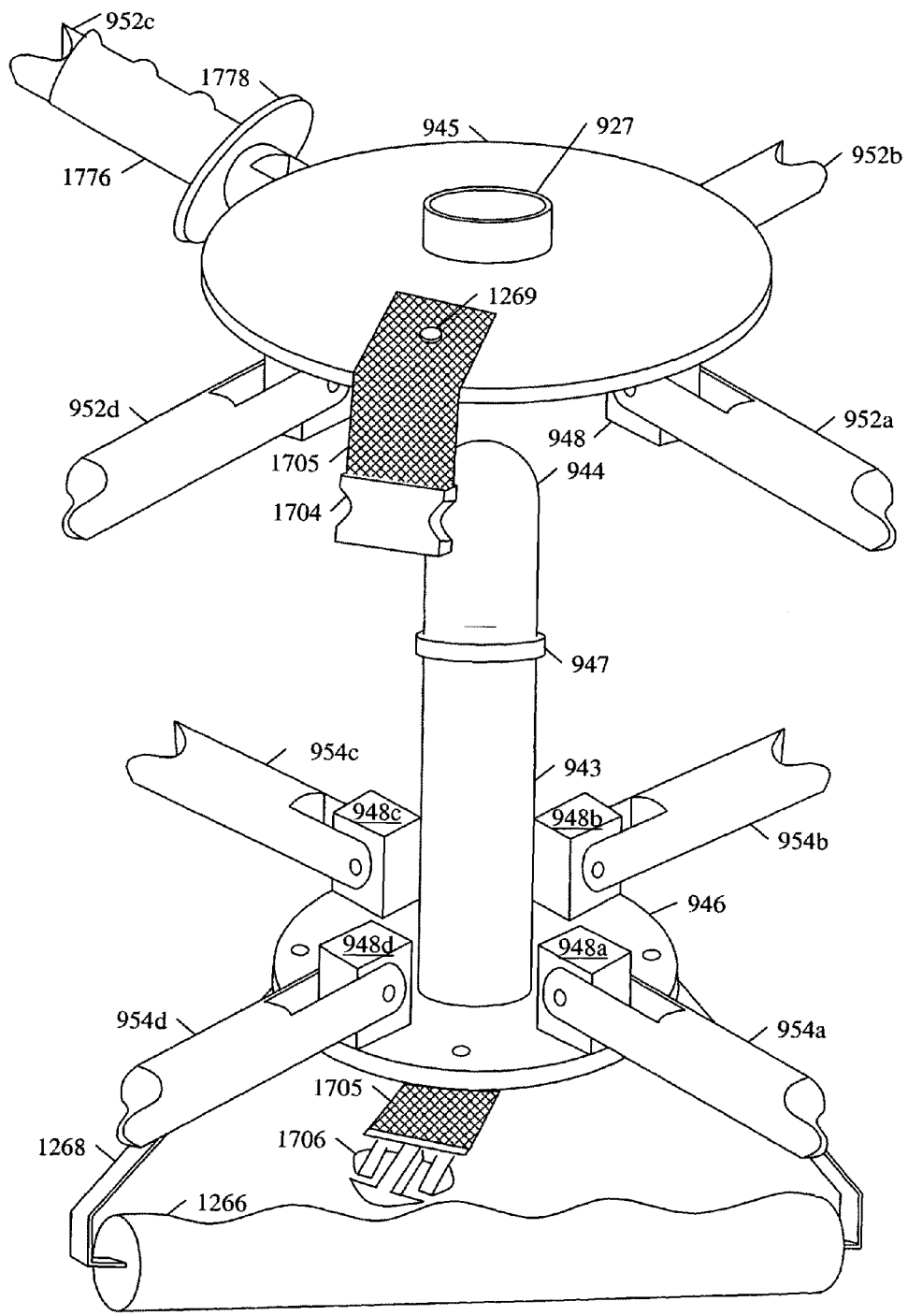

FIG. 12D through FIG. 12F show perspective views of embodiments of alternate improved docking mechanisms.

FIG. 12D is a perspective view of FIG. 12A with added safety straps 1705 and clips comprising inserting clip 1706 and receiving clip 1704. Mounting the safety strap 1705 on the handle strap 1264 keeps the receiving clip 1704 out of the area between the plate conduit 927 and separation shaft tip 944 where it may otherwise be damaged.

FIG. 12E is a perspective view of an alternate embodiment of FIG. 12D which uses pull rod 1263 instead of upper handle 1262. Mounting as short safety strap 1705 on the upper and lower plates 945 and 946 also keeps the receiving clip 1704 out of the area between the plate conduit 927 and separation shaft tip 944 where it may otherwise be damaged.

FIG. 12F is a perspective view of an alternate embodiment of FIG. 12D which uses hand grip 1776 and hand guard 1778 instead of upper handle 1262.

Figure 12G:
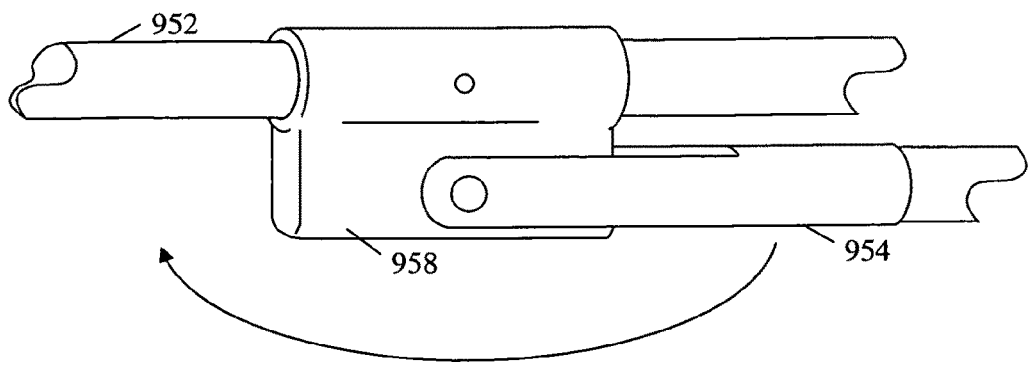
Figure 12H:
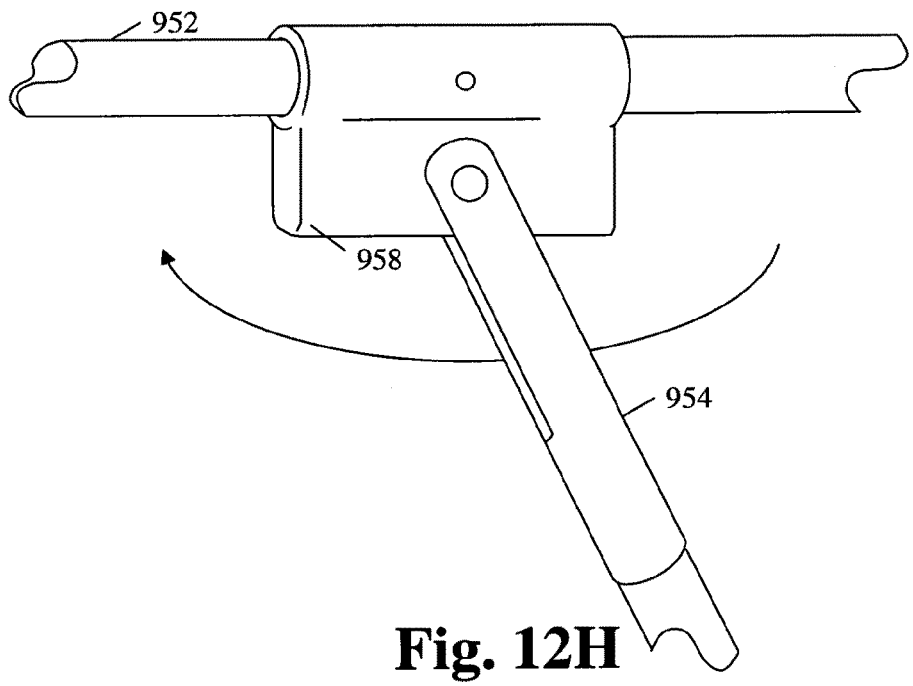
Figure 12I:
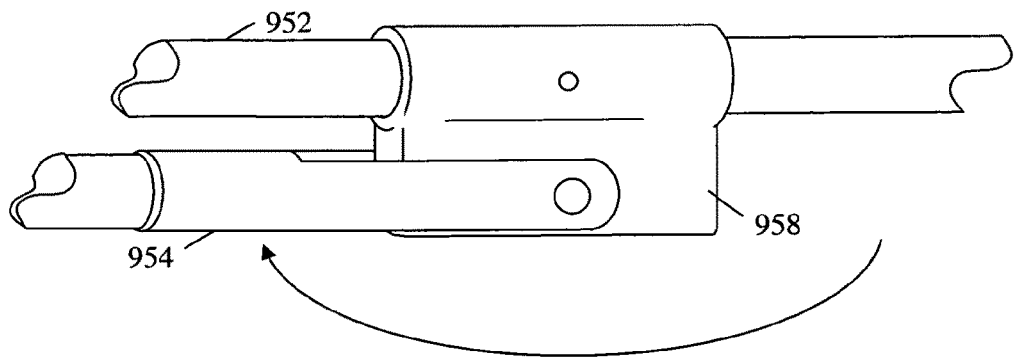

FIG. 12G Through FIG. 12I

FIG. 12G through 12I show details of the shaft plate 958 connection to the stretcher shaft 954. The end of stretcher shaft 954 that interfaces with the shaft plate 958 is preferably flat and tight on either side of the shaft plate 958, such that the stretcher shaft 954 applies an advantageous mechanical force against the shaft plate 958. The stretcher shaft 954 could be composed out of solid, machined or molded, metal or a fiberglass shaft with a metal tip.

FIG. 12G shows the position of the shaft plate 958 and the stretcher shaft 954 when the frame is fully collapsed, FIG. 12H shows the position of the shaft plate 958 and the stretcher shaft 954 when the frame is being set up. FIG. 12I shows the position of the shaft plate 958 and the stretcher shaft 954 when the frame is fully set up.

When the blind is initially being spread the shaft plate 958 connection provides an advantageous lateral force to cause the angular frame 950 to start to open. The tightness and mechanical area of the connection is especially helpful when the frame is in the horizontal position as required by the method shown in FIG. 14C through FIG. 14E. It also increases the durability of the frame.

The shaft plate 958 and the stretcher shaft 954 connection provides a second advantageous force to the angular frame 950, at point where the separation shaft tip 944 enters the plate conduit 927, to help ensure proper alignment. Further, when the frame is fully set up, it continues to provide stabilizing forces and strength within the angular frame 950 to limit motion and breakage.

FIG. 13A Through FIG. 13D

Figure 13A:
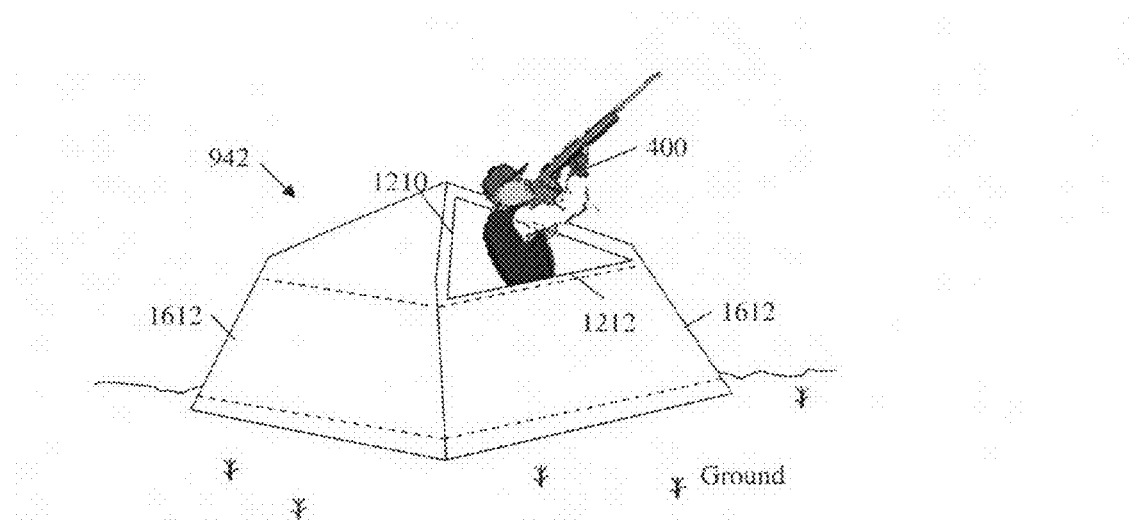

FIG. 13A shows a currently preferred embodiment of the blind in a low profile, rifle hunting configuration. The blind is low to the ground with the extensions 4410 removed or folded inside the angular cover 942 (not visible). The middle tier windows 1612 are closed because they are close to the ground. For situations where it is desired to stay low to the ground and shoot towards the sky, the operator 400 can lie inside the angular frame and rise up through the overhead opening of the top window fastener 1210 when desired.

Figure 13B:
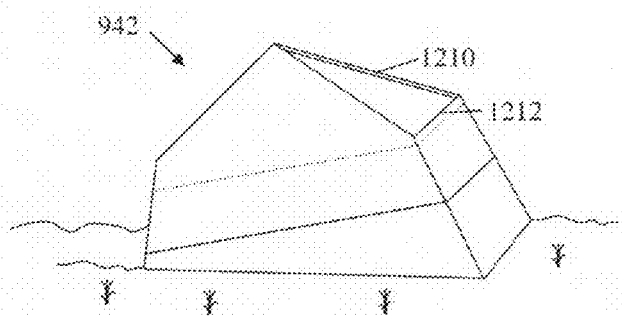

FIG. 13B shows a currently preferred embodiment of the blind in a dove blind configuration. On two of the four corners, the extensions 4410 are removed or folded inside the angular cover 942 (not visible) moving the apex of the blind away from directly overhead. The middle tier windows 1612 are closed. The operator 400 can sit on a chair inside the blind having good visibility through the opening and stand up whenever desired.

Figure 13C:
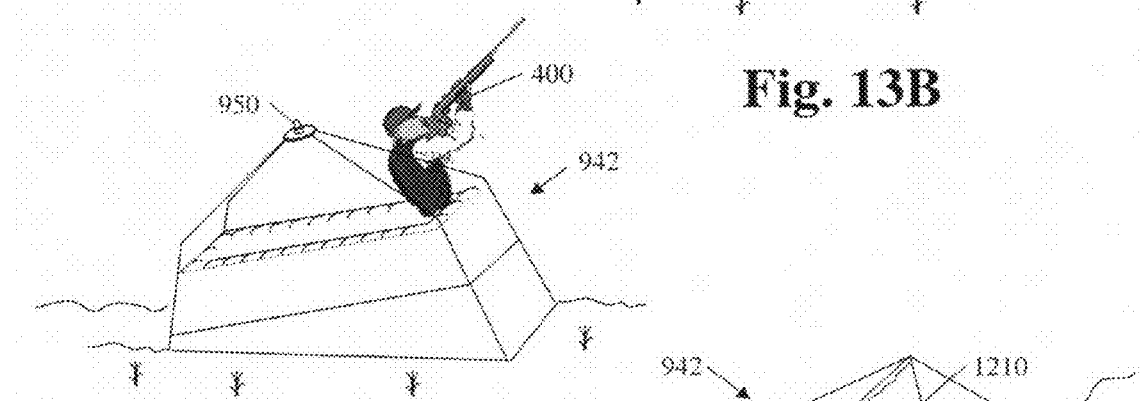

FIG. 13C shows a currently preferred embodiment of the blind in a waterfowl configuration. On two of the four corners, the extensions 4410 removed or folded inside the angular cover 942 (not visible) moving the apex of the blind away from directly overhead. The middle tier windows 1612 are closed. The two, interconnect inverted-T windows are completely opened allowing the top to be completely open and rolled down.

Figure 13D:
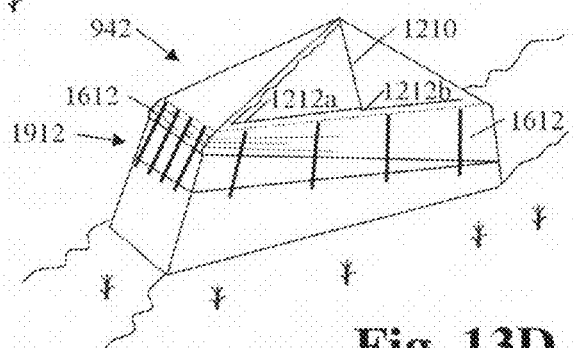

FIG. 13D shows a currently preferred embodiment of the blind in a hillside or rough terrain configuration. On two of the four corners, the extensions 4410 are removed or folded inside the angular cover 942 (not visible) allowing the blind to be level. The middle tier cover windows 1612 are opened in part and are held quietly in place by the guylines 1912. One side section of the inverted-T windows is shown open (by opening fasteners 1210 and 1212a) allowing the operator to view up the hill.

FIG. 14A Through FIG. 14H

FIG. 14A through FIG. 14G show novel set up and take down methods of the angular frame 950. This sequence is shown using the angular frame as a collapsed bundle having the angular cover shafts 952 unfolded to full length.

FIG. 14A shows the operator 400 carrying the collapsed blind using his hands. Next the operator 400 places the collapsed blind on the ground. At this point the angular frame 950 is folded to about half the length of the angular cover shafts 952 to collapse into a narrow bundle.

FIG. 14B and FIG. 14C show the operator opening the angular frame by grasping the end piece with hook 4400 or the connecting lower shaft 953 and rotating the shaft upward, outward and downward on the angular hinge 956 (not shown) parallel with the angular cover shaft 942 and the ground.

FIG. 14D shows the operator beginning to lean back while holding the angular cover shafts 952 through the angular cover 942 as the angular frame 950 begins to open. It is during this transition from FIG. 14C to FIG. 14D that the first advantages of the flat walls in the various hinges are used. This transition puts a large stress on the frame to force it to open. The friction within the hinges and against the ground starts to hold the blind open. In practice, opening the blind into a light wind makes this step and process easier.

FIG. 14E shows the operator 400 at the end of the seated row stroke. While the operator 400 continues to lean back, the other hand makes a smooth transition to the pull handle 1535. By leaning back, the blind continues to open and the operator 400 lifts the apex of the blind off the ground using the foot attaching means 1790. The pull cord 1536 has been moved the full range of motion necessary to engage the docking mechanism. The operator has released the angular frame 950 and has grasped the pull handle 1535 during the stroke with both hands while continuing to lift the apex of the blind with the foot attaching means 1790. Using this method the operator has been able to apply a cover skin tightening force using a plurality of large muscle groups of the full body from the hands to the feet, whereby the blind is rapidly set up (in only a few seconds). In turn, the angular cover 942 stretches over the angular frame with sufficient force that angular cover 942 is held taut without substantial movement or noise detectable by wildlife. The force applied by the human body over the range of movement is greater than a force possible with just the arms and shoulders of the conventional methods.

FIG. 14F shows the operator 400 easily lifting the standalone blind and lifting it overhead.

FIG. 14G shows the operator 400 inside the blind. The operator can go from running through the outdoors to being fully concealed (the sequence from FIG. 14A to FIG. 14G) in about seven seconds.

FIG. 14H shows the novel take down method. "You just kick it."™

The operator 400 pulls most of the pull cord 1536 inside the blind, and tips the blind horizontally to slightly below knee level. The operator 400, for example, stands on a dominate right foot, holds the angular cover 942 with the left hand, and kicks the separation shaft tip 944 with the left foot. When the stored energy is released, the blind will automatically jump forward under the left arm of the operator 400 where the now collapsed blind also can be grasped in front of the body with the right hand. The operator 400 can immediately move the blind to a new location. The blind can be collapsed in a couple of seconds.

For long-term transportation, the angular frame can be folded to about half the length of the angular cover shafts 952 to collapse into a narrow bundle.

Figure 15A:
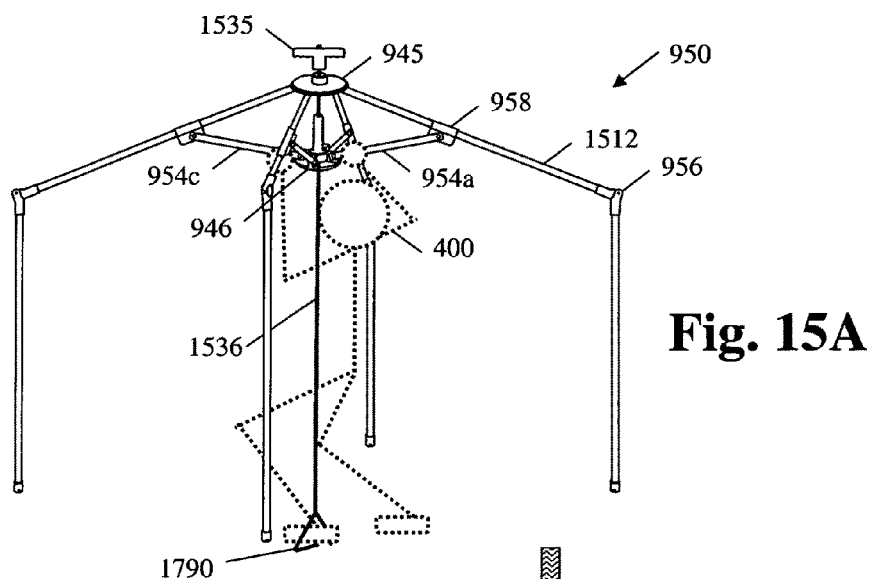
Figure 15B:
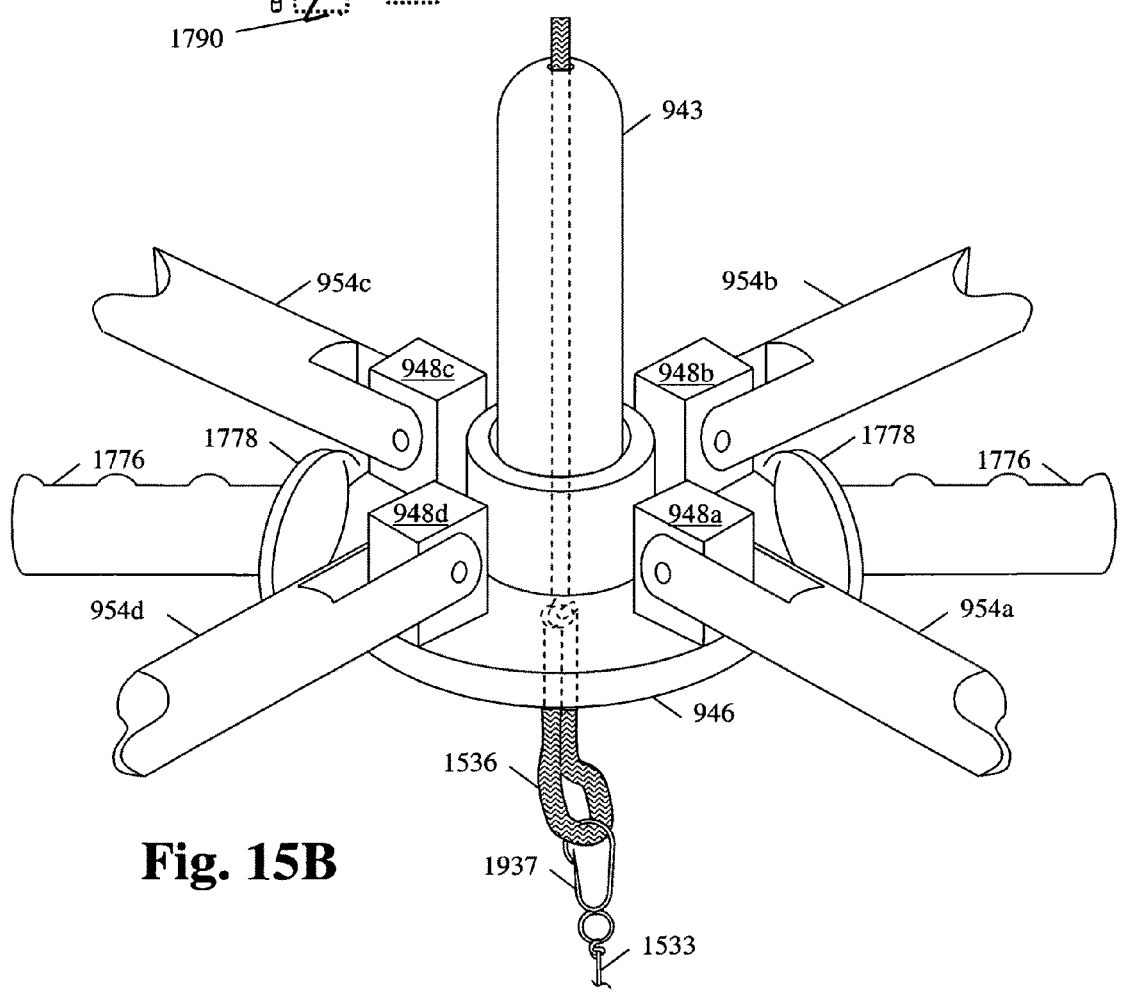
Figure 15C:
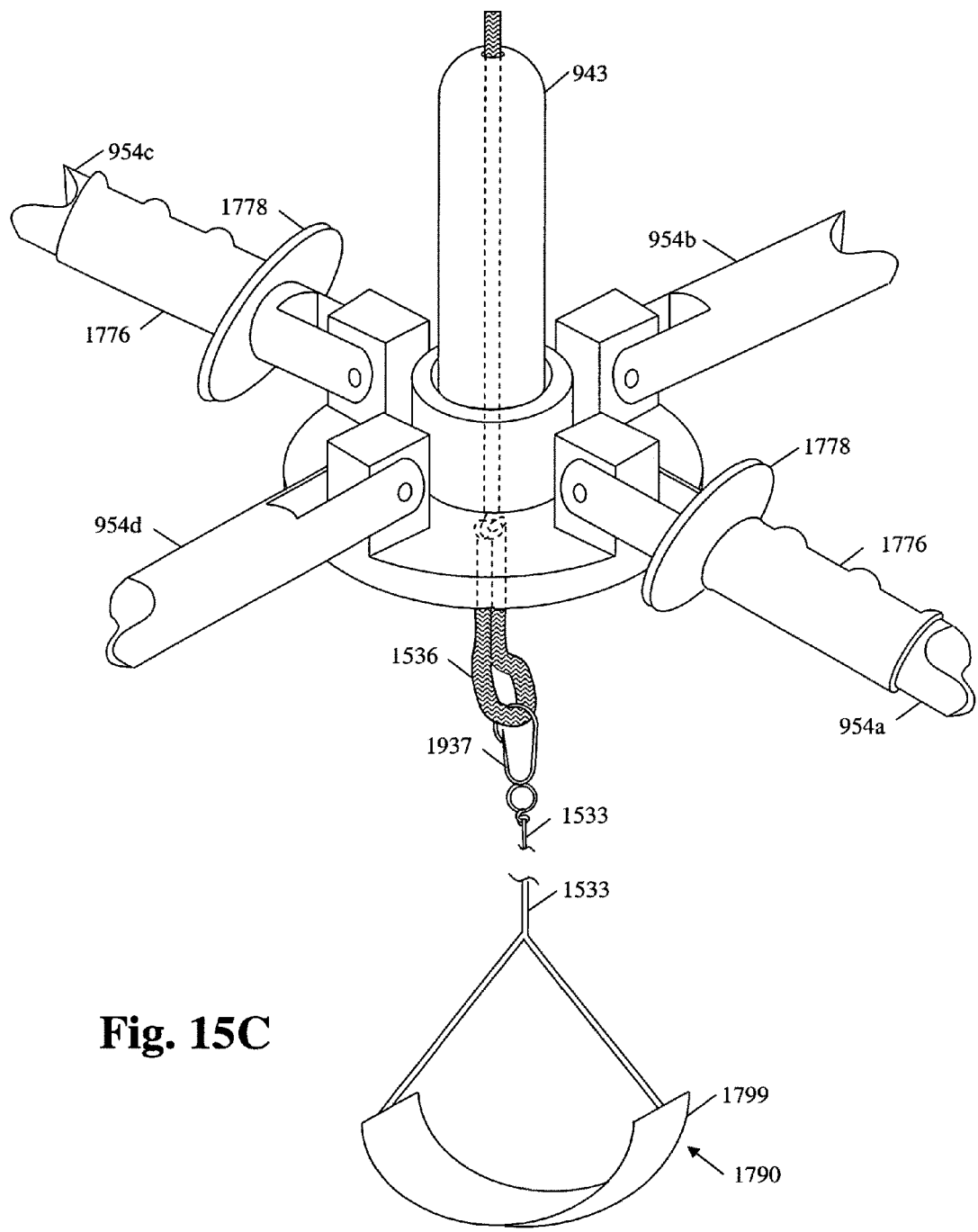

FIG. 15A Through FIG. 15C

FIG. 15A through 15C show aspects and operation of an alternate power jerk method of using the full human body to set up an angular frame 950.

FIG. 15A shows the operator 400 positioned under the angular frame 950 in the power jerk position. The blind is initially spread while in a vertical position. FIG. 15A also illustrates a novel method of deploying the angular frame 950 using the full body strength of the operator 400. A pull cord 1536 preferably is attached at one end to a pull handle 1535. In this method the pull cord 1536 is pulled through the lower plate 946 and attached to a foot attaching means 1790. The operator 400 presses up on the hand grips 1776 (configured as shown in one of the embodiments of FIG. 15B or FIG. 15C) while using the large muscles of the back and legs through a foot to apply a skin tightening force. To achieve the full range of motion, the operator 400 likely will lift the blind from the ground as some point during the power jerk. The hand grips 1776 provide a stable means of performing the power jerk and automatically positions the operator's hands away from the parts (e.g. stretcher shafts 954 (*a-d*), half arch cover shaft 1512 (*a-d*), upper plate 945, or lower plate 946) that come together during the docking process. The hand guards 1778 (see FIG. 15B for details) help the operator to hold the collapsed frame when initially opening the angular frame 950 and to protect the hands and fingers.

In yet another embodiment (not shown), the pull cord 1536 does not pass thru the separation shaft 943, but is attached directly to the upper plate 945. In this embodiment there is not need for a pull handle 1535.

FIG. 15B shows a perspective view of the hand grips 1776 and hand guards 1778 as an integral part of the lower plate 946. The stretcher shafts 954 (*a-d*) are connected to the lower plate 946 via the anchor plates 948 (*a-d*) respectively. The separation shaft 943 is attached perpendicular to the lower plate and provides a conduit for the pull cord 1536. The pull cord extension 1533 is attached to the pull cord 1536 by a closable clip 1937, in this embodiment.

FIG. 15C shows the hand grips 1776 and hand guards 1778 mounted on two opposite arch stretcher shafts 954. FIG. 15C also shows the foot attaching means 1790 attached to the pull cord extension 1533. The pull cord extension 1533 is attached to the pull cord 1536 by a closable clip 1937, in this embodiment. The separation shaft 943 is attached perpendicular to the lower plate and provides a conduit for the pull cord 1536. The foot attaching means 1790 could be implemented as a loop in the pull cord extension 1533 optionally attached or threaded through a stirrup 1799. The stirrup 1799 could be made of rigid metal or plastic, or preferably flexible plastic tubing.

Power Jerk Method

In the power jerk method of setting up the blind, the operator does not have to sit on the ground (or chair) and still is able to use the large muscle groups of the human body from hands to feet. While the range is typically less than the power row position, most outdoorsmen can apply more force in the power jerk position, resulting in the same amount of energy for necessary improved skin tightening, which is substantially greater than can be applied with just the arms and shoulders as in conventional methods.

FIG. 16A Through FIG. 16D

Figure 16A:
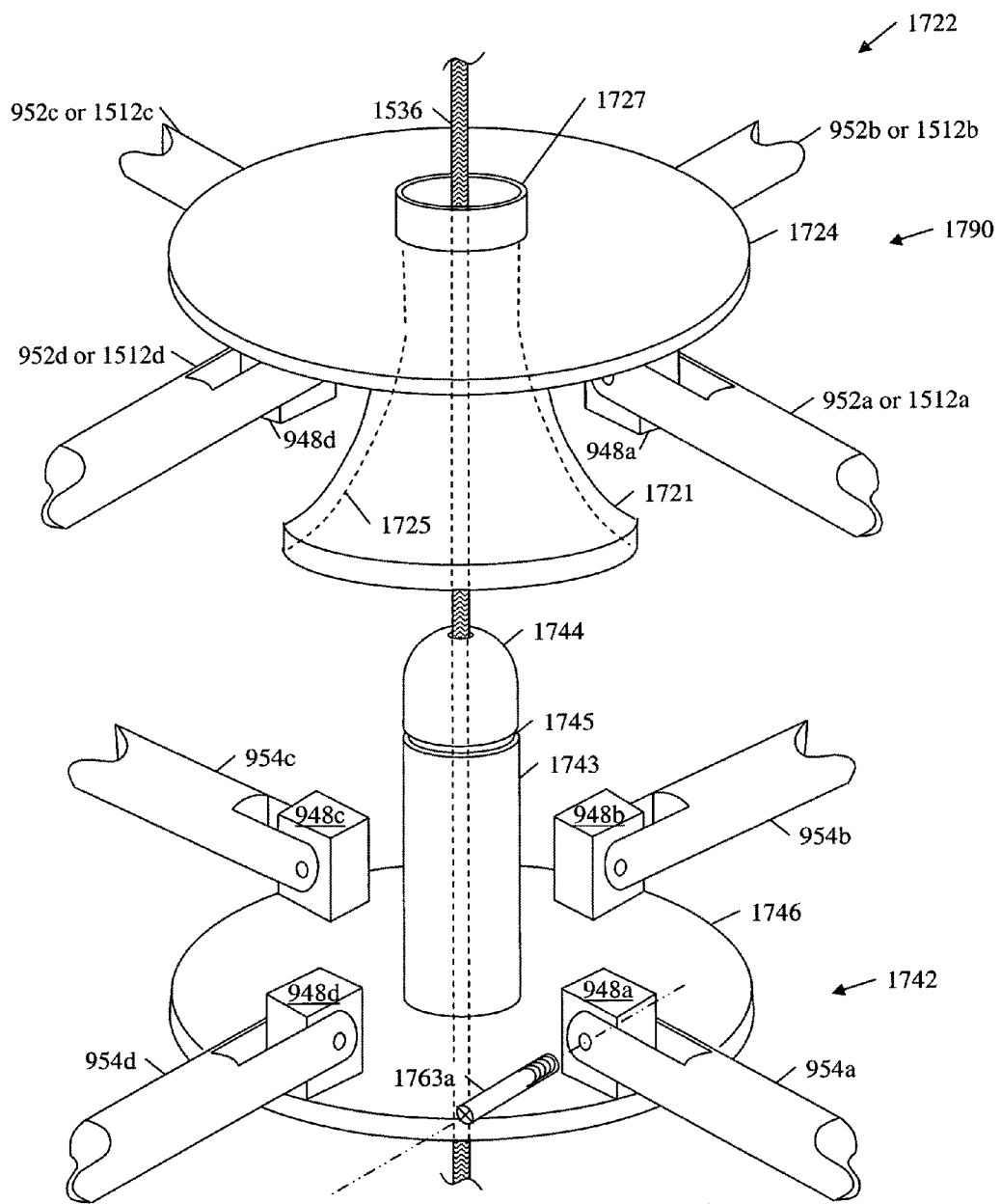

FIG. 16A is a perspective view of an improved docking mechanism. The docking assembly 1742 comprising stretcher shafts 954 (*a-d*) connected to plate anchors 948 (*a-d*) by threaded axles 1763 (*a-d*) respectively on a novel docking plate 1746. The docking shaft 1743 is connected to the docking plate 1746. The intersection dock 1722 comprises angular cover shafts 952 (*a-d*) or half arch cover shafts 1512 (*a-d*) connected to plate anchors 948 (*a-d*) respectively on a novel dock plate 1724. The top portion of the dock plate 1724 in the intersection dock 1722 also serves as the foot attaching means 1790. The alternate dock 1721 is connected to the bottom of the dock plate 1724. The inside of the alternate dock 1721 comprises the dock curved surface 1725. The pull cord 1536 runs completely through the docking plate 1746, the docking shaft 1743, the alternate dock 1721 and the dock conduit 1727.

By pushing the docking assembly 1742 into the intersection dock 1722, the docking shaft 1743 is guided through the bottom of the alternate dock 1721 and docking conduit 1727 and inserted up to the point where the bottom of the alternate dock 1721 meets the top of the docking plate 1746 and the bottom plane of the safety groove is protruding above the top of the docking conduit 1727. At this point a locking mechanism can be applied to secure the docking shaft 1743 in place.

Figure 16B:
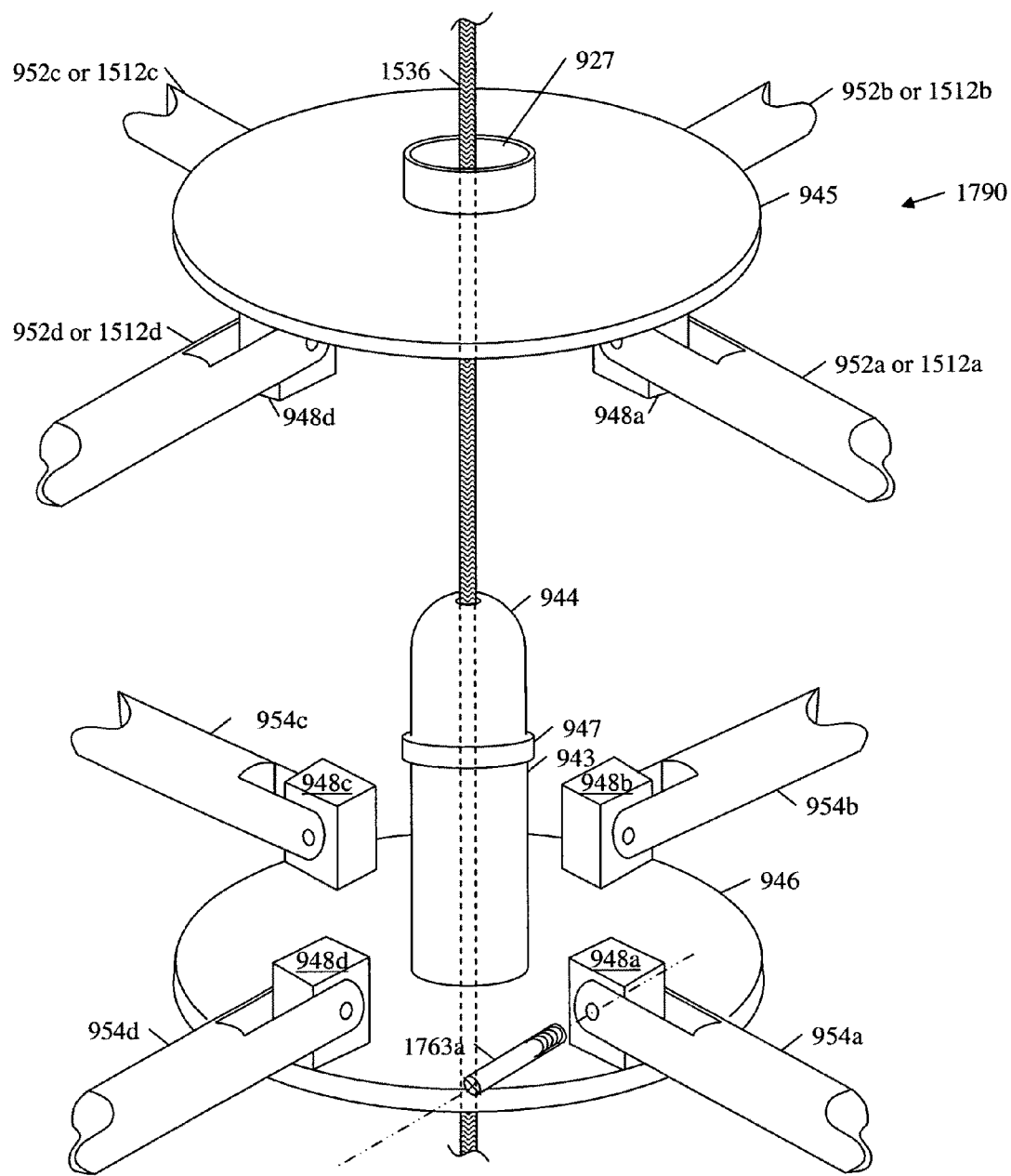

FIG. 16B is a perspective view of an improved dockless mechanism enabled by the mechanical strength resulting from the novel shaft plate 958 and novel plate anchor 948. FIG. 16B eliminates the use of docking shaft 1743, safety groove 1745, docking tip 1744, alternate dock 1721, and dock conduit 1727 and replaces it with separation shaft 943, separation shaft stop 947, separation shaft tip 944 and plate conduit 927.

The embodiment of the dockless mechanism in FIG. 16B is equally as effective as that of FIG. 16A, but requires less material and the use of an additional safety mechanism.

Figure 16C:
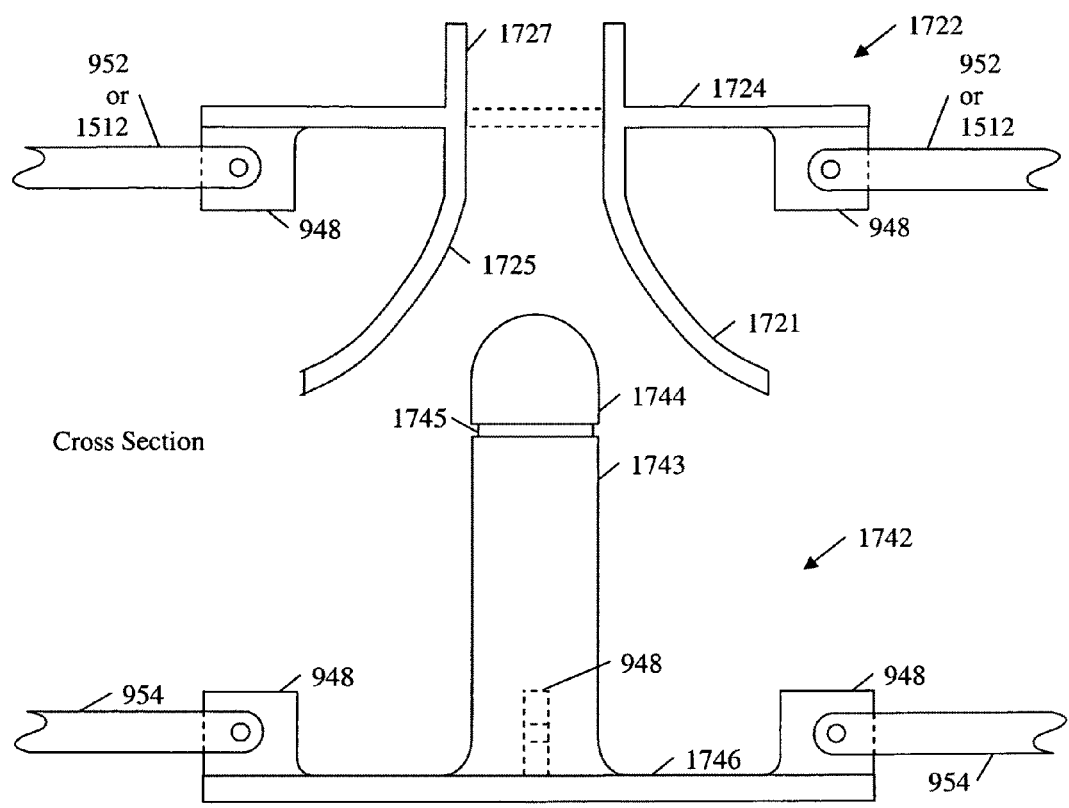

FIG. 16C is a cross sectional view of FIG. 16A.

Figure 16D:
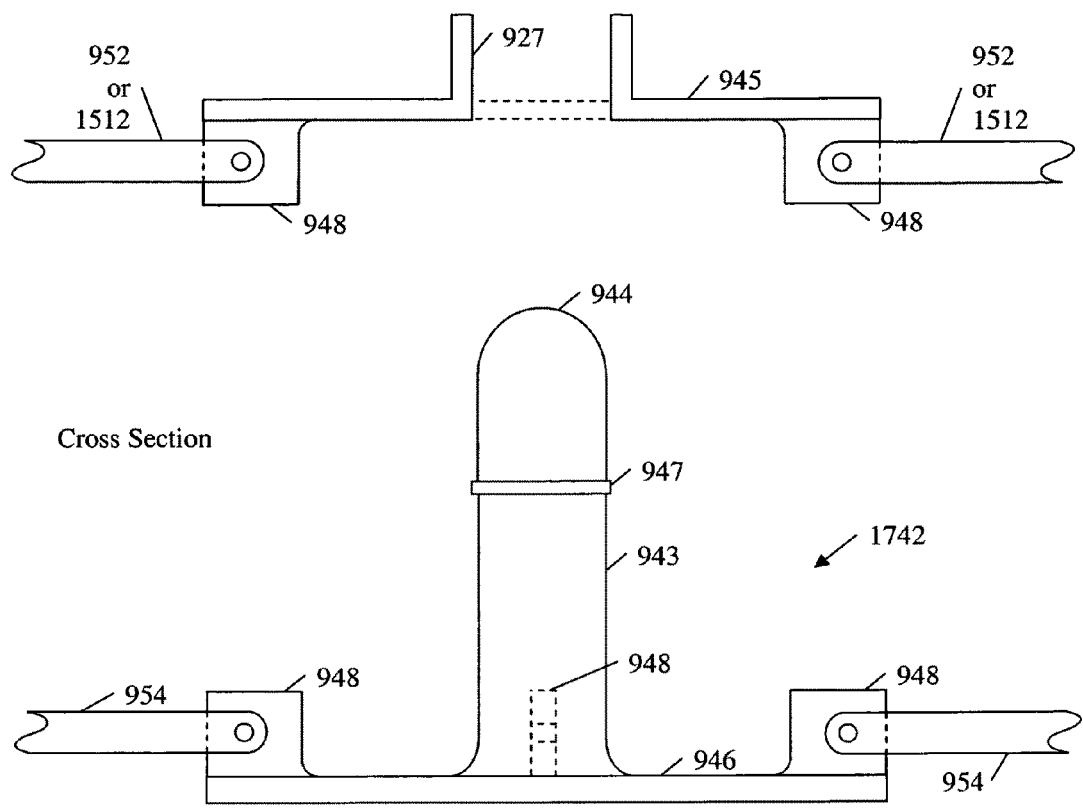

FIG. 16D is a cross sectional view of FIG. 16B.

FIG. 17

Figure 17:
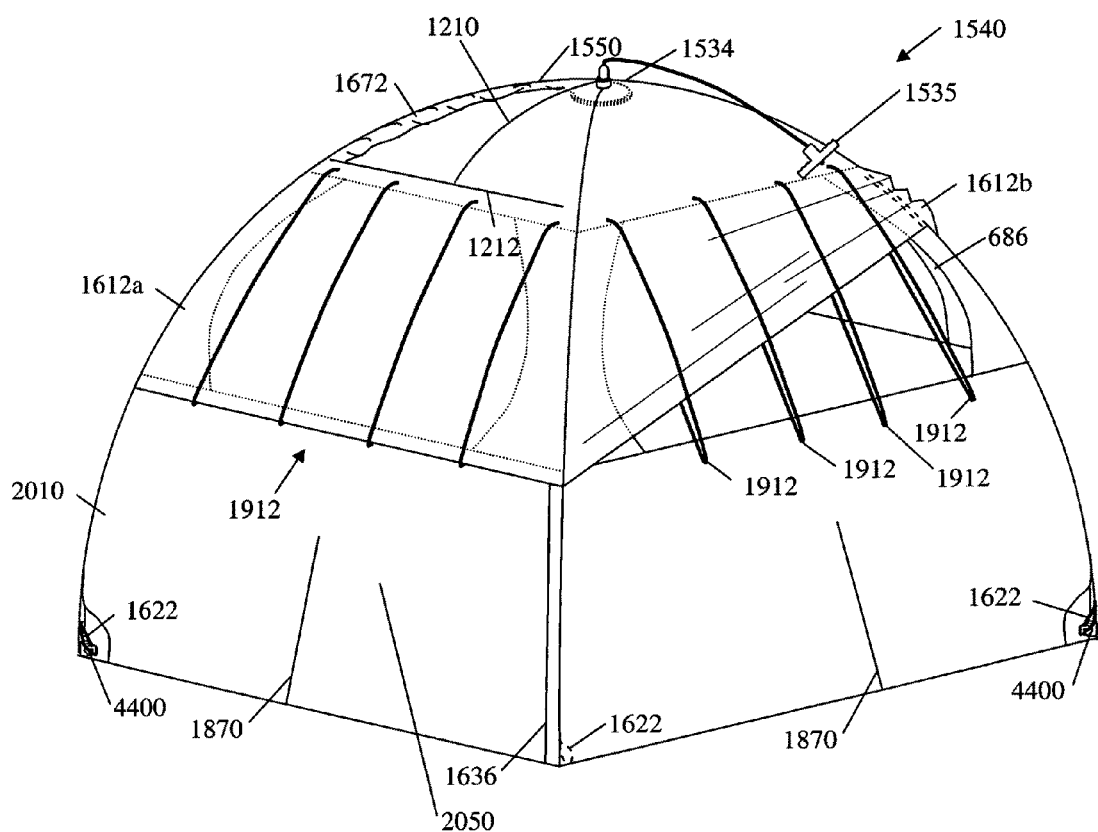

FIG. 17 shows various features of a currently preferred embodiment of the blind of the present invention. The blind comprises the fast setup frame 1534 (FIG. 3A) or angular frame 950, a three tiered, quiet cover embodiment of the cover 1540 (FIG. 5C), a rain fly 1550, and a foot attaching means 1790 (not visible, FIG. 14D, FIG. 14E, and FIG. 15A).

The cover 1540 comprises:
two inverted-T window, formed by fasteners 1210 and 1212,
windows 1612 sandwiched between guylines 1912 (either FIG. 8A or FIG. 8B), with inserting clips 1706 (*a-d*) in each bottom corner (not shown),
a door fastener 1636, forming a skirt door 2050,
skirt straps 686 in each corner,
lower wall tightening, vertical hems 1870,
a skirt 2010

The fast setup frame 1534 further comprises:
pull cord 1536 and pull handle 1535,
end pieces with hook 4400
corner loop 1622

The blind is shown with the inverted-T window half open with the open section in a window 1672. The end piece with hook 4400 could alternatively be held by a pocket as shown in the parent applications rather than a corner loop 1622.

FIG. 18A Through FIG. 18F

Figure 18A:
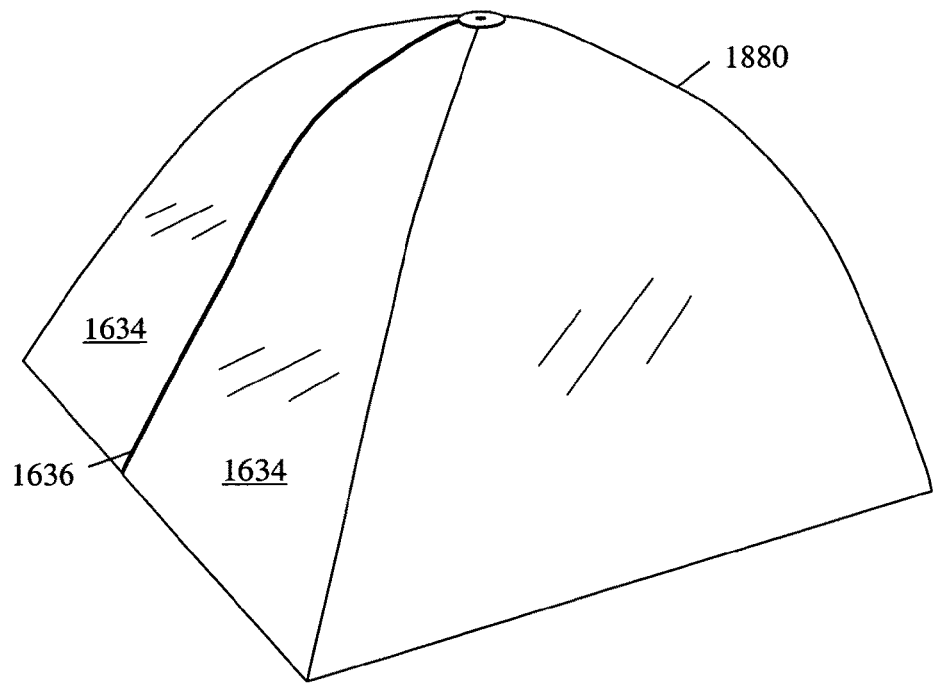

FIG. 18A illustrates an embodiment of the present invention with the use of the simple cover 1880. The simple cover 1880 further comprises a set of doors 1634 and a door fastener 1636. Set up can be accomplished using any of the methods shown in reference to FIG. 6B, FIG. 9D, FIG. 12B.

Figure 18B:
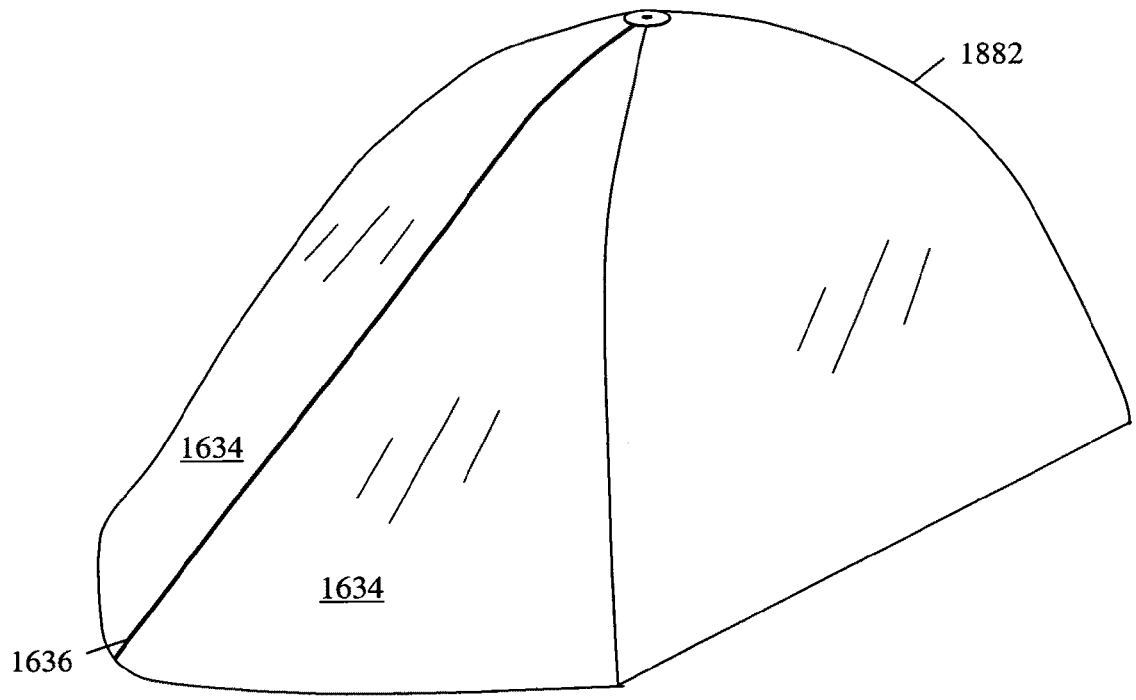
Figure 18C:
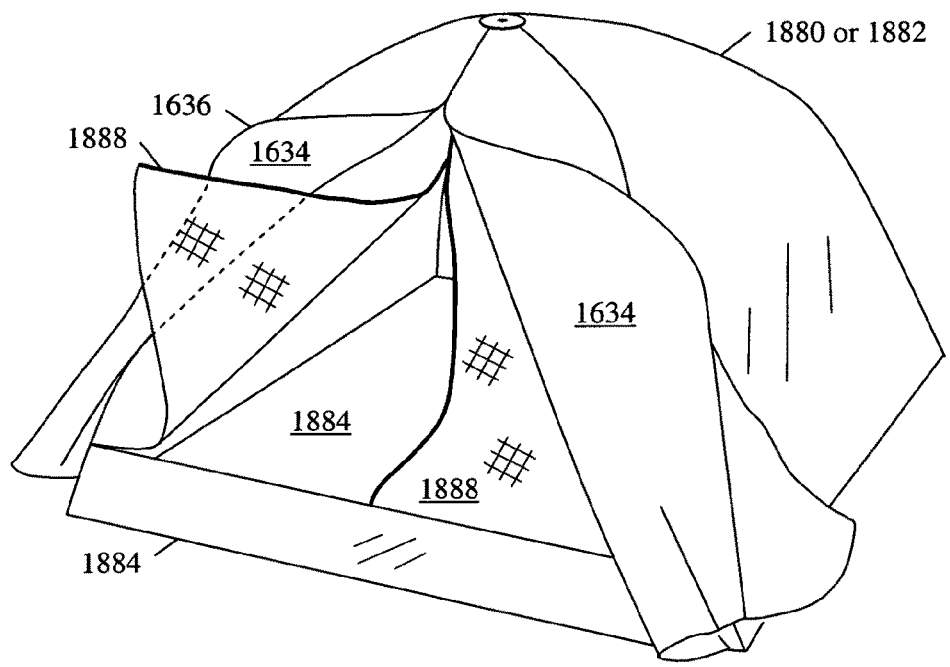

FIG. 18B illustrates an embodiment of the present invention with the use of the cover with porch 1882. The cover with porch 1882 comprises a set of doors 1634 and a door fastener 1636. The cover with porch 1882 further comprises a removable rain cover having a porch capable of being extended beyond the area enclosed by the netting. This embodiment has many advantages including providing a shelter under which items such as shoes, packs, etc. may be protected when stored beyond the area enclosed by the netting 1888 (FIG. 18C). The porch portion could be staked (not shown).

FIG. 18C illustrates aspects of an embodiment of the present invention with the use of either the simple cover 1880 or the cover with porch 1882 and tent floor 1884. This cover comprises a fully enclosing netting 1888 with a water resistant tent floor 1884. The simple cover 1880 or the cover with porch 1882 further comprises a set of doors 1634 and a door fastener 1636. Likewise, the netting 1888 comprised of a set of netting doors 1886.

Figure 18D:
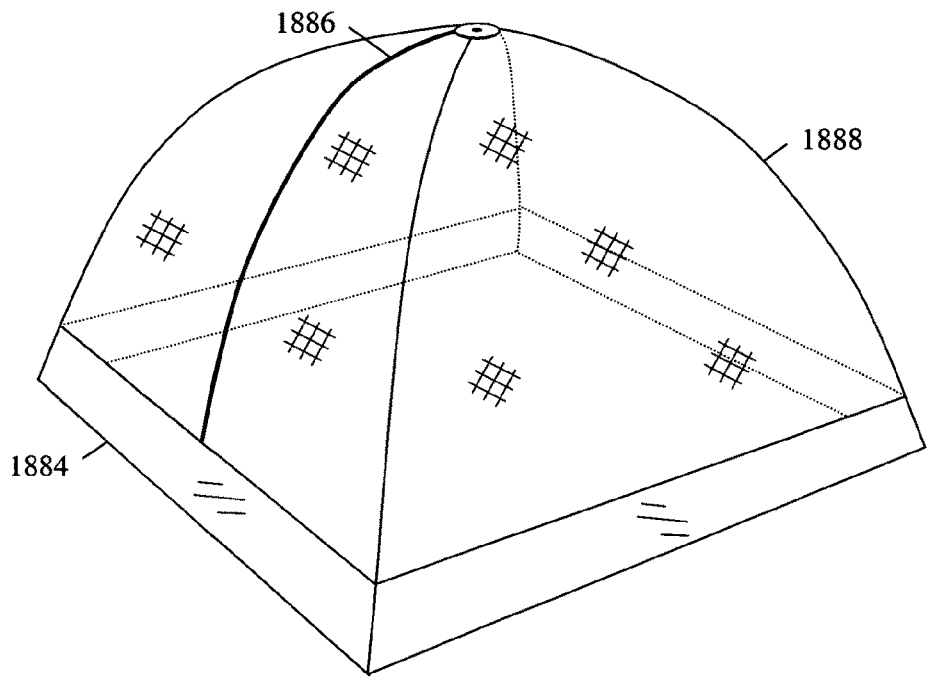

FIG. 18D illustrates an alternate embodiment of FIG. 18C that includes only the netting 1888 and the tent floor 1884. In this embodiment the simple cover 1880 or the cover with porch 1882 has been removed.

Figure 18E:
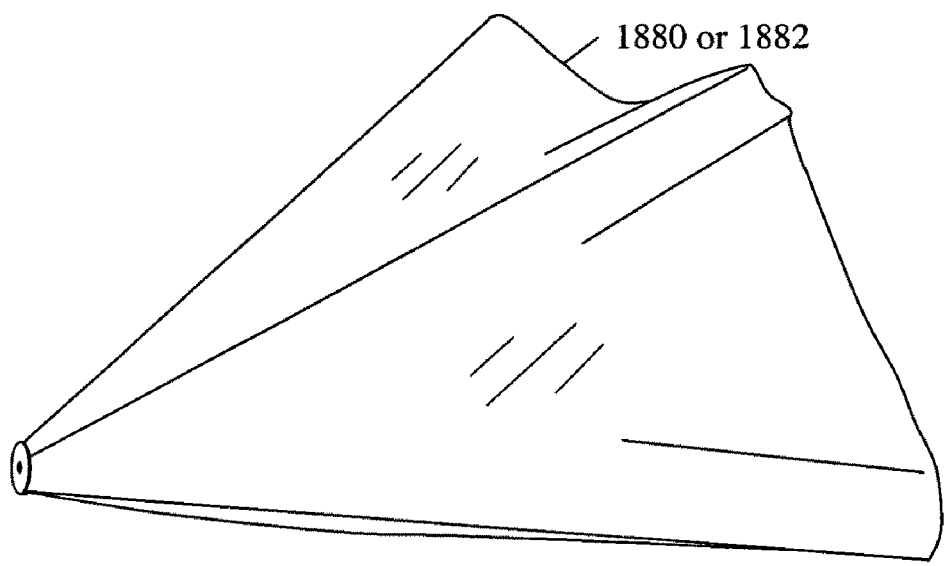
Figure 18F:
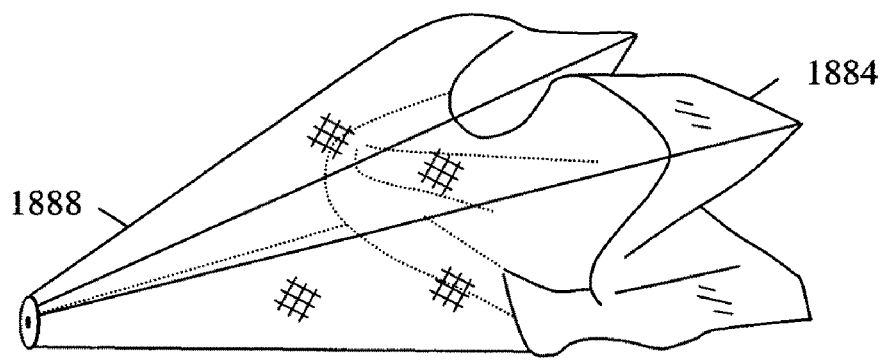

FIG. 18E and FIG. 18F illustrate a novel set up and take down of an embodiment of a fast setup frame 1534 or an angular frame 950. FIG. 18E illustrates the concept with either the simple cover 1880 or the cover with porch 1882. FIG. 18F illustrates the same concept with a fully enclosing netting 1888 with a water resistant tent floor 1884. Note that the floor can be folded inside the frame and the shafts can be folded or collapsed to make the structure more compact for portability.

Other Uses

While the descriptions of the various embodiments have been made in reference to an undeveloped outdoor area, the modular system of the present invention could also be used in urban areas. For example, in colder winter climates, the system could be used to form a green house over a garden using clear plastic sheeting and then reassembled in the summer as a shelter for vehicles or bicycles using an opaque tarp. In another example, the supports, shafts, connectors, and curtains could be used to form a backyard maze. In yet another example, the system could be used for constructing outdoor structures for weddings, flea markets, festivals, or even security checkpoints.

ADVANTAGES

Modular

The system of the present invention is modular. A user can begin using smaller modules with minimal investment and add more pieces or more complex modules later. A group of users can each own separate modules, which are used independently, and then construct more complex configurations when the group comes together in the outdoors.

Separately Packable

Because the various components and modules can be separated, different users in a group can carry a relatively lighter load, for example, in their backpacks. Some modules such as the single operator angular blind is easily carried using a backpack or waist pack.

Star Window and Inverted-T Window

The novel star window configurations provide blind windows with four or more sections such that any section or groups of sections can be independently opened while maintaining taut cover panels. The star windows, and inverted-T windows, also allow the top of the blind to be fully opened. A novel window section attachment allows non-adjacent window sections to be attached.

Skin Tightening

The novel means of tightening the skin of the present invention provides methods and means for tightening the skin on the sides of a blind cover to reduce movement and flutter in the wind. The means of the present invention include cover shafts that are stretched to cause a constant outward pressure on the sides of the cover. This is done with lower cost, lighter weight, and easier to use structures.

Simple

The present invention is simple to make and use. Each component is easily made. The present invention requires little time to attach and to set up.

The fast setup frame, angular frame, and other basic modules can be quickly set up to provide initial concealment and shelter. Other components can be added and configured as needed.

Easy to Use

The present invention is easy to use.

Lightweight

The present invention comprises a few simple parts that can easily be constructed of lightweight materials. Being lightweight is important for those who have to carry gear into the outdoors.

Compact

The embodiments of the present invention are compact. Large modules such as covers with cover shafts can be broken down and rolled together in relatively small bundles. This is advantageous for both storage and carrying.

Portable

The present invention is lightweight and compact allowing it to be carried long distances into the outdoors and to be used in a variety of locations.

Quiet

The skin tightening features reduce noise from wind movement or flutter. The attaching pivot support with a curtain has no moving parts that would make a noise or rattle together. In some cases the screws turning against the attaching structure could make a quiet sound. However the design is such that once screwed in all the way the screw can be backed out a turn or two to reduce the volume of noise made to a negligible level.

The novel use of guylines to secure and move windows and the use of magnetic window fasteners eliminate the need for zippers or hook and loop fasteners providing for quiet window or opening operation during wildlife observation.

Universal

The modular system of the present invention uses the same brackets and shafts to construct a variety of both tree blinds and ground blinds. The same parts and equipment can be used to construct configurations for different purposes and for different environments. This maximizes the user's investment in the materials and minimizes the number of items to be packed. The use of standard shaft segments and half-length extension shafts provide for a large number of configurations using the same basic components.

Lower Cost, Longer Reliability

The present invention provides a number of novel features that reduce the complexity and cost of manufacture and that increase the reliability of the parts.

Conclusion, Ramification, and Scope

Accordingly, the reader will see that the present invention provides an easy to use, simple, lightweight, compact, portable, quiet, multi-use modular system for concealment and shelter.

While the above descriptions contain several specifics these should not be construed as limitations on the scope of the invention, but rather as examples of some of the preferred embodiments thereof. Many other variations are possible. The variations could be used without departing from the scope and spirit of the novel features of the present invention.

Accordingly, the scope of the invention should be determined not by the illustrated embodiments, but by the appended claims and their legal equivalents.

We claim:

1. A shelter, wherein the shelter is lightweight, portable, and collapsible, and wherein, when set up by a human operator, the shelter is free standing on a supporting surface, the shelter comprising:
   a) a frame comprising:
      i) three or more cover shafts pivotably connected to an upper plate which forms an apex of the shelter, the shelter having an axis substantially perpendicular to an upper plate,
      ii) three or more stretcher shafts pivotably connected to each respective cover shaft and pivotably connected to a lower plate, and
      iii) a separation shaft connected to one of the plates, wherein the separation shaft comprises:
         (1) a separation shaft tip configured to pass through the other plate, and
         (2) a separation shaft stop configured to engage the other plate, and
      iv) a means for applying opposing forces to the upper plate and the lower plate to cause the separation shaft to separate the plates at a predetermined distance, the predetermined distance set by the separation shaft stop,
   b) a cover skin having a predetermined shape, the cover skin comprising:
      i) a number of cover panels corresponding to the number of cover shafts,
      ii) a plurality of cover corners formed by a plurality of cover seams between adjacent cover panels,
   wherein the cover comprises an inverted-T window, the inverted-T window comprising a horizontal left window fastener, a horizontal right window fastener, and a vertical top window fastener, said fasteners forming an inverted-T, and wherein the left window fastener and the right window fastener each is configured to open out from a center, and the top window fastener configured to open up from the center.

2. A shelter, wherein the shelter is lightweight, portable, and collapsible, and wherein, when set up by a human operator, the shelter is free standing on a supporting surface, the shelter comprising:
   a) a frame comprising:
      i) three or more cover shafts pivotably connected to an upper plate which forms an apex of the shelter, the shelter having an axis substantially perpendicular to an upper plate,
      ii) three or more stretcher shafts pivotably connected to each respective cover shaft and pivotably connected to a lower plate, and
      iii) a separation shaft connected to one of the plates, wherein the separation shaft comprises:
         (1) a separation shaft tip configured to pass through the other plate, and
         (2) a separation shaft stop configured to engage the other plate, and
      iv) a means for applying opposing forces to the upper plate and the lower plate to cause the separation shaft to separate the plates at a predetermined distance, the predetermined distance set by the separation shaft stop,
   b) a cover skin having a predetermined shape, the cover skin comprising:
      i) a number of cover panels corresponding to the number of cover shafts,
      ii) a plurality of cover corners formed by a plurality of cover seams between adjacent cover panels,
   wherein the cover comprises a star window,
   the star window comprising a horizontal left window fastener, a horizontal right window fastener, a vertical top window fastener, a diagonal bottom left window fastener, and a diagonal bottom right window fastener, said fasteners forming an star at a center, and
   wherein the left window fastener and the right window fastener each is configured to open out from the center, the bottom right window fastener and the bottom left window fastener each is configured to open diagonally down from the center, and the top window fastener configured to open up from the center.

3. A shelter, wherein the shelter is lightweight, portable, and collapsible, and wherein, when set up by a human operator, the shelter is free standing on a supporting surface, the shelter comprising:
   a) a frame comprising:
      i) three or more cover shafts pivotably connected to an upper plate which forms an apex of the shelter, the shelter having an axis substantially perpendicular to an upper plate,
      ii) three or more stretcher shafts pivotably connected to each respective cover shaft and pivotably connected to a lower plate, and
      iii) a separation shaft connected to one of the plates, wherein the separation shaft comprises:
         (1) a separation shaft tip configured to pass through the other plate, and
         (2) a separation shaft stop configured to engage the other plate, and
      iv) a means for applying opposing forces to the upper plate and the lower plate to cause the separation shaft to separate the plates at a predetermined distance, the predetermined distance set by the separation shaft stop,
   b) a cover skin having a predetermined shape, the cover skin comprising:
      i) a number of cover panels corresponding to the number of cover shafts,
      ii) a plurality of cover corners formed by a plurality of cover seams between adjacent cover panels,
   wherein the frame is configured in a frame configuration such that when the upper plate and the lower plate are separated at the predetermined distance by the separation shaft, the lower plate is past the plane of the stretcher shaft connections to the respective cover shafts, the frame configuration holding the upper plate and the lower plate together,
   the shelter further comprising an additional safety means for temporarily holding the upper plate and lower plate together while the shelter is being used by the operator.

4. The shelter of claim 3, wherein at least one plate has a plurality of predetermined plate anchors perpendicular to the plane of the plate, each plate anchor being used to connect to one of the shafts,
   wherein the plate anchors extend perpendicularly toward the other plate, within the perimeter of the plate,
   whereby the perimeter of the plate protects the plate anchors from damage.

5. The shelter of claim 3, wherein the means for applying opposing forces comprises a pull cord.

6. The shelter of claim 3, wherein the means for applying opposing forces comprises one or more of the group of:
   a) a pull rod, wherein the pull rod is distinct from the separation shaft, wherein the pull rod is attached to the other plate, and wherein the pull rod is configured to be gripped directly by the operator to apply one of the opposing forces,
   b) an upper handle,
   c) a lower handle, and
   d) a hand grip.

7. The shelter of claim 3, wherein each of the cover shafts further comprise an angular hinge, forming a lower shaft below the angular hinge and an upper shaft above the angular hinge,
   wherein the angular hinge is configured to allow the lower shaft to fold up parallel to the upper shaft, forming a substantially zero degree angle,
   wherein the angular hinge is configured to fold down and hold the lower shaft at a predetermined angle with respect to the upper shaft.

8. The shelter of claim 7, wherein the lower shaft has a predetermined length.

9. The shelter of claim 8, wherein the lower shafts are substantial the same length as the respective cover shaft above each respective angular hinge,
   whereby when folded the collapsed shelter has an optimum folded length substantially the same as the predetermined lower shaft length.

10. The shelter of claim 8, wherein the predetermined lower shaft length is substantially about two feet, providing shelter for one operator.

11. The shelter of claim 8, wherein the angular hinges allow a small mechanical movement relative to the plates, to apply a significant skin tightening force through the frame to the lower shafts.

12. The shelter of claim 8,
   wherein the cover skin is an angular cover having a shape configured to match the angular hinges of the frame, wherein the angular cover is configured to allow at least one of the lower shafts to be folded up at the respective angular hinge, and whereby the frame is substantially horizontal when placed on a hillside or in rough terrain with the at least one of the lower shafts folded up.

13. The shelter of claim 3 wherein the safety means is outside the cover, requiring the operator to be outside the shelter to disengage the safety means.

14. The shelter of claim 3, wherein the safety means comprises a safety strap having one end attached to the frame near the apex and the other end connected to one of the lower plate or one of the stretcher shafts, wherein the safety strap further comprising a receiving clip and an inserting clip for making a temporary connection between the two ends of the safety strap, whereby the operator is protected from unplanned release of the force stored in the shelter.

15. The shelter of claim 3, wherein the cover comprises fully enclosing netting with a water resistant floor.

16. A shelter, wherein the shelter is lightweight, portable, and collapsible, and wherein, when set up by a human operator, the shelter is free standing on a supporting surface, the shelter comprising:
 a) a frame comprising:
  i) three or more cover shafts pivotably connected to an upper plate which forms an apex of the shelter, the shelter having an axis substantially perpendicular to an upper plate,
  ii) three or more stretcher shafts pivotably connected to each respective cover shaft and pivotably connected to a lower plate, and
  iii) a separation shaft connected to one of the plates, wherein the separation shaft comprises:
   (1) a separation shaft tip configured to pass through the other plate, and
   (2) a separation shaft stop configured to engage the other plate, and
  iv) a means for applying opposing forces to the upper plate and the lower plate to cause the separation shaft to separate the plates at a predetermined distance, the predetermined distance set by the separation shaft stop,
 b) a cover skin having a predetermined shape, the cover skin comprising:
  i) a number of cover panels corresponding to the number of cover shafts,
  ii) a plurality of cover corners formed by a plurality of cover seams between adjacent cover panels,
 wherein the number of cover shafts is three,
 wherein the shelter has three corners, wherein at least one of the corners has an angle greater than or equal to 120 degrees, and
 wherein each cover panel provides an unobstructed shooting area,
 whereby the operator is concealed inside the at least one of the corners, and the opposite cover panel has an unobstructed shooting angle.

17. A shelter, wherein the shelter is lightweight, portable, and collapsible, and wherein, when set up by a human operator, the shelter is free standing on a supporting surface, the shelter comprising:
 a) a frame comprising:
  i) three or more cover shafts pivotably connected to an upper plate which forms an apex of the shelter, the shelter having an axis substantially perpendicular to an upper plate,
  ii) three or more stretcher shafts pivotably connected to each respective cover shaft and pivotably connected to a lower plate, and
  iii) a separation shaft connected to one of the plates, wherein the separation shaft comprises:
   (1) a separation shaft tip configured to pass through the other plate, and
   (2) a separation shaft stop configured to engage the other plate, and
  iv) a means for applying opposing forces to the upper plate and the lower plate to cause the separation shaft to separate the plates at a predetermined distance, the predetermined distance set by the separation shaft stop,
 b) a cover skin having a predetermined shape, the cover skin comprising:
  i) a number of cover panels corresponding to the number of cover shafts,
  ii) a plurality of cover corners formed by a plurality of cover seams between adjacent cover panels,
 wherein the cover comprises three tiers:
 c) a top tier,
 d) a middle tier, and
 e) a bottom tier,
 wherein top tier substantially forms a roof,
 wherein the middle tier and the bottom tier in combination substantially form walls,
 wherein an entire bottom edge of the bottom tier is configured to reach the surface upon which the frame stands,
 wherein the a top edge of the bottom tier is configured to reach a bottom edge of the middle tier,
 wherein the a top edge of the middle tier is configured to reach a bottom edge of the top tier, and
 wherein the middle tier comprises a plurality of windows.

18. The shelter of claim 17, wherein at least one of the plurality of windows is covered with a see-through panel.

19. The shelter of claim 17, wherein at least one of the plurality of windows is held closed using a magnet and a magnetic piece.

20. The shelter of claim 17, wherein the top tier and the bottom tier are held taut by one of the group of guylines, straps, tubular webbing, or corner sections, the guylines, straps, tubular webbing, or corner sections each being connected at one end to the top tier and at the other end to the bottom tier and each crossing the middle tier.

21. A shelter, wherein the shelter is lightweight, portable, and collapsible, and wherein, when set up by a human operator, the shelter is free standing on a supporting surface, the shelter comprising:
 a) a frame comprising:
  i) three or more cover shafts pivotably connected to an upper plate which forms an apex of the shelter, the shelter having an axis substantially perpendicular to an upper plate,
  ii) three or more stretcher shafts pivotably connected to each respective cover shaft and pivotably connected to a lower plate, and
  iii) a separation shaft connected to one of the plates, wherein the separation shaft comprises:
   (1) a separation shaft tip configured to pass through the other plate, and
   (2) a separation shaft stop configured to engage the other plate, and
  iv) a means for applying opposing forces to the upper plate and the lower plate to cause the separation shaft to separate the plates at a predetermined distance, the predetermined distance set by the separation shaft stop,
b) a cover skin having a predetermined shape, the cover skin comprising:
  i) a number of cover panels corresponding to the number of cover shafts,
  ii) a plurality of cover corners formed by a plurality of cover seams between adjacent cover panels,
wherein the cover comprises an overhead window,
the overhead window comprising at least one horizontal window fastener and a vertical top window fastener, the top window fastener opening toward the apex of the shelter, the shelter being configured such that the operator rises up through the overhead window.

22. A shelter, wherein the shelter is lightweight, portable, and collapsible, and wherein, when set up by a human operator, the shelter is free standing on a supporting surface, the shelter comprising:
a) a frame comprising:
  i) three or more cover shafts pivotably connected to an upper plate which forms an apex of the shelter, the shelter having an axis substantially perpendicular to an upper plate,
  ii) three or more stretcher shafts pivotably connected to each respective cover shaft and pivotably connected to a lower plate, and
  iii) a separation shaft connected to one of the plates, wherein the separation shaft comprises:
    (1) a separation shaft tip configured to pass through the other plate, and
    (2) a separation shaft stop configured to engage the other plate, and
  iv) a means for applying opposing forces to the upper plate and the lower plate to cause the separation shaft to separate the plates at a predetermined distance, the predetermined distance set by the separation shaft stop,
b) a cover skin having a predetermined shape, the cover skin comprising:
  i) a number of cover panels corresponding to the number of cover shafts,
  ii) a plurality of cover corners formed by a plurality of cover seams between adjacent cover panels,
c) a removable rain cover having a shape similar to the cover, the rain cover comprising a plurality of rain cover panels similar in number, size, and shape as the cover panels,
wherein the cover comprises fully enclosing netting with a water resistant floor,
wherein the entire bottom edge of the rain cover is configured to reach the surface upon which the shelter is standing, and
wherein at least one rain cover panel has additional material capable of being extended beyond the area enclosed by the netting.

* * * * *